United States Patent
Li et al.

(10) Patent No.: US 11,785,649 B2
(45) Date of Patent: Oct. 10, 2023

(54) LISTEN-BEFORE-TALK FOR WIDEBAND OPERATIONS OF NR UNLICENSED SPECTRUM

(71) Applicant: Samsung Electronics Co., Ltd., Suwon-si (KR)

(72) Inventors: Yingzhe Li, Mountain View, CA (US); Hongbo Si, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 22 days.

(21) Appl. No.: 17/248,611

(22) Filed: Jan. 29, 2021

(65) Prior Publication Data

US 2021/0153249 A1 May 20, 2021

Related U.S. Application Data

(63) Continuation of application No. 16/245,111, filed on Jan. 10, 2019, now Pat. No. 10,912,128.
(Continued)

(51) Int. Cl.
*H04W 56/00* (2009.01)
*H04W 74/08* (2009.01)
(Continued)

(52) U.S. Cl.
CPC ........ *H04W 74/085* (2013.01); *H04B 7/0639* (2013.01); *H04L 5/0037* (2013.01);
(Continued)

(58) Field of Classification Search
CPC ........... H04W 74/085; H04W 72/0453; H04W 72/046; H04W 72/1205; H04W 74/0808;
(Continued)

(56) References Cited

U.S. PATENT DOCUMENTS

2004/0235529 A1 11/2004 Tarokh et al.
2015/0023315 A1 1/2015 Yerramalli et al.
(Continued)

FOREIGN PATENT DOCUMENTS

CN 105379401 A 3/2016
CN 106559797 A 4/2017
(Continued)

OTHER PUBLICATIONS

Korean Intellectual Property Office, "Notification of a Decision to Grant" dated Dec. 13, 2021, in connection with Korean Patent Application No. 10-2020-7020916, 7 pages.
(Continued)

*Primary Examiner* — Sai Ming Chan

(57) ABSTRACT

A base station (BS) in a wireless communication system is provided. The BS comprises a processor configured to determine frequency units within a frequency range for a bandwidth of an operating carrier, wherein a listen-before-talk (LBT) operation is performed over each of the frequency units; and determine, for each of the frequency units, a set of intended spatial transmit (TX) parameters and a set of spatial receiver (RX) parameters of the LBT operation; and determine a subset of the frequency units for a downlink transmission based on the LBT operation performed over each of the frequency units; and a transceiver operably connected to processor, which is configured to transmit, to a user equipment (UE), downlink channels using the bandwidth corresponding to the determined subset of the frequency units.

14 Claims, 46 Drawing Sheets

Related U.S. Application Data

(60) Provisional application No. 62/783,750, filed on Dec. 21, 2018, provisional application No. 62/783,029, filed on Dec. 20, 2018, provisional application No. 62/781,856, filed on Dec. 19, 2018, provisional application No. 62/780,726, filed on Dec. 17, 2018, provisional application No. 62/656,197, filed on Apr. 11, 2018, provisional application No. 62/652,586, filed on Apr. 4, 2018, provisional application No. 62/620,715, filed on Jan. 23, 2018.

(51) Int. Cl.
| | | |
|---|---|---|
| *H04B 7/06* | (2006.01) | |
| *H04L 5/00* | (2006.01) | |
| *H04W 88/08* | (2009.01) | |
| *H04W 72/0453* | (2023.01) | |
| *H04W 72/044* | (2023.01) | |
| *H04W 72/12* | (2023.01) | |

(52) U.S. Cl.
CPC ..... *H04W 72/046* (2013.01); *H04W 72/0453* (2013.01); *H04W 72/12* (2013.01); *H04W 74/0808* (2013.01); *H04W 88/08* (2013.01); *H04L 5/0092* (2013.01)

(58) Field of Classification Search
CPC ... H04W 88/08; H04B 47/0639; H04L 5/0037
USPC ......................................................... 370/329
See application file for complete search history.

(56) References Cited

U.S. PATENT DOCUMENTS

| | | | |
|---|---|---|---|
| 2016/0007353 A1 | 1/2016 | Malladi et al. | |
| 2016/0135148 A1 | 5/2016 | Novlan et al. | |
| 2016/0143026 A1* | 5/2016 | Seok ................. | H04L 1/0025 370/329 |
| 2017/0079010 A1* | 3/2017 | Zhang ................ | H04W 16/14 |
| 2017/0339721 A1 | 11/2017 | Mukherjee et al. | |
| 2018/0041906 A1 | 2/2018 | Jang et al. | |
| 2018/0115996 A1 | 4/2018 | Si et al. | |
| 2018/0288805 A1 | 10/2018 | Bhorkar et al. | |
| 2018/0332618 A1* | 11/2018 | Kakishima .......... | H04L 5/005 |
| 2019/0045370 A1* | 2/2019 | Al-Fanek ............ | H04W 16/14 |
| 2019/0149380 A1 | 5/2019 | Babaei et al. | |
| 2020/0077437 A1 | 3/2020 | Stern-Berkowitz et al. | |
| 2020/0314906 A1* | 10/2020 | Goyal ................. | H04B 7/0695 |
| 2021/0153245 A1* | 5/2021 | Tooher ............... | H04W 72/0446 |
| 2021/0368541 A1* | 11/2021 | Hedayat ............. | H04W 74/0816 |
| 2022/0030627 A1* | 1/2022 | Hooli ................. | B60T 8/172 |

FOREIGN PATENT DOCUMENTS

| | | |
|---|---|---|
| CN | 107078887 A | 8/2017 |
| CN | 107113886 A | 8/2017 |
| CN | 107439034 A | 12/2017 |
| EP | 3407659 A1 | 11/2018 |
| KR | 10-2017-0093059 A | 8/2017 |
| KR | 10-2017-0111643 A | 10/2017 |
| KR | 10-2017-0127634 A | 11/2017 |
| WO | 2017031725 A1 | 3/2017 |
| WO | 2017051236 A1 | 3/2017 |
| WO | 2017126935 A1 | 7/2017 |
| WO | 2017203487 A1 | 11/2017 |

OTHER PUBLICATIONS

Qualcomm Incorporated, "TxOP Frame Structure for NR unlicensed", R1-1804829, 3GPP TSG RAN WG1 Meeting #92bis, Sanya, China, Apr. 16-20, 2018, 8 pages.

Huawei et al., "NR frame structure on unlicensed bands", R1-1800040, 3GPP TSG RAN WG1 Adhoc Meeting, Vancouver, Canada, Jan. 22-26, 2018, 7 pages.

"3rd Generation Partnership Project; Technical Specification Group Radio Access Network; NR; Physical channels and modulation (Release 15)", 3GPP TS 38.211 V15.0.0, Dec. 2017, 73 pages.

"3rd Generation Partnership Project; Technical Specification Group Radio Access Network; NR; Multiplexing and channel coding (Release 15)", 3GPP TS 38.212 V15.0.0, Dec. 2017, 82 pages.

"3rd Generation Partnership Project; Technical Specification Group Radio Access Network; NR; Physical layer procedures for control (Release 15)", 3GPP TS 38.213 V15.0.0, Dec. 2017, 56 pages.

"3rd Generation Partnership Project; Technical Specification Group Radio Access Network; NR; Physical layer procedures for data (Release 15)", 3GPP TS 38.214 V15.0.0, Dec. 2017, 71 pages.

"3rd Generation Partnership Project; Technical Specification Group Radio Access Network; Study on Licensed-Assisted Access to Unlicensed Spectrum; (Release 13)", 3GPP TR 36.889 V13.0.0, Jun. 2015, 285 pages.

"3rd Generation Partnership Project; Technical Specification Group Radio Access Network; NR; Physical layer measurements (Release 15)", 3GPP TS 38.215 V15.0.0, Dec. 2017, 13 pages.

"3rd Generation Partnership Project; Technical Specification Group Radio Access Network; Evolved Universal Terrestrial Radio Access (E-UTRA); Physical layer procedures (Release 13)", 3GPP TS 36.213 V13.2.0, Jun. 2016, 381 pages.

"3rd Generation Partnership Project; Technical Specification Group Radio Access Network; Evolved Universal Terrestrial Radio Access (E-UTRA); Physical channels and modulation (Release 13)", 3GPP TS 36.211 V13.2.0, Jun. 2016, 168 pages.

"3rd Generation Partnership Project; Technical Specification Group Radio Access Network; Evolved Universal Terrestrial Radio Access (E-UTRA); Multiplexing and channel coding (Release 13)", 3GPP TS 36.212 V13.2.0, Jun. 2016, 140 pages.

"3rd Generation Partnership Project; Technical Specification Group Radio Access Network; Evolved Universal Terrestrial Radio Access (E-UTRA); Medium Access Control (MAC) protocol specification (Release 13)", 3GPP TS 36.321 V13.2.0, Jun. 2016, 68 pages.

"3rd Generation Partnership Project; Technicai Specification Group Radio Access Network NR Radio Resource Control (RRC) protocol specification (Release 15)", 3GPP TS 38.331 V15.0.0, Dec. 2017, 188 pages.

"3rd Generation Partnership Project:Technical Specification Group Radio Access Network; Evolved Universal Terrestrial Radio Access (E-UTRA); Radio Resource Control (RRC); Protocol specification (Release 13)", 3GPP TS 36.331 V13.2.0, Jun. 2016, 623 pages.

CATT, "Remaining aspects of BWP operation", 3GPP TSG RAN WG1 Meeting #90bis, Oct. 9-13, 2017, 4 pages, R1-1717839.

NEC, "Discussion on LBT of NR unlicensed band", 3GPP TSG RAN WG1 Meeting AH 1801, Jan. 22-26, 2018, 5 pages, R1-1800222.

International Search Report dated Apr. 19, 2019 in connection with International Patent Application No. PCT/KR2019/000884, 3 pages.

Written Opinion of the International Searching Authority dated Apr. 19, 2019 in connection with International Patent Application No. PCT/KR2019/000884, 4 pages.

Extended European Search Report regarding Application No. 19743227.1, dated Dec. 14, 2020, 14 pages.

Ericsson, "On UL Channel Access Procedures for PUSCH", 3GPP TSG RAN WG1 Meeting #84bis, R1-163150, Apr. 2016, 5 pages.

Office Action dated Jun. 14, 2021 in connection with Korean Patent Application No. 10-2020-7020916, 10 pages.

Chinese National Intellectual Property Administration, First Office Action dated Jul. 10, 2023 regarding Application No. 201980009918.3, 15 pages.

ZTE et al., "Discussion on NR operation in unlicensed spectrum", 3GPP TSG RAN WG1 Meeting #88, R1-1701619, Feb. 2017, 8 pages.

\* cited by examiner

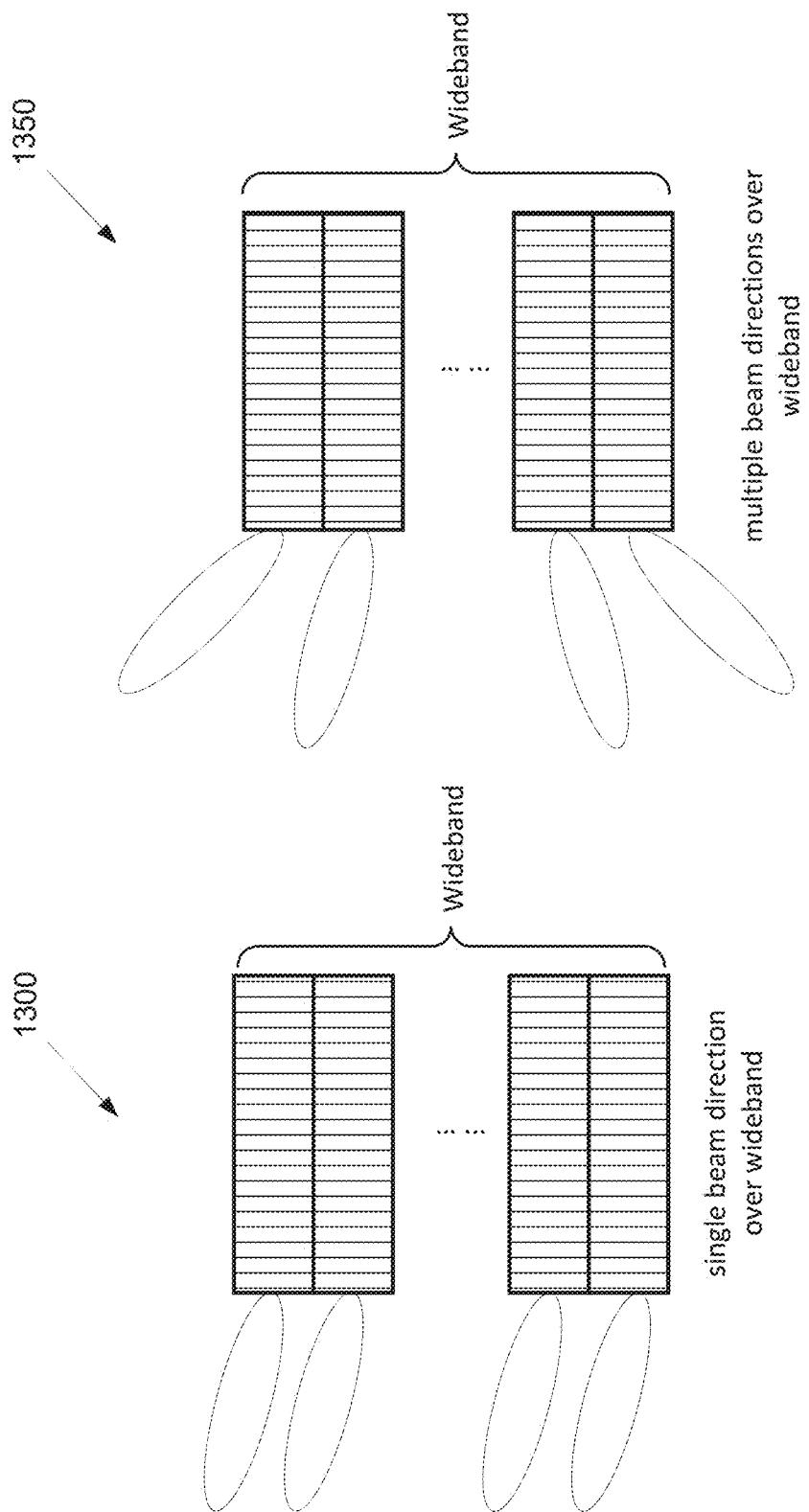

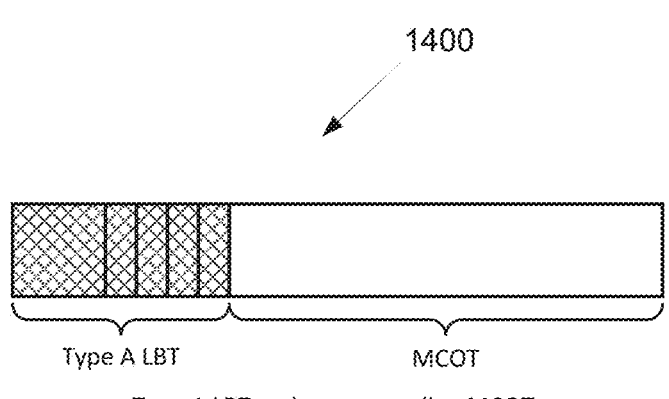
FIG. 14A
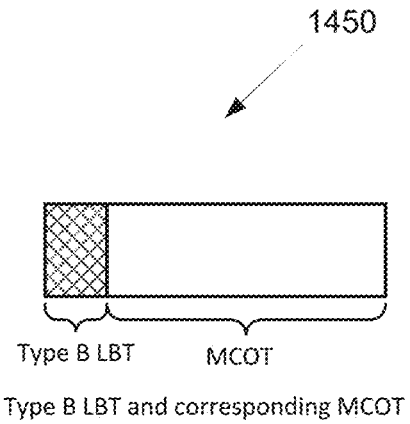
FIG. 14B
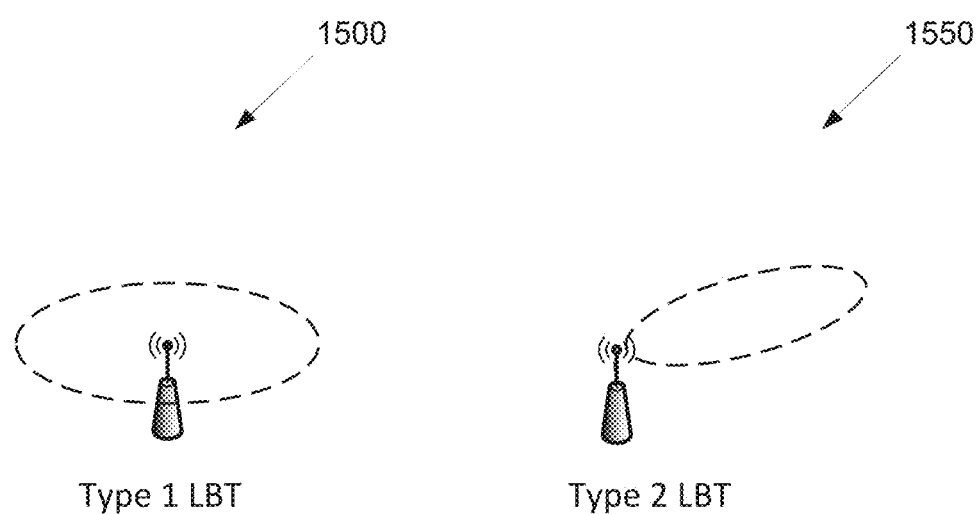
FIG. 15A
FIG. 15B

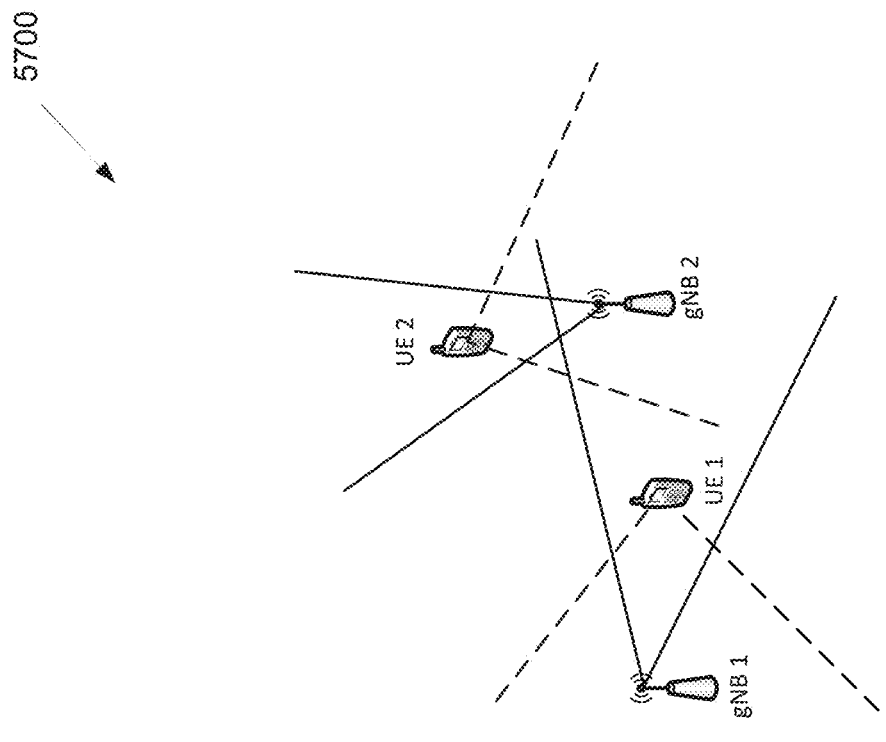
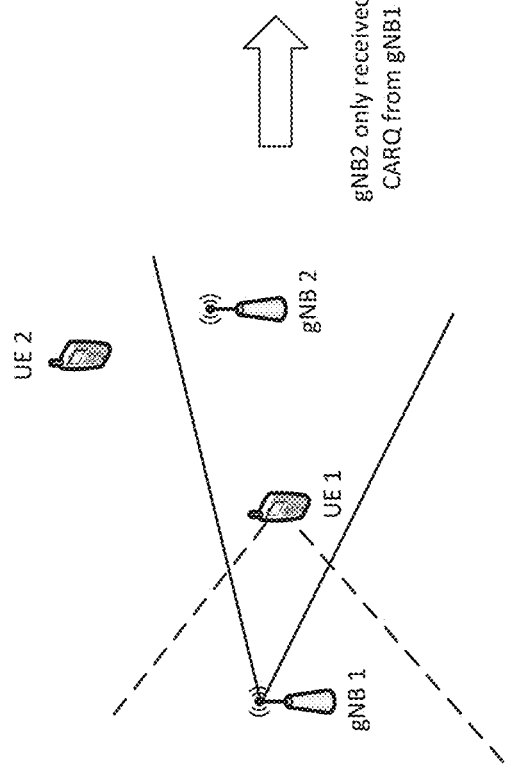
FIG. 57

1

LISTEN-BEFORE-TALK FOR WIDEBAND OPERATIONS OF NR UNLICENSED SPECTRUM

CROSS-REFERENCE TO RELATED APPLICATIONS AND CLAIM OF PRIORITY

This application is a continuation of U.S. patent application Ser. No. 16/245,111, filed Jan. 10, 2019, which claims priority to: U.S. Provisional Patent Application No. 62/620,715, filed on Jan. 23, 2018; U.S. Provisional Patent Application No. 62/652,586, filed on Apr. 4, 2018; U.S. Provisional Patent Application No. 62/656,197, filed on Apr. 11, 2018; U.S. Provisional Patent Application No. 62/780,726, filed on Dec. 17, 2018; U.S. Provisional Patent Application No. 62/781,856, filed on Dec. 19, 2018; U.S. Provisional Patent Application No. 62/783,029, filed on Dec. 20, 2018; and U.S. Provisional Patent Application No. 62/783,750, filed on Dec. 21, 2018. The content of the above-identified patent documents is incorporated herein by reference.

TECHNICAL FIELD

The present disclosure relates generally to wireless communication systems and, more specifically, to a listen-before-talk operation for a wideband operation of an NR unlicensed spectrum.

BACKGROUND

In a wireless communication network, a network access and a radio resource management (RRM) are enabled by physical layer synchronization signals and higher (MAC) layer procedures. In particular, a UE attempts to detect the presence of synchronization signals along with at least one cell identification (ID) for initial access. Once the UE is in the network and associated with a serving cell, the UE monitors several neighboring cells by attempting to detect their synchronization signals and/or measuring the associated cell-specific reference signals (RSs). For next generation cellular systems such as third generation partnership-new radio access or interface (3GPP-NR), efficient and unified radio resource acquisition or tracking mechanism which works for various use cases such as enhanced mobile broadband (eMBB), ultra reliable low latency (URLLC), massive machine type communication (mMTC), each corresponding to a different coverage requirement and frequency bands with different propagation losses is desirable. Most likely designed with a different network and radio resource paradigm, seamless and low-latency RRM is also desirable.

SUMMARY

Embodiments of the present disclosure provide a listen-before-talk operation for a wideband operation of an NR unlicensed spectrum.

In one embodiment, a base station (BS) in a wireless communication system is provided. The BS comprises at least one processor configured to determine frequency units within a frequency range for a bandwidth of an operating carrier, wherein a listen-before-talk (LBT) operation is performed over each of the frequency units, determine, for each of the frequency units, a set of intended spatial transmit (TX) parameters and a set of spatial receiver (RX) parameters of the LBT operation, and determine a subset of the frequency units for a downlink transmission based on the LBT operation performed over each of the frequency units. The BS further comprises a transceiver operably connected to the at least one processor, the transceiver configured to transmit, to a user equipment (UE), downlink channels using the bandwidth corresponding to the determined subset of the frequency units.

In another embodiment, a user equipment (UE) in a wireless communication system is provided. The UE comprises at least one processor configured to determine frequency units within a frequency range for a bandwidth of an operating carrier, wherein a listen-before-talk (LBT) operation is performed over each of the frequency units, determine, for each of the frequency units, a set of intended spatial transmit (TX) parameters and a set of spatial receiver (RX) parameters of the LBT operation; and determine a subset of the frequency units for an uplink transmission based on the LBT operation performed over each of the frequency units. The UE further comprises a transceiver operably connected to the at least one processor, the transceiver configured to transmit, to a base station (BS), uplink channels using the bandwidth corresponding to the determined subset of the frequency units.

In yet another embodiment, a method of a base station (BS) in a wireless communication system is provided. The method comprises determining frequency units within a frequency range for a bandwidth of an operating carrier, wherein a listen-before-talk (LBT) operation is performed over each of the frequency units, determining, for each of the frequency units, a set of intended spatial transmit (TX) parameters and a set of spatial receiver (RX) parameters of the LBT operation, determining a subset of the frequency units for a downlink transmission based on the LBT operation performed over each of the frequency units, and transmitting, to a user equipment (UE), downlink channels using the bandwidth corresponding to the determined subset of the frequency units.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C"

includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 13A illustrates an example single beam direction over wideband according to embodiments of the present disclosure;

FIG. 13B illustrates an example multiple beam direction over wideband according to embodiments of the present disclosure;

FIG. 14A illustrates an example type A LBT and MCOT according to embodiments of the present disclosure;

FIG. 14B illustrates an example type B LBT and MCOT according to embodiments of the present disclosure;

FIG. 15A illustrates an example Type 1 LBT according to embodiments of the present disclosure;

FIG. 15B illustrates an example Type 2 LBT according to embodiments of the present disclosure;

FIG. 57 illustrates an example CARQ reception according to embodiments of the present disclosure.

DETAILED DESCRIPTION

Figure 1:
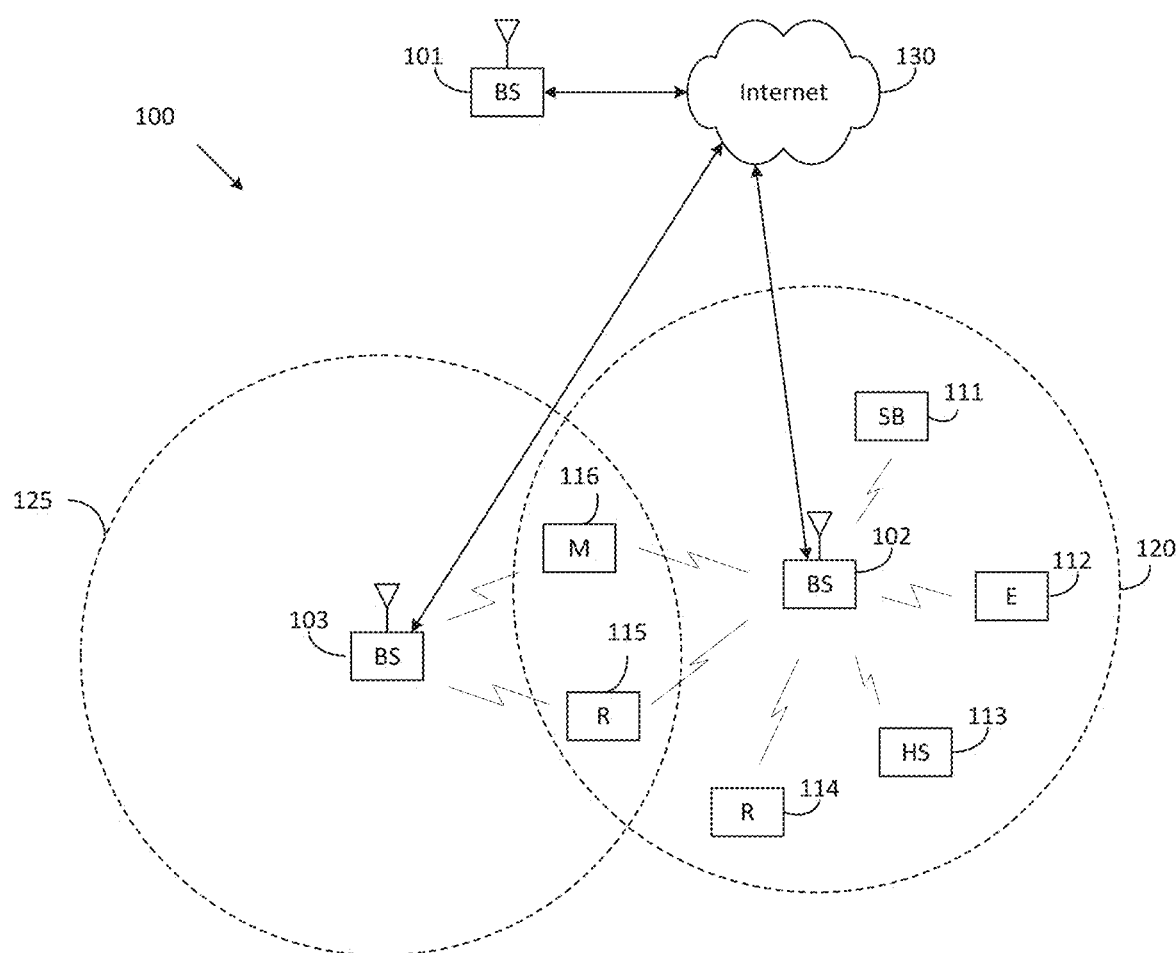
FIG. 1 illustrates an example wireless network according to embodiments of the present disclosure.
Figure 58:
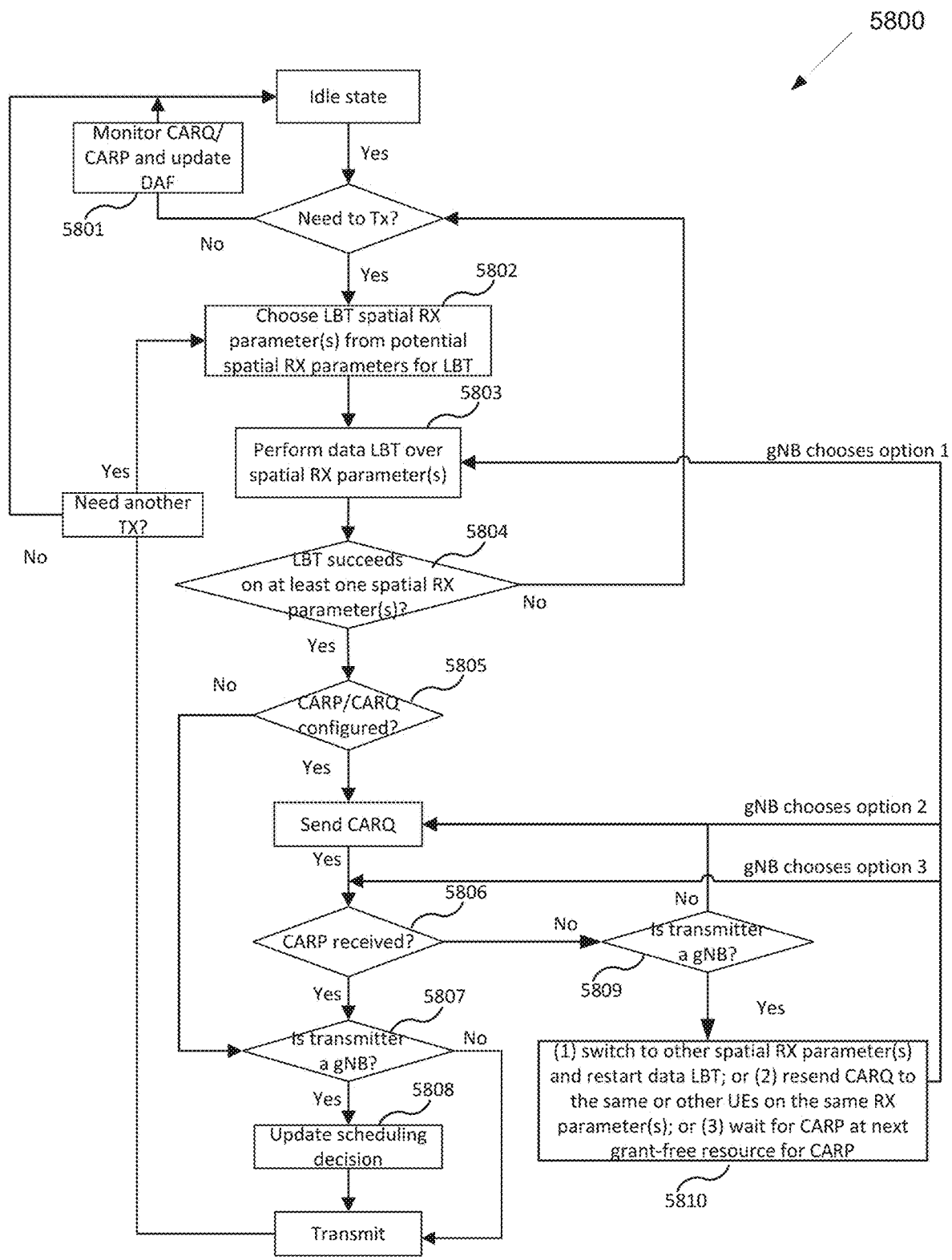
FIG. 58 illustrates a flowchart of a method for an LBT operation according to embodiments of the present disclosure.

FIGS. 1 through FIG. 58, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents and standards descriptions are hereby incorporated by reference into the present disclosure as if fully set forth herein: 3GPP TS 36.211 v13.2.0, "E-UTRA, Physical channels and modulation;" 3GPP TS 36.212 v13.2.0, "E-UTRA, Multiplexing and Channel coding;" 3GPP TS 36.213 v13.2.0, "E-UTRA, Physical Layer Procedures;" 3GPP TS 36.321 v13.2.0, "E-UTRA, Medium Access Control (MAC) protocol specification;" 3GPP TS 36.331 v13.2.0, "E-UTRA, Radio Resource Control (RRC) protocol specification;" RP-172021, "Revised SID on NR-based Access to Unlicensed Spectrum;" 3GPP TS 38.211 v15.0.0, "NR; Physical channels and modulation;" 3GPP TS 38.212 v15.0.0, "NR; Multiplexing and channel coding;" 3GPP TS 38.213 v15.0.0, "NR; Physical layer procedures for control;" 3GPP TS 38.214 v15.0.0, "NR; Physical layer procedures for data;" 3GPP TS 38.215 v15.0.0, "NR; Physical layer measurements;" 3GPP TS 38.331 v15.0.0, "NR; Radio Resource Control (RRC) protocol specification;" and 3GPP TR 36.889 V13.0.0, "Study on Licensed-Assisted Access to Unlicensed Spectrum."

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system."

The 5G communication system is considered to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

In the 5G system, hybrid frequency shift keying and quadrature amplitude modulation (FQAM) and sliding window superposition coding (SWSC) as an adaptive modulation and coding (AMC) technique, and filter bank multi carrier (FBMC), non-orthogonal multiple access (NOMA), and sparse code multiple access (SCMA) as an advanced access technology have been developed.

Figure 2:
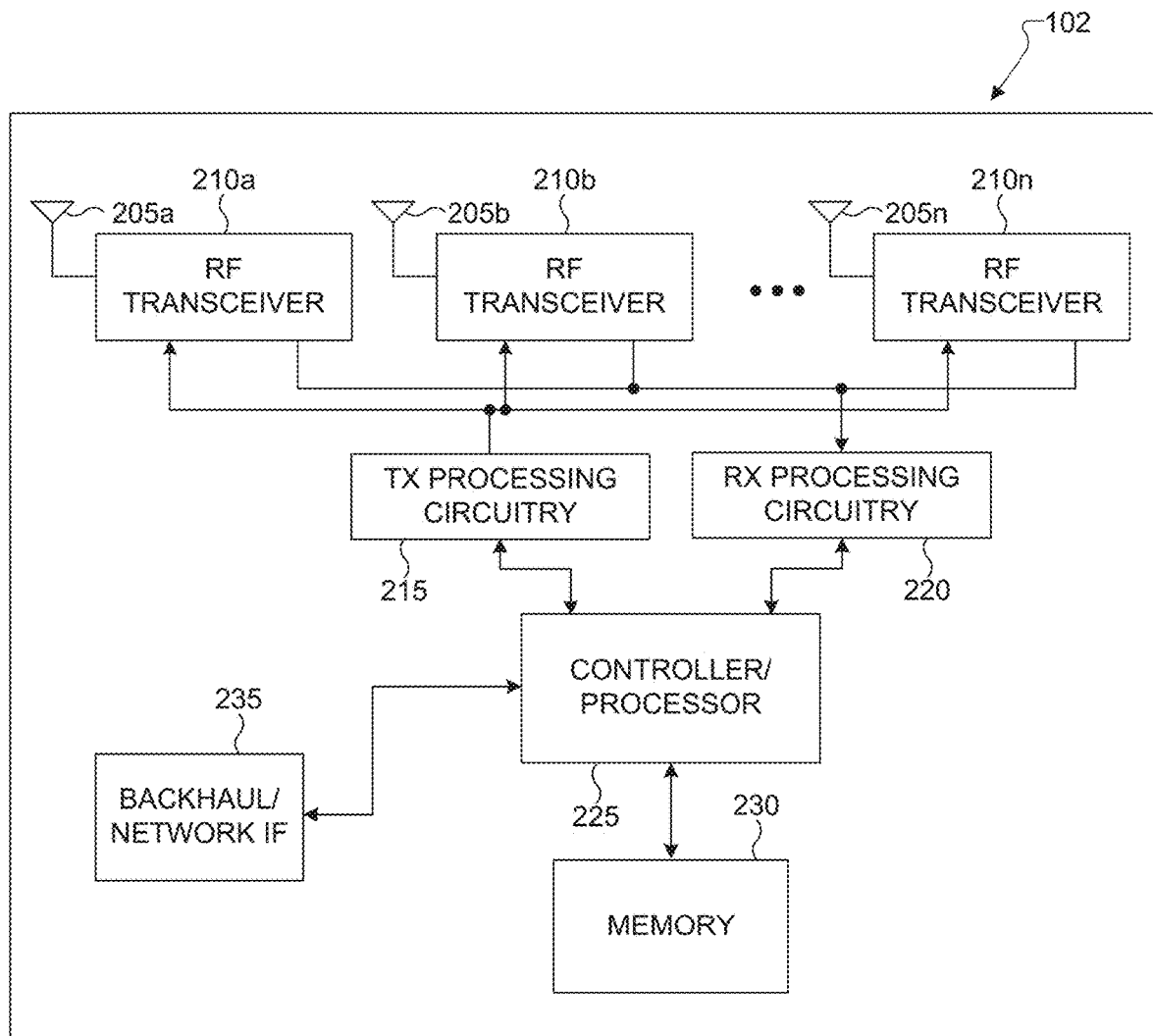
FIG. 2 illustrates an example eNB according to embodiments of the present disclosure.
Figure 3:
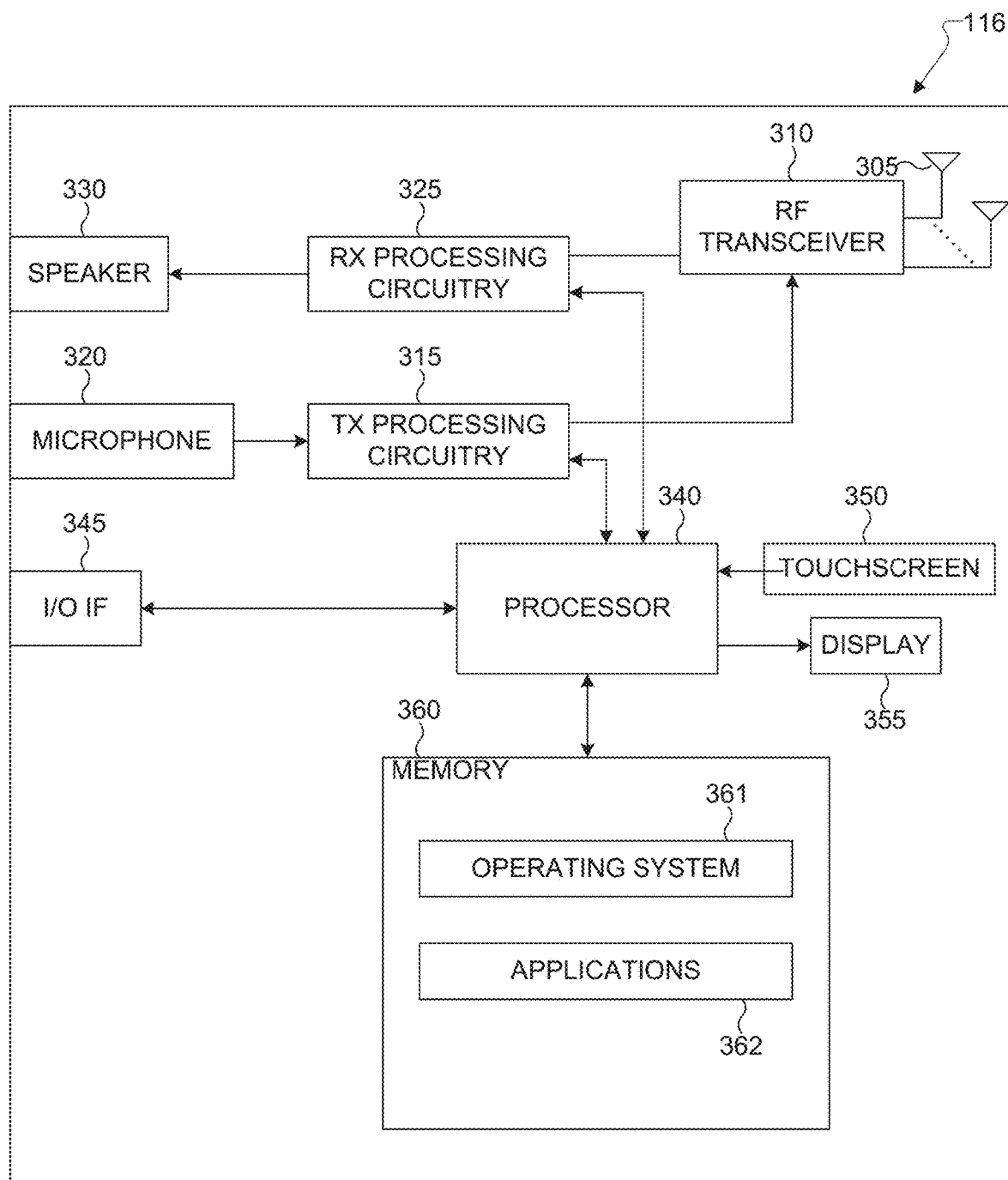
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes an eNB 101, an eNB 102, and an eNB 103. The eNB 101 communicates with the eNB 102 and the eNB 103. The eNB 101 also communicates with at least one network 130, such as the Internet, a proprietary Internet Protocol (IP) network, or other data network.

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (a gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, one or more of the UEs 111-116 include circuitry, programing, or a combination thereof, for efficient LBT operation for wideband operations of NE unlicensed spectrum in advanced wireless communication system. In certain embodiments, and one or more of the eNBs 101-103 includes circuitry, programing, or a combination thereof, for receiving efficient LBT operation for wideband operations of NE unlicensed spectrum in an advanced wireless communication system.

Although FIG. 1 illustrates one example of a wireless network, various changes may be made to FIG. 1. For example, the wireless network could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNBs 101, 102, and/or 103 could provide access to other or additional external networks, such as external telephone networks or other types of data networks.

FIG. 2 illustrates an example eNB 102 according to embodiments of the present disclosure. The embodiment of the eNB 102 illustrated in FIG. 2 is for illustration only, and the eNBs 101 and 103 of FIG. 1 could have the same or similar configuration. However, eNBs come in a wide variety of configurations, and FIG. 2 does not limit the scope of this disclosure to any particular implementation of an eNB.

As shown in FIG. 2, the eNB 102 includes multiple antennas 205a-205n, multiple RF transceivers 210a-210n, transmit (TX) processing circuitry 215, and receive (RX) processing circuitry 220. The eNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

In some embodiments, the RF transceiver 210a-201n is capable of transmitting the PSS and SSS over downlink channels.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the eNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the eNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the eNB 102 to communicate with other devices or systems over a backhaul connection or over a network. The interface 235 could support communications over any suitable wired or wireless connection(s). For example, when the eNB 102 is implemented as part of a cellular communication system (such as one supporting 5G, LTE, or LTE-A), the interface 235 could allow the eNB 102 to communicate with other eNBs over a wired or wireless backhaul connection. When the eNB 102 is implemented as an access point, the interface 235 could allow the eNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

In some embodiments, the controller/processor 225 is capable of generating a primary synchronization signal (PSS) including one of multiple PSS sequences that is generated based on a binary phase shift keying (BPSK) modulated length-127 M-sequence in a frequency domain, wherein the PSS includes part of cell identification (ID) information.

In some embodiments, the controller/processor 225 is capable of generating a secondary synchronization signal (SSS) including one of multiple SSS sequences that is generated based on multiple BPSK modulated length-127 M-sequences in the frequency domain, wherein the SSS includes the cell identification (ID) information.

In some embodiments, the controller/processor 225 is capable of determining a number of PSS sequences corresponding to a number of cell ID hypotheses carried by PSS, respectively and a number of SSS sequences corresponding to the number of cell ID hypotheses carried by the PSS and SSS, respectively.

In some embodiments, the controller/processor 225 is capable of determining a polynomial for an M-sequence generating the PSS sequence and a cyclic shift for the M-sequence based on the cell ID information carried by PSS, and generating the PSS sequence by performing the cyclic shift to the M-sequence for a cell ID.

In some embodiments, the controller/processor 225 is capable of determining a polynomial for a first M-sequence generating the SSS sequence, a first cyclic shift for the first M-sequence based on the cell ID information carried by PSS and SSS, the polynomial for a second M-sequence generating the SSS sequence, a second cyclic shift for the second M-sequence based on the cell ID information carried by PSS and SSS, and generating the SSS sequence by performing a product of the first and second M-sequences, wherein each of the first and second M-sequences is generated by the first and second cyclic shifts, respectively, for the cell ID.

In such embodiments, the polynomial for the M-sequence is given by $x^7+x^4+1$ and a corresponding recursive construction scheme is given by $d_M(i+7)=[d_M(i+4)+d_M(i)]\mod 2$, $0 \le i \le 119$, the polynomial for the first M-sequence is given by $x^7+x^4+1$ and a corresponding recursive construction scheme is given by $d_M(i+7)=[d_M(i+4)+d_M(i)]\mod 2$, $0 \le i \le 119$, and the polynomial for the second M-sequence is given by $x^7+x+1$ and a corresponding recursive construction scheme is given by $d_M(i+7)=[d_M(i+1)+d_M(i)]\mod 2$, $0 \le i \le 119$.

The memory 230 is coupled to the controller/processor 225. Part of the memory 230 could include a RAM, and another part of the memory 230 could include a Flash memory or other ROM.

Although FIG. 2 illustrates one example of eNB 102, various changes may be made to FIG. 2. For example, the eNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the eNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

In some embodiments, the RF transceiver 310 is capable of receiving a primary synchronization signal (PSS) and a secondary synchronization signal (SSS) over downlink channels.

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for CSI reporting on PUCCH. The processor 340 can move data into or out of the memory 360 as required by an executing process. In some embodiments, the processor 340 is configured to execute the applications 362 based on the OS 361 or in response to signals received from eNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

In some embodiments, the processor 340 is capable of determining the PSS including one of multiple PSS sequences that is generated based on a binary phase shift keying (BPSK) modulated length-127 M-sequence in a frequency domain, wherein the PSS includes part of cell identification (ID) information and the SSS including one of multiple SSS sequences that is generated based on multiple BPSK modulated length-127 M-sequences in the frequency domain, wherein the SSS includes the cell identification (ID) information.

In some embodiments, the processor 340 is capable of determining a number of PSS sequences corresponding to a number of cell ID hypotheses carried by PSS, respectively; and a number of SSS sequences corresponding to the number of cell ID hypotheses carried by the PSS and SSS, respectively.

In some embodiments, the processor 340 is capable of determining a polynomial for an M-sequence generating the PSS sequence, a cyclic shift for the M-sequence based on the cell ID information carried by PSS, and generating the PSS sequence by performing the cyclic shift to the M-sequence for a cell ID.

In some embodiments, the processor 340 is capable of determining a polynomial for a first M-sequence generating the SSS sequence, a first cyclic shift for the first M-sequence based on the cell ID information carried by PSS and SSS, the polynomial for a second M-sequence generating the SSS sequence, a second cyclic shift for the second M-sequence based on the cell ID information carried by PSS and SSS, and generating the SSS sequence by performing a product of the first and second M-sequences, wherein each of the first and second M-sequences is generated by the first and second cyclic shifts, respectively, for the cell ID.

In such embodiments, the polynomial for the M-sequence is given by $x^7+x^4+1$ and a corresponding recursive construction scheme is given by $d_M(i+7)=[d_M(i+4)+d_M(i)]\mod 2$, $0 \leq i \leq 119$, the polynomial for the first M-sequence is given by $x^7+x^4+1$ and a corresponding recursive construction scheme is given by $d_M(i+7)=[d_M(i+4)+d_M(i)]\mod 2$, $0 \leq i \leq 119$, and the polynomial for the second M-sequence is given by $x^7+x+1$ and a corresponding recursive construction scheme is given by $d_M(i+7)=[d_M(i+1)+d_M(i)]\mod 2$, $0 \leq i \leq 119$.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
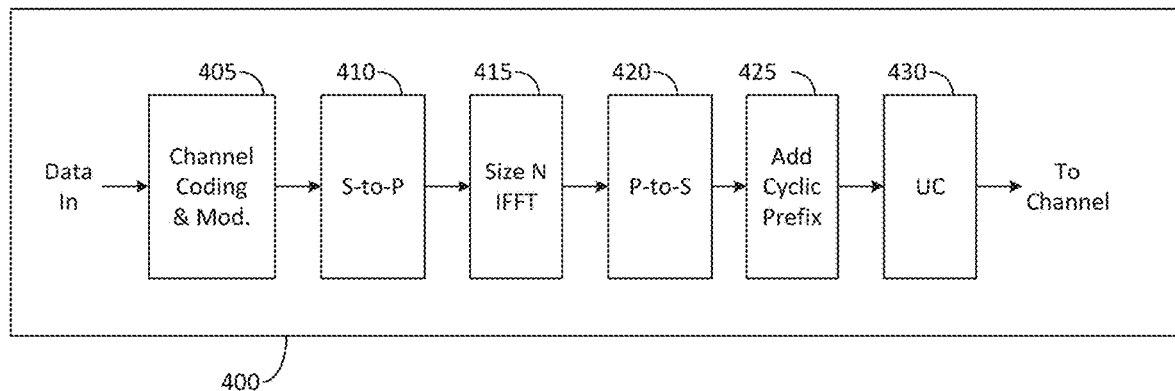
FIG. 4A illustrates a high-level diagram of an orthogonal frequency division multiple access transmit path according to embodiments of the present disclosure.
Figure 4B:
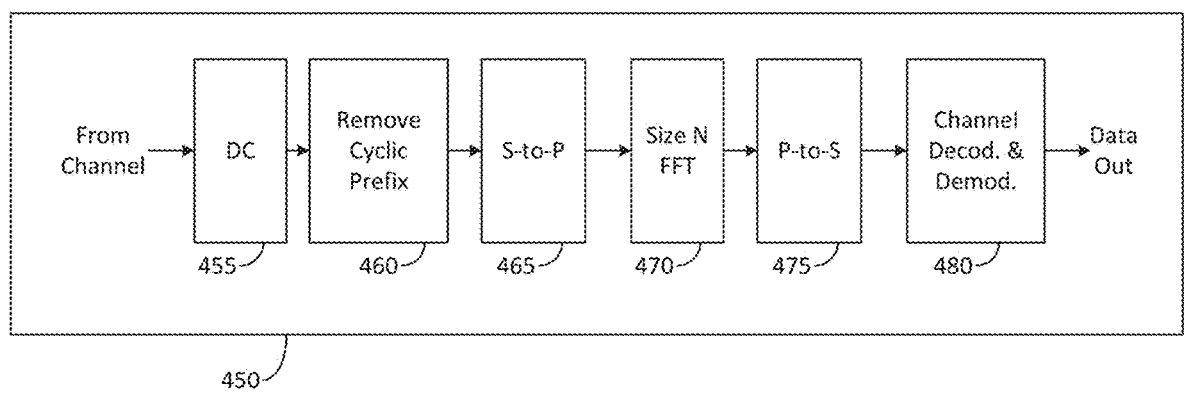
FIG. 4B illustrates a high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (eNB) 102 or a relay station, and the receive path circuitry may be implemented in a user equipment (e.g. user equipment 116 of FIG. 1). In other examples, for uplink communication, the receive path circuitry 450 may be implemented in a base station (e.g. eNB 102 of FIG. 1) or a relay station, and the transmit path circuitry may be implemented in a user equipment (e.g. user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at UE 116 after passing through the wireless channel, and reverse operations to those at eNB 102 are performed. Down-converter 455 down-converts the received signal to baseband frequency, and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of eNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to eNBs 101-103 and may implement a receive path corresponding to the architecture for receiving in the downlink from eNBs 101-103.

5G communication system use cases have been identified and described. Those use cases can be roughly categorized into three different groups. In one example, enhanced mobile broadband (eMBB) is determined to do with high bits/sec requirement, with less stringent latency and reliability requirements. In another example, ultra reliable and low latency (URLL) is determined with less stringent bits/sec requirement. In yet another example, massive machine type communication (mMTC) is determined that a number of devices can be as many as 100,000 to 1 million per km2, but the reliability/throughput/latency requirement could be less stringent. This scenario may also involve power efficiency requirement as well, in that the battery consumption should be minimized as possible.

A communication system includes a Downlink (DL) that conveys signals from transmission points such as Base Stations (BSs) or NodeBs to User Equipments (UEs) and an Uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB, which is generally a fixed station, may also be referred to as an access point or other equivalent terminology. For LTE systems, a NodeB is often referred as an eNodeB.

In a communication system, such as LTE system, DL signals can include data signals conveying information content, control signals conveying DL control information (DCI), and reference signals (RS) that are also known as pilot signals. An eNodeB transmits data information through a physical DL shared channel (PDSCH). An eNodeB transmits DCI through a physical DL control channel (PDCCH) or an Enhanced PDCCH (EPDCCH).

An eNodeB transmits acknowledgement information in response to data transport block (TB) transmission from a UE in a physical hybrid ARQ indicator channel (PHICH). An eNodeB transmits one or more of multiple types of RS including a UE-common RS (CRS), a channel state information RS (CSI-RS), or a demodulation RS (DMRS). A CRS is transmitted over a DL system bandwidth (BW) and can be used by UEs to obtain a channel estimate to demodulate data or control information or to perform measurements. To reduce CRS overhead, an eNodeB may transmit a CSI-RS with a smaller density in the time and/or frequency domain than a CRS. DMRS can be transmitted only in the BW of a respective PDSCH or EPDCCH and a UE can use the DMRS to demodulate data or control information in a PDSCH or an EPDCCH, respectively. A transmission time interval for DL channels is referred to as a subframe and can have, for example, duration of 1 millisecond.

DL signals also include transmission of a logical channel that carries system control information. A BCCH is mapped to either a transport channel referred to as a broadcast channel (BCH) when the DL signals convey a master information block (MIB) or to a DL shared channel (DL-SCH) when the DL signals convey a System Information Block (SIB). Most system information is included in different SIBs that are transmitted using DL-SCH. A presence of system information on a DL-SCH in a subframe can be indicated by a transmission of a corresponding PDCCH conveying a codeword with a cyclic redundancy check (CRC) scrambled with special system information RNTI (SI-RNTI). Alternatively, scheduling information for a SIB transmission can be provided in an earlier SIB and scheduling information for the first SIB (SIB-1) can be provided by the MIB.

DL resource allocation is performed in a unit of subframe and a group of physical resource blocks (PRBs). A transmission BW includes frequency resource units referred to as resource blocks (RBs). Each RB includes $N_{sc}^{RB}$ sub-carriers, or resource elements (REs), such as 12 REs. A unit of one RB over one subframe is referred to as a PRB. A UE can be allocated $M_{PDSCH}$ RBs for a total of $M_{sc}^{PDSCH}=M_{PDSCH} \cdot N_{sc}^{RB}$ REs for the PDSCH transmission BW.

UL signals can include data signals conveying data information, control signals conveying UL control information (UCI), and UL RS. UL RS includes DMRS and Sounding RS (SRS). A UE transmits DMRS only in a BW of a respective PUSCH or PUCCH. An eNodeB can use a DMRS to demodulate data signals or UCI signals. A UE transmits SRS to provide an eNodeB with an UL CSI. A UE transmits data information or UCI through a respective physical UL shared channel (PUSCH) or a Physical UL control channel (PUCCH). If a UE needs to transmit data information and UCI in a same UL subframe, the UE may multiplex both in a PUSCH. UCI includes Hybrid Automatic Repeat request acknowledgement (HARQ-ACK) information, indicating correct (ACK) or incorrect (NACK) detection for a data TB in a PDSCH or absence of a PDCCH detection (DTX), scheduling request (SR) indicating whether a UE has data in the UE's buffer, rank indicator (RI), and channel state information (CSI) enabling an eNodeB to perform link adaptation for PDSCH transmissions to a UE. HARQ-ACK information is also transmitted by a UE in response to a detection of a PDCCH/EPDCCH indicating a release of semi-persistently scheduled PDSCH.

An UL subframe includes two slots. Each slot includes $N_{symb}^{UL}$ symbols for transmitting data information, UCI, DMRS, or SRS. A frequency resource unit of an UL system BW is a RB. A UE is allocated $N_{RB}$ RBs for a total of $N_{RB} \cdot N_{sc}^{RB}$ REs for a transmission BW. For a PUCCH, $N_{RB}=1$. A last subframe symbol can be used to multiplex SRS transmissions from one or more UEs. A number of subframe symbols that are available for data/UCI/DMRS transmission is $N_{symb}=2 \cdot (N_{symb}^{UL}-1)-N_{SRS}$, where $N_{SRS}=1$ if a last subframe symbol is used to transmit SRS and $N_{SRS}=0$ otherwise.

Figure 5:
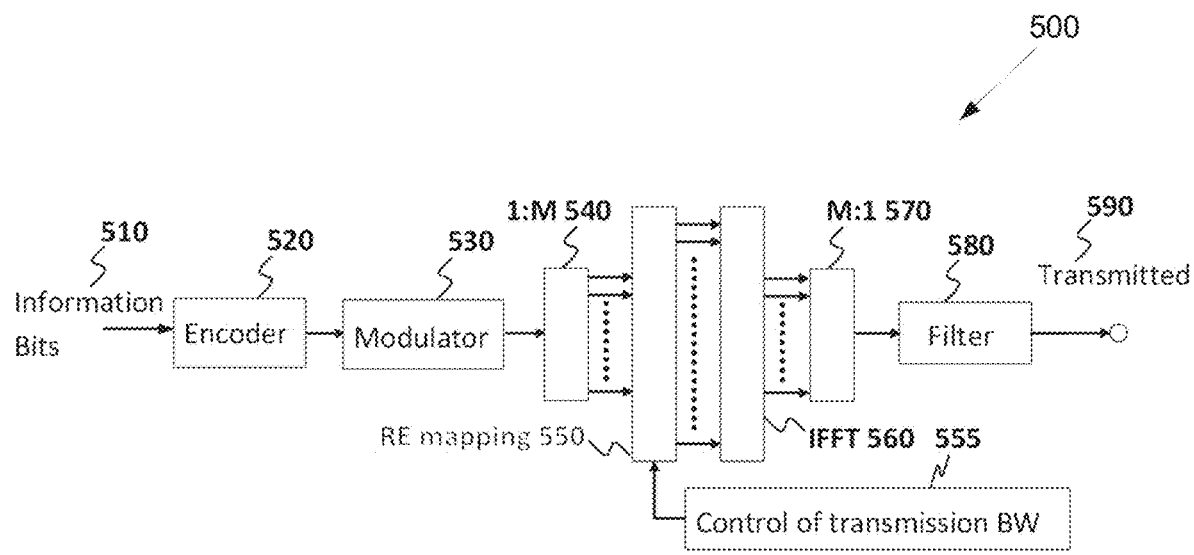
FIG. 5 illustrates a transmitter block diagram for a PDSCH in a subframe according to embodiments of the present disclosure.

FIG. 5 illustrates a transmitter block diagram 500 for a PDSCH in a subframe according to embodiments of the present disclosure. The embodiment of the transmitter block diagram 500 illustrated in FIG. 5 is for illustration only. FIG. 5 does not limit the scope of this disclosure to any particular implementation of the transmitter block diagram 500.

As shown in FIG. 5, information bits 510 are encoded by encoder 520, such as a turbo encoder, and modulated by modulator 530, for example using quadrature phase shift keying (QPSK) modulation. A serial to parallel (S/P) converter 540 generates M modulation symbols that are subsequently provided to a mapper 550 to be mapped to REs selected by a transmission BW selection unit 555 for an assigned PDSCH transmission BW, unit 560 applies an Inverse fast Fourier transform (IFFT), the output is then serialized by a parallel to serial (P/S) converter 570 to create a time domain signal, filtering is applied by filter 580, and a signal transmitted 590. Additional functionalities, such as data scrambling, cyclic prefix insertion, time windowing, interleaving, and others are well known in the art and are not shown for brevity.

Figure 6:
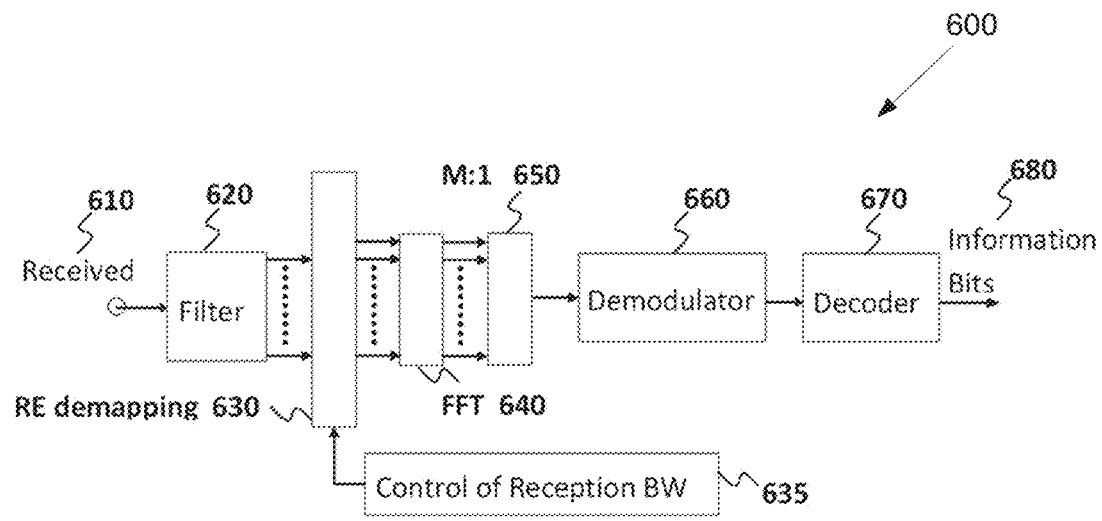
FIG. 6 illustrates a receiver block diagram for a PDSCH in a subframe according to embodiments of the present disclosure.

FIG. 6 illustrates a receiver block diagram 600 for a PDSCH in a subframe according to embodiments of the present disclosure. The embodiment of the diagram 600 illustrated in FIG. 6 is for illustration only. FIG. 6 does not limit the scope of this disclosure to any particular implementation of the diagram 600.

As shown in FIG. 6, a received signal 610 is filtered by filter 620, REs 630 for an assigned reception BW are selected by BW selector 635, unit 640 applies a fast Fourier transform (FFT), and an output is serialized by a parallel-to-serial converter 650. Subsequently, a demodulator 660 coherently demodulates data symbols by applying a channel estimate obtained from a DMRS or a CRS (not shown), and a decoder 670, such as a turbo decoder, decodes the demodulated data to provide an estimate of the information data bits 680. Additional functionalities such as time-windowing, cyclic prefix removal, de-scrambling, channel estimation, and de-interleaving are not shown for brevity.

Figure 7:
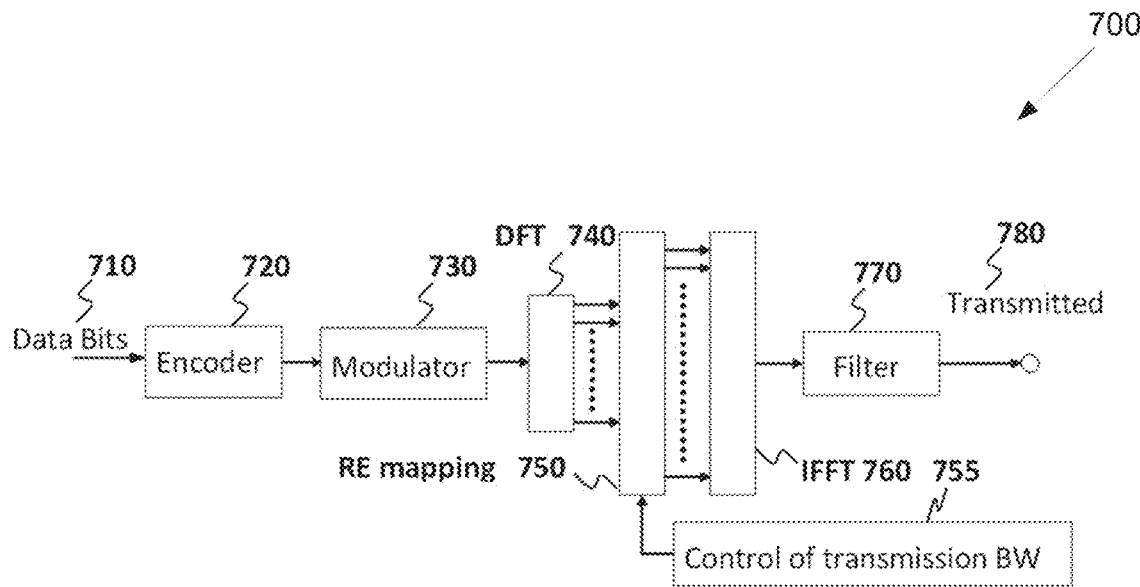
FIG. 7 illustrates a transmitter block diagram for a PUSCH in a subframe according to embodiments of the present disclosure.

FIG. 7 illustrates a transmitter block diagram 700 for a PUSCH in a subframe according to embodiments of the present disclosure. The embodiment of the block diagram 700 illustrated in FIG. 7 is for illustration only. FIG. 7 does not limit the scope of this disclosure to any particular implementation of the block diagram 700.

As shown in FIG. 7, information data bits 710 are encoded by encoder 720, such as a turbo encoder, and modulated by modulator 730. A discrete Fourier transform (DFT) unit 740 applies a DFT on the modulated data bits, REs 750 corresponding to an assigned PUSCH transmission BW are selected by transmission BW selection unit 755, unit 760 applies an IFFT and, after a cyclic prefix insertion (not shown), filtering is applied by filter 770 and a signal transmitted 780.

Figure 8:
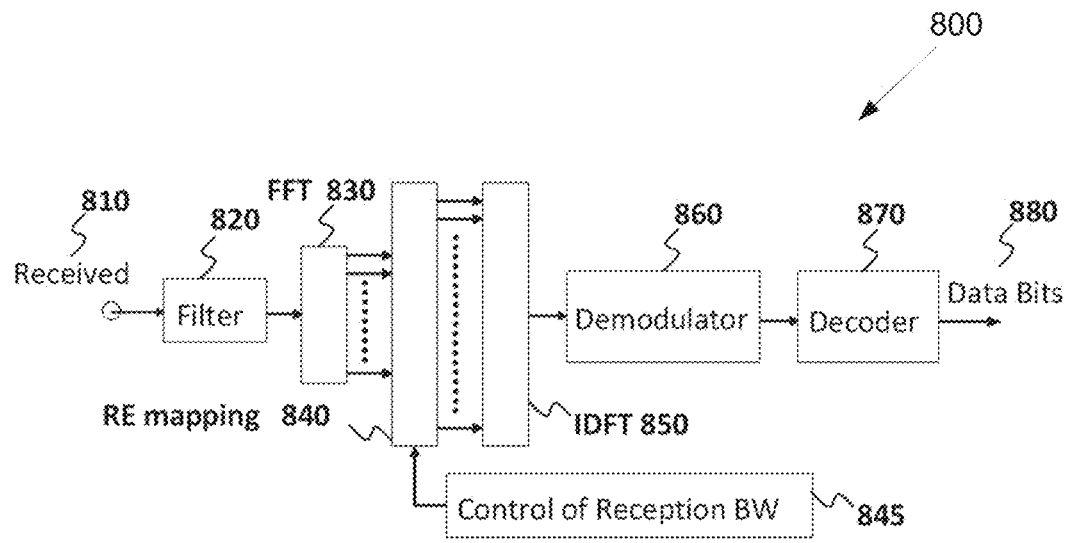
FIG. 8 illustrates a receiver block diagram for a PUSCH in a subframe according to embodiments of the present disclosure.

FIG. 8 illustrates a receiver block diagram 800 for a PUSCH in a subframe according to embodiments of the present disclosure. The embodiment of the block diagram 800 illustrated in FIG. 8 is for illustration only. FIG. 8 does not limit the scope of this disclosure to any particular implementation of the block diagram 800.

As shown in FIG. 8, a received signal 810 is filtered by filter 820. Subsequently, after a cyclic prefix is removed (not shown), unit 830 applies a FFT, REs 840 corresponding to an assigned PUSCH reception BW are selected by a reception BW selector 845, unit 850 applies an inverse DFT (IDFT), a demodulator 860 coherently demodulates data symbols by applying a channel estimate obtained from a DMRS (not shown), a decoder 870, such as a turbo decoder, decodes the demodulated data to provide an estimate of the information data bits 880.

In next generation cellular systems, various use cases are envisioned beyond the capabilities of LTE system. Termed 5G or the fifth generation cellular system, a system capable of operating at sub-6 GHz and above-6 GHz (for example, in mmWave regime) becomes one of the requirements. In 3GPP TR 22.891, 74 5G use cases has been identified and described; those use cases can be roughly categorized into three different groups. A first group is termed 'enhanced mobile broadband' (eMBB), targeted to high data rate services with less stringent latency and reliability requirements. A second group is termed "ultra-reliable and low latency (URLL)" targeted for applications with less stringent data rate requirements, but less tolerant to latency. A third group is termed "massive MTC (mMTC)" targeted for large number of low-power device connections such as 1 million per km² with less stringent the reliability, data rate, and latency requirements.

In order for the 5G network to support such diverse services with different quality of services (QoS), one method has been identified in LTE specification, called network slicing. To utilize PHY resources efficiently and multiplex various slices (with different resource allocation schemes, numerologies, and scheduling strategies) in DL-SCH, a flexible and self-contained frame or subframe design is utilized.

Figure 9:
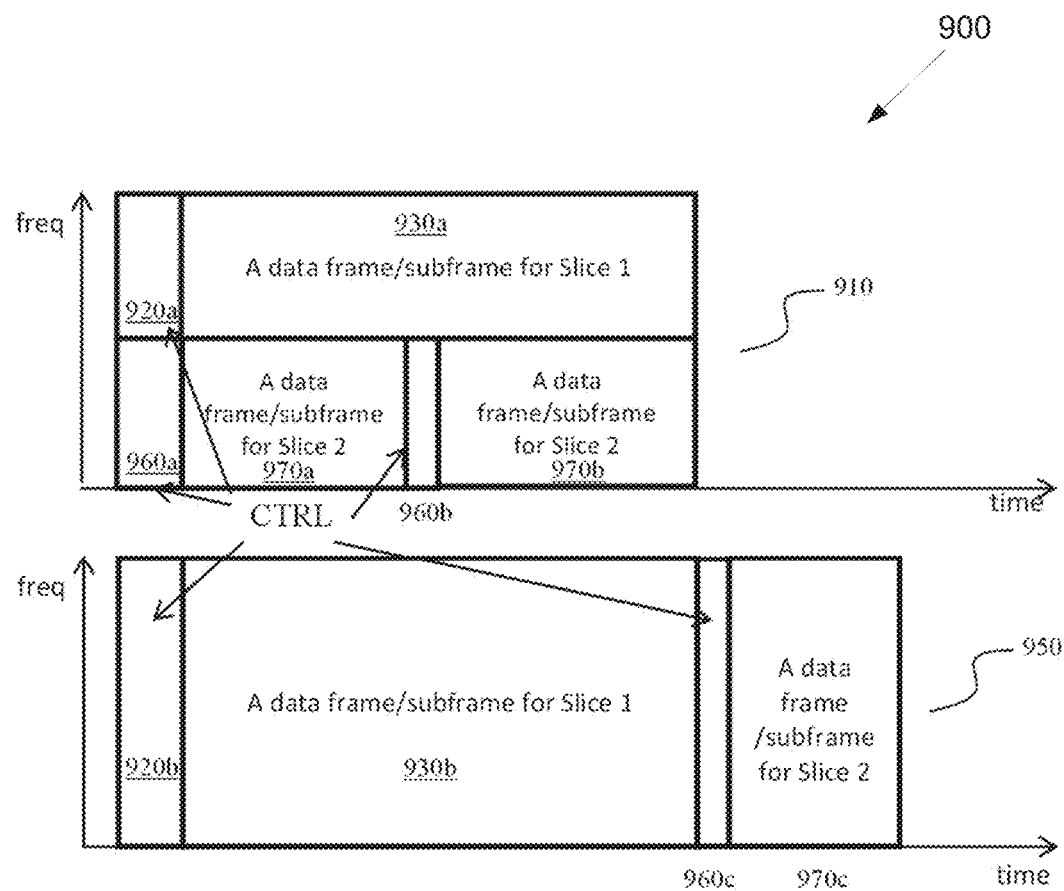
FIG. 9 illustrates an example multiplexing of two slices according to embodiments of the present disclosure.

FIG. 9 illustrates an example multiplexing of two slices 900 according to embodiments of the present disclosure. The embodiment of the multiplexing of two slices 900 illustrated in FIG. 9 is for illustration only. FIG. 9 does not limit the scope of this disclosure to any particular implementation of the multiplexing of two slices 900.

Two exemplary instances of multiplexing two slices within a common subframe or frame are depicted in FIG. 9. In these exemplary embodiments, a slice can be composed of one or two transmission instances where one transmission instance includes a control (CTRL) component (e.g., 920a, 960a, 960b, 920b, or 960c) and a data component (e.g., 930a, 970a, 970b, 930b, or 970c). In embodiment 910, the two slices are multiplexed in frequency domain whereas in embodiment 950, the two slices are multiplexed in time domain. These two slices can be transmitted with different sets of numerology.

LTE specification supports up to 32 CSI-RS antenna ports which enable an eNB to be equipped with a large number of antenna elements (such as 64 or 128). In this case, a plurality of antenna elements is mapped onto one CSI-RS port. For next generation cellular systems such as 5G, the maximum number of CSI-RS ports can either remain the same or increase.

Figure 10:
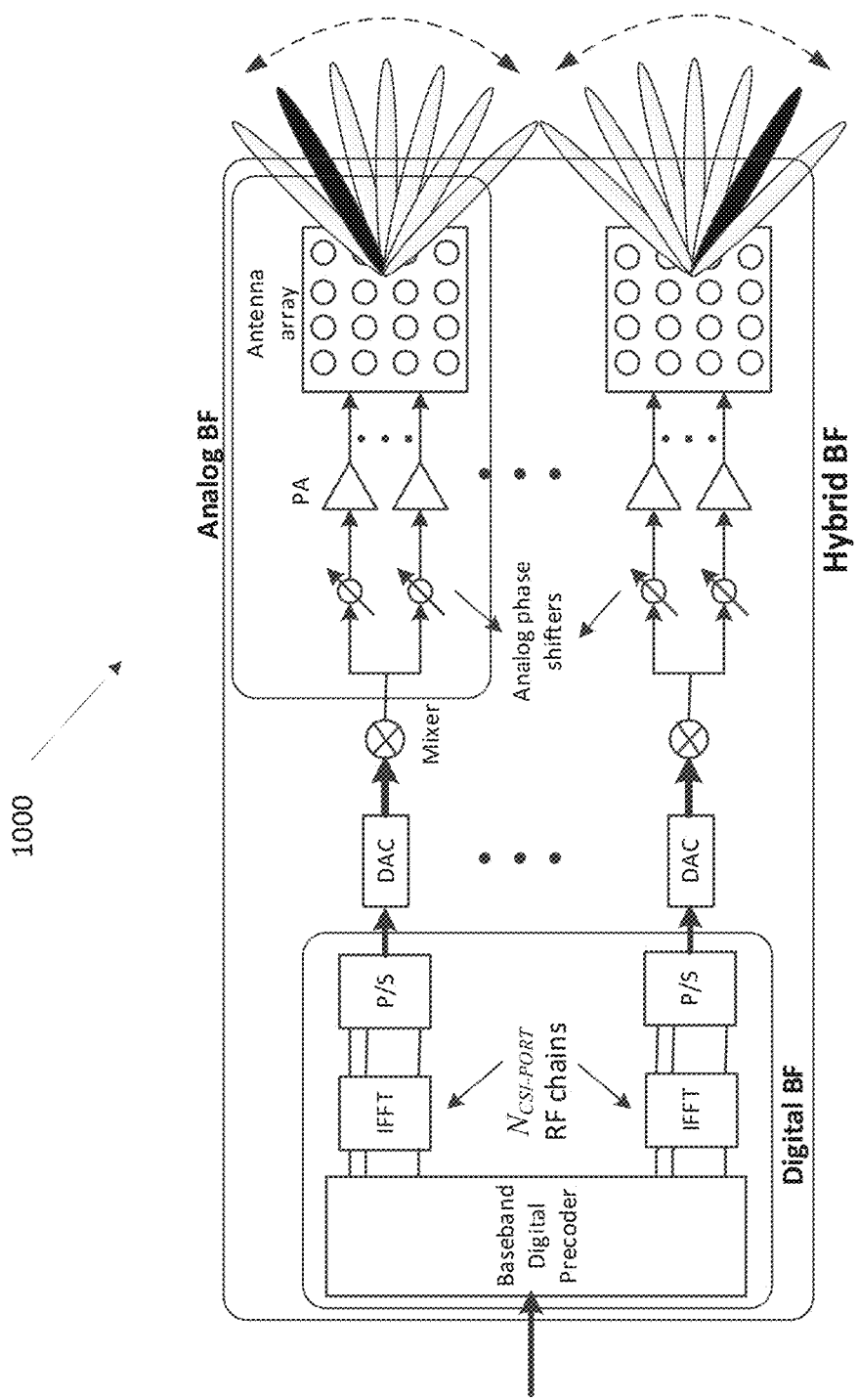
FIG. 10 illustrates an example antenna blocks according to embodiments of the present disclosure.

FIG. 10 illustrates an example antenna blocks 1000 according to embodiments of the present disclosure. The embodiment of the antenna blocks 1000 illustrated in FIG.

10 is for illustration only. FIG. 10 does not limit the scope of this disclosure to any particular implementation of the antenna blocks 1000.

For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 10. In this case, one CSI-RS port is mapped onto a large number of antenna elements which can be controlled by a bank of analog phase shifters. One CSI-RS port can then correspond to one sub-array which produces a narrow analog beam through analog beamforming. This analog beam can be configured to sweep across a wider range of angles by varying the phase shifter bank across symbols or subframes. The number of sub-arrays (equal to the number of RF chains) is the same as the number of CSI-RS ports $N_{CSI-PORT}$. A digital beamforming unit performs a linear combination across $N_{CSI-PORT}$ analog beams to further increase precoding gain. While analog beams are wideband (hence not frequency-selective), digital precoding can be varied across frequency sub-bands or resource blocks.

In a 3GPP LTE communication system, network access and radio resource management (RRM) are enabled by physical layer synchronization signals and higher (MAC) layer procedures. In particular, a UE attempts to detect the presence of synchronization signals along with at least one cell ID for initial access. Once the UE is in the network and associated with a serving cell, the UE monitors several neighboring cells by attempting to detect their synchronization signals and/or measuring the associated cell-specific RSs (for instance, by measuring their RSRPs). For next generation cellular systems such as 3GPP NR (new radio access or interface), efficient and unified radio resource acquisition or tracking mechanism which works for various use cases (such as eMBB, URLLC, mMTC, each corresponding to a different coverage requirement) and frequency bands (with different propagation losses) is desirable. Most likely designed with a different network and radio resource paradigm, seamless and low-latency RRM is also desirable. Such goals pose at least the following problems in designing an access, radio resource, and mobility management framework.

First, since NR is likely to support even more diversified network topology, the notion of cell can be redefined or replaced with another radio resource entity. As an example, for synchronous networks, one cell can be associated with a plurality of TRPs (transmit-receive points) similar to a COMP (coordinated multipoint transmission) scenario in LTE specification. In this case, seamless mobility is a desirable feature.

Second, when large antenna arrays and beamforming are utilized, defining radio resource in terms of beams (although possibly termed differently) can be a natural approach. Given that numerous beamforming architectures can be utilized, an access, radio resource, and mobility management framework which accommodates various beamforming architectures (or, instead, agnostic to beamforming architecture) is desirable.

Figure 11:
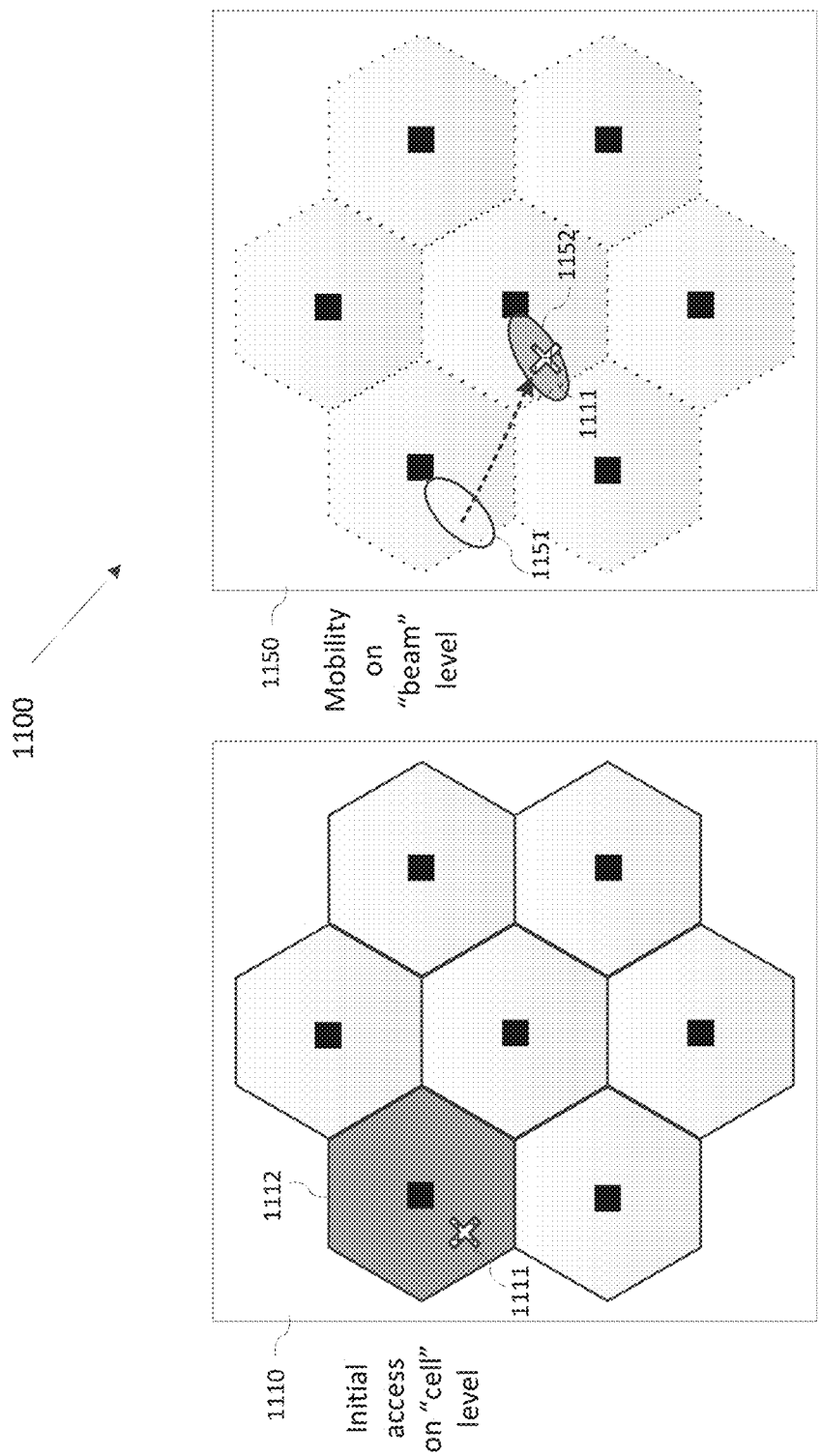
FIG. 11 illustrates an example UE mobility scenario according to embodiments of the present disclosure.

FIG. 11 illustrates an example UE mobility scenario 1100 according to embodiments of the present disclosure. The embodiment of the UE mobility scenario 1100 illustrated in FIG. 11 is for illustration only. FIG. 11 does not limit the scope of this disclosure to any particular implementation of the UE mobility scenario 1100.

For instance, the framework may be applicable for or agnostic to whether one beam is formed for one CSI-RS port (for instance, where a plurality of analog ports are connected to one digital port, and a plurality of widely separated digital ports are utilized) or one beam is formed by a plurality of CSI-RS ports. In addition, the framework may be applicable whether beam sweeping (as illustrated in FIG. 11) is used or not.

Third, different frequency bands and use cases impose different coverage limitations. For example, mmWave bands impose large propagation losses. Therefore, some form of coverage enhancement scheme is needed. Several candidates include beam sweeping (as shown in FIG. 10), repetition, diversity, and/or multi-TRP transmission. For mMTC where transmission bandwidth is small, time-domain repetition is needed to ensure sufficient coverage.

A UE-centric access which utilizes two levels of radio resource entity is described in FIG. 11. These two levels can be termed as "cell" and "beam". These two terms are exemplary and used for illustrative purposes. Other terms such as radio resource (RR) 1 and 2 can also be used. Additionally, the term "beam" as a radio resource unit is to be differentiated with, for instance, an analog beam used for beam sweeping in FIG. 10.

As shown in FIG. 11, the first RR level (termed "cell") applies when a UE enters a network and therefore is engaged in an initial access procedure. In 1110, a UE 1111 is connected to cell 1112 after performing an initial access procedure which includes detecting the presence of synchronization signals. Synchronization signals can be used for coarse timing and frequency acquisitions as well as detecting the cell identification (cell ID) associated with the serving cell. In this first level, the UE observes cell boundaries as different cells can be associated with different cell IDs. In FIG. 11, one cell is associated with one TRP (in general, one cell can be associated with a plurality of TRPs). Since cell ID is a MAC layer entity, initial access involves not only physical layer procedure(s) (such as cell search via synchronization signal acquisition) but also MAC layer procedure(s).

The second RR level (termed "beam") applies when a UE is already connected to a cell and hence in the network. In this second level, a UE 1111 can move within the network without observing cell boundaries as illustrated in embodiment 1150. That is, UE mobility is handled on beam level rather than cell level, where one cell can be associated with N beams (N can be 1 or >1). Unlike cell, however, beam is a physical layer entity. Therefore, UE mobility management is handled solely on physical layer. An example of UE mobility scenario based on the second level RR is given in embodiment 1150 of FIG. 11.

After the UE 1111 is associated with the serving cell 1112, the UE 1111 is further associated with beam 1151. This is achieved by acquiring a beam or radio resource (RR) acquisition signal from which the UE can acquire a beam identity or identification. An example of beam or RR acquisition signal is a measurement reference signal (RS). Upon acquiring a beam (or RR) acquisition signal, the UE 1111 can report a status to the network or an associated TRP. Examples of such report include a measured beam power (or measurement RS power) or a set of at least one recommended "beam identity (ID)" or "RR-ID". Based on this report, the network or the associated TRP can assign a beam (as a radio resource) to the UE 1111 for data and control transmission. When the UE 1111 moves to another cell, the boundary between the previous and the next cells is neither observed nor visible to the UE 1111. Instead of cell handover, the UE 1111 switches from beam 1151 to beam 1152. Such a seamless mobility is facilitated by the report from UE 711 to the network or associated TRP—especially when the UE 1111 reports a set of M>1 preferred beam identities by acquiring and measuring Mbeam (or RR) acquisition signals.

Figure 12:
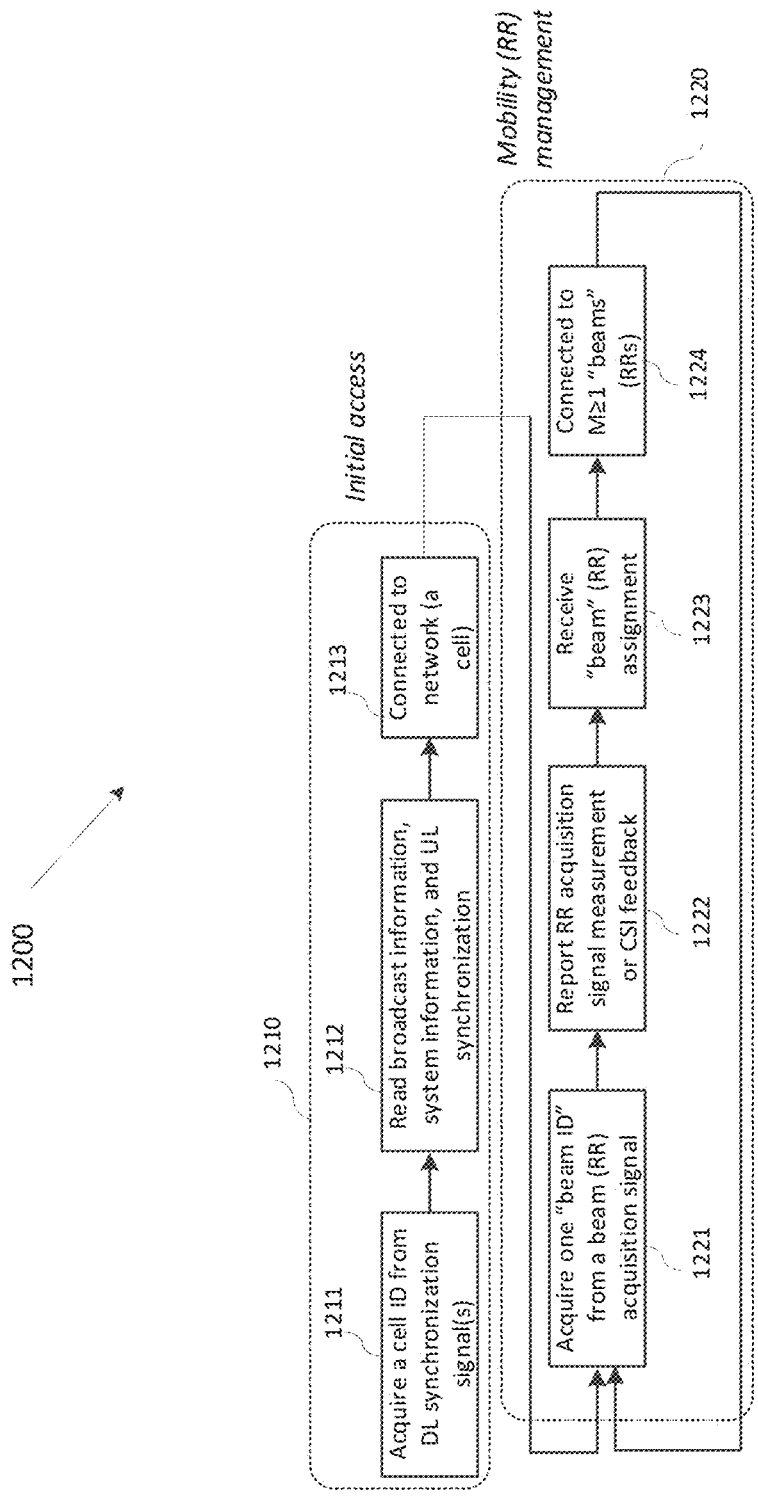
FIG. 12 illustrates an example beam sweeping operation according to embodiments of the present disclosure.

FIG. 12 illustrates an example beam sweeping operation 1200 according to embodiments of the present disclosure. The embodiment of the beam sweeping operation 1200 illustrated in FIG. 12 is for illustration only. FIG. 12 does not limit the scope of this disclosure to any particular implementation of the beam sweeping operation 1200.

As shown in FIG. 12, the aforementioned initial access procedure 1210 and the aforementioned mobility or radio resource management 1220 from the perspective of a UE are described. The initial access procedure 1210 includes cell ID acquisition from DL synchronization signal(s) 1211 as well as retrieval of broadcast information (along with system information required by the UE to establish DL and UL connections) followed by UL synchronization (which can include random access procedure). Once the UE completes 1211 and 1212, the UE is connected to the network and associated with a cell. Following the completion of initial access procedure, the UE, possibly mobile, is in an RRM state described in 1220. This state includes, first, an acquisition stage 1221 where the UE can periodically (repeatedly) attempt to acquire a "beam" or RR ID from a "beam" or RR acquisition signal (such as a measurement RS).

The UE can be configured with a list of beam/RR IDs to monitor. This list of "beam"/RR IDs can be updated or reconfigured by the TRP/network. This configuration can be signaled via higher-layer (such as RRC) signaling or a dedicated L1 or L2 control channel. Based on this list, the UE can monitor and measure a signal associated with each of these beam/RR IDs. This signal can correspond to a measurement RS resource such as that analogous to CSI-RS resource in LTE system. In this case, the UE can be configured with a set of K>1 CSI-RS resources to monitor. Several options are possible for measurement report 1222. First, the UE can measure each of the K CSI-RS resources, calculate a corresponding RS power (similar to RSRP or RSRQ in LTE system), and report the RS power to the TRP (or network). Second, the UE can measure each of the K CSI-RS resources, calculate an associated CSI (which can include CQI and potentially other CSI parameters such as RI and PMI), and report the CSI to the TRP (or network). Based on the report from the UE, the UE is assigned M≥1 "beams" or RRs either via a higher-layer (RRC) signaling or an L1/L2 control signaling 1223. Therefore the UE is connected to these M "beams"/RRs.

For certain scenarios such as asynchronous networks, the UE can fall back to cell ID based or cell-level mobility management similar to 3GPP LTE system. Therefore, only one of the two levels of radio resource entity (cell) is applicable. When a two-level ("cell" and "beam") radio resource entity or management is utilized, synchronization signal(s) can be designed primarily for initial access into the network. For mmWave systems where analog beam sweeping (as shown in FIG. 12) or repetition may be used for enhancing the coverage of common signals (such as synchronization signal(s) and broadcast channel), synchronization signals can be repeated across time (such as across OFDM symbols or slots or subframes). This repetition factor, however, is not necessarily correlated to the number of supported "beams" (defined as radio resource units, to be differentiated with the analog beams used in beam sweeping) per cell or per TRP. Therefore, beam identification (ID) is not acquired or detected from synchronization signal(s). Instead, beam ID is carried by a beam (RR) acquisition signal such as measurement RS. Likewise, beam (RR) acquisition signal does not carry cell ID (hence, cell ID is not detected from beam or RR acquisition signal).

Therefore, considering the above new challenges in initial access procedure and RRM for the new radio access technology (NR), there is a need for designing synchronization signals (along with their associated UE procedures) and primary broadcast channel which carries broadcast information (e.g., master information block or MIB).

In the present disclosure, numerology refers to a set of signal parameters which can include subframe duration, sub-carrier spacing, cyclic prefix length, transmission bandwidth, or any combination of these signal parameters.

For LTE, primary and secondary synchronization signals (PSS and SSS, respectively) are used for coarse timing and frequency synchronization and cell ID acquisition. Since PSS/SSS is transmitted twice per 10 ms radio frame and time-domain enumeration is introduced in terms of system frame number (SFN, included in the MIB), frame timing is detected from PSS/SSS to avoid the need for increasing the detection burden from PBCH.

In addition, cyclic prefix (CP) length and, if unknown, duplexing scheme can be detected from PSS/SSS. The PSS is constructed from a frequency-domain ZC sequence of length 63, with the middle element truncated to avoid using the d.c. subcarrier. Three roots are selected for PSS to represent the three physical layer identities within each group of cells. The SSS sequences are based on the maximum length sequences (also known as M-sequences). Each SSS sequence is constructed by interleaving two length-31 BPSK modulated sequences in frequency domain, where the two source sequences before modulation are different cyclic shifts of the same M-sequence.

The cyclic shift indices are constructed from the physical cell ID group. Since PSS/SSS detection can be faulty (due to, for instance, non-idealities in the auto- and cross-correlation properties of PSS/SSS and lack of CRC protection), cell ID hypotheses detected from PSS/SSS may occasionally be confirmed via PBCH detection. PBCH is primarily used to signal the master block information (MIB) which consists of DL and UL system bandwidth information (3 bits), PHICH information (3 bits), and SFN (8 bits). Adding 10 reserved bits (for other uses such as MTC), the MIB payload amounts to 24 bits.

After appended with a 16-bit CRC, a rate-1/3 tail-biting convolutional coding, 4× repetition, and QPSK modulation are applied to the 40-bit codeword. The resulting QPSK symbol stream is transmitted across 4 subframes spread over 4 radio frames. Other than detecting MIB, blind detection of the number of CRS ports is also needed for PBCH. In LTE, the 8-bit SFN in the PBCH is the most significant bit (MSB) and updated every 40 ms. The 2-bit least significant bit (LSB) of radio frame number is not explicitly indicated in PBCH payload. The UE relies on the blind detection of 4 possible phases for the PBCH scrambling code to identify the LSB so that the four times of NR-PBCH transmission can be coherently combined within 40 ms.

The essential system information indicated by LTE eNB over logical channel in the BCH or DL SCH. There are two parts in SI static part and dynamic part. Static part is called as MIB and is transmitted using BCH and carried by PBCH once every 40 ms. MIB carries useful information which includes channel bandwidth, PHICH configuration details; transmit power, no. of antennas and SIB scheduling information transmitted along with other information on the DL-SCH. Dynamic part is called as SIB and is mapped on RRCSI messages (SI-1, 2, 3, 4, 5, 6, 7, 8, 9, 10, 11) over DL-SCH and transmitted using PDSCH at periodic intervals. SI-1 transmitted every 80 ms, SI-2 every 160 ms and SI-3 every 320 ms. System Information Blocks are grouped in SI containers. Each SI is composed of multiple SIB s. Each SI usually may have different transmission frequency and may be sent in a single sub-frame. SIBs are transmitted using BCCH mapped on DL-SCH which in turn mapped on PDSCH.

However, the NR's carrier frequency as well as bandwidth is different. For NR, the transmission bandwidth containing synchronization signals and PBCH is supposed to be larger than LTE. Moreover, the conventional periodic CRS may not be available as LTE. The NR requires new designs, as well as the corresponding transmission schemes.

NR defines at least two types of synchronization signals; NR-PSS and NR-SSS. NR-PSS is defined at least for initial symbol boundary synchronization to the NR cell. NR-SSS is defined for detection of NR cell ID or at least part of NR cell ID. At least one broadcast channel (NR-PBCH) is defined. NR-PBCH is a non-scheduled broadcast channel carrying at least a part of minimum system information with fixed payload size and periodicity predefined in the specification depending on carrier frequency range.

In both single beam and multi-beam scenario, time division multiplexing of PSS, SSS, and PBCH is supported. NR-PSS, NR-SSS and NR-PBCH can be transmitted within a SS block. For a given frequency band, an SS block corresponds to N OFDM symbols based on the default subcarrier spacing, and N is a constant. The signal multiplexing structure is fixed in a specification. A UE may be able to identify at least OFDM symbol index, slot index in a radio frame and radio frame number from an SS block.

In an SS block, there are at least two types of synchronization signals: NR-PSS and NR-SSS. NR-PSS is defined for initial symbol boundary synchronization to the NR cell and NR-SSS is defined for detecting NR cell ID or at least part of cell ID. There are at most (N-2) NR-PBCH symbol(s) in a SS block. Also, the UE monitoring bandwidth for NR-PBCH decoding may be limited considering the complexity and power consumption in cell (re)selection procedure in IDLE mode. Same or slightly wider bandwidth compared with NR-PSS/SSS can be considered as baseline.

In one embodiment, LBT parameters configuration for wideband operation of NE unlicensed can be provided.

An NR in licensed spectrum supports flexible subcarrier spacing (SCS) with a maximum channel bandwidth per component carrier of up to 400 MHz for above-6 GHz bands and 100 MHz for below-6 GHz bands. Subject to the available spectrum in unlicensed bands, the supported maximum channel bandwidth of NR system operating in unlicensed bands may be much wider compared to LTE-LAA, where the channel bandwidth per component carrier is up to 20 MHz. Since NR unlicensed system supports such wideband operations along with other new features such as the multi-beam operations, the wideband LBT design is essential to achieve an efficient spectrum utilization. In such embodiment, the important design considerations such as the parameter configurations of the wideband LBT are detailed.

One important design consideration of the wideband LBT is the number of intended transmit beam directions (i.e., spatial TX parameters) over the entire wideband from the prospective transmitter.

In one embodiment, the prospective transmitter can intend to transmit on the same beam direction (i.e., spatial TX parameter) over the wideband. In one example of this embodiment, this scenario happens when there is only one receiver scheduled. In another example of this embodiment, this scenario happens when there are multiple receivers scheduled and that the multiple receivers can receive from the same beam direction of the transmitter. In another example of this embodiment, this scenario happens when the transmitter transmits broadcast and/or control information. In another example of this embodiment, this scenario happens when the transmitter transmits omni-directionally.

In another embodiment, the prospective transmitter can intend to transmit over one or more than one beam directions (i.e., spatial TX parameters) over the wideband. In one example of this embodiment, this scenario happens when one or multiple receivers are scheduled, and the transmitter supports hybrid/digital beamforming and/or multi-panels, such that the transmitter can transmit in multiple beam directions (i.e., spatial TX parameters) simultaneously either over the same frequency resources or different frequency resources. In another example of this embodiment, a unified wideband LBT solution can be designed for this scenario, such that the scenario in the first embodiment can be covered as a special case.

FIG. 13A illustrates an example single beam direction over wideband 1300 according to embodiments of the present disclosure. The embodiment of the beam direction over wideband 1300 illustrated in FIG. 13A is for illustration only. FIG. 13A does not limit the scope of this disclosure to any particular implementation.

FIG. 13B illustrates an example multiple beam direction over wideband 1350 according to embodiments of the present disclosure. The embodiment of the beam direction over wideband 1350 illustrated in FIG. 13B is for illustration only. FIG. 13B does not limit the scope of this disclosure to any particular implementation.

Another important design consideration of the wideband LBT is the frequency unit to perform LBT over the wideband and the frequency range of the corresponding wideband. The frequency unit defines for the wideband NR unlicensed system, the minimum frequency unit over which a separate LBT process may be performed (e.g., the frequency-domain granularity for wideband LBT operation); while the frequency range of the corresponding wideband defines the frequency span of the wideband wherein the wideband LBT operation may be performed over with.

In a first embodiment, the frequency unit to perform LBT can be the entire wideband. In one example of this embodiment, the wideband can refer to the carrier bandwidth, and a single wideband LBT can be performed over the entire carrier bandwidth. In another example of this embodiment, the wideband can refer to a wideband bandwidth part (BWP), and a single wideband LBT can be performed over the entire BWP. This embodiment is simple to implement and can fully utilize the entire wideband if LBT succeeds. However, the wideband LBT can also be failed due to interfering transmissions over only certain sub-band(s), such as an LTE-LAA or Wi-Fi transmission with 20 MHz bandwidth. In this case, the entire wideband may not be utilized, which is inefficient in terms of spectrum utilization.

In a second embodiment, the frequency unit to perform LBT can be partial bandwidth of the entire wideband, where the partial bandwidth can be a sub-band with fixed bandwidth defined in the spec. In an example of this embodiment, for sub-7 GHz NR unlicensed system, the sub-band bandwidth can be chosen as 20 MHz, e.g., the bandwidth of a component carrier for LTE-LAA and Wi-Fi.

In another example of this embodiment, for above-7 GHz NR unlicensed system, the sub-band bandwidth can be chosen as of one of the followings: 40 MHz, 80 MHz, 100 MHz, 200 MHz, 400 MHz, 270 MHz, 540 MHz, 1080 MHz, and/or 2160 MHz.

In another example of this embodiment, the wideband can be the carrier bandwidth of NR-U. In one instance of this example, this embodiment indicates the NR-U transmitter may perform LBT with a frequency-domain granularity of each sub-band within the entire carrier bandwidth, and the sub-band(s) that pass the respective LBT can be potentially utilized for transmission.

In another example of this embodiment, the wideband can be a configured bandwidth part (BWP). In one instance of this example, the wideband BWP can be in integer multiple of 20 MHz in sub-7 GHz unlicensed band. In another instance of this example, in above-7 GHz unlicensed band, the wideband BWP can be in integer multiple of one of the followings: 40 MHz, 80 MHz, 100 MHz, 200 MHz, 400 MHz, 270 MHz, 540 MHz, 1080 MHz, and/or 2160 MHz.

In yet another instance of this example, this embodiment indicates the NR-U transmitter can perform LBT with a frequency-domain granularity of each sub-band within a single wideband BWP, wherein the wideband BWP can be an activated BWP for DL or UL operation, and the sub-band(s) that pass the respective LBT within the BWP can be potentially utilized for transmission.

In yet another instance of this embodiment, the NR-U transmitter can perform parallel LBT processes over multiple BWPs, wherein the multiple BWPs can be the configured BWPs and/or activated BWPs for the same UE for either DL operation or UL operation, or the multiple BWPs can be the configured BWPs and/or activated BWPs for multiple UEs for DL operation. In this instance, the sub-band LBT of this embodiment on each BWP can be performed independently, such as when the multiple BWPs are non-overlapping with each other; and for common sub-band that is shared by more than one BWPs, a single LBT process can be maintained on this sub-band, which can be potentially used for transmission if LBT is successful on this sub-band.

In a third embodiment, the frequency unit to perform LBT can be partial bandwidth of the entire wideband, where the partial bandwidth can be a sub-band with configurable bandwidth. In one example of this embodiment, the bandwidth of each sub-band can be defined by radio resource control (RRC) configuration or up to the higher layer to configure. In one instance of this example, for sub-7 GHz NR unlicensed system, the configurable sub-band bandwidth can be chosen as integer multiples of 20 MHz. In another instance of this example, for above-7 GHz NR unlicensed system, the configurable sub-band bandwidth can be chosen as of an integer multiple of one of the followings: 40 MHz, 80 MHz, 100 MHz, 200 MHz, 400 MHz, 270 MHz, 540 MHz, 1080 MHz, 2160 MHz.

In another example of this embodiment, the wideband can be the carrier bandwidth of NR-U. In one instance of this example, this embodiment indicates the NR-U transmitter may perform LBT with a frequency-domain granularity of each sub-band within the entire carrier bandwidth, and the sub-band(s) that pass the respective LBT can be potentially utilized for transmission.

In yet another example of this embodiment, the wideband can be a configured bandwidth part (BWP). In one instance of this example, the wideband BWP can be in integer multiple of 20 MHz in sub-7 GHz unlicensed band. In another instance of this example, in above-7 GHz unlicensed band, the wideband BWP can be in integer multiple of one of the followings: 40 MHz, 80 MHz, 100 MHz, 200 MHz, 400 MHz, 270 MHz, 540 MHz, 1080 MHz, and/or 2160 MHz.

In yet another instance of this example, this embodiment indicates the NR-U transmitter can perform LBT with a frequency-domain granularity of each sub-band within a single wideband BWP, wherein the wideband BWP can be an activated BWP for DL or UL operation, and the sub-band(s) that pass the respective LBT within the BWP can be potentially utilized for transmission.

In yet another instance of this embodiment, the NR-U transmitter can perform parallel LBT processes over multiple BWPs, wherein the multiple BWPs can be the configured BWPs and/or activated BWPs for the same UE for either DL operation or UL operation, or the multiple BWPs can be the configured BWPs and/or activated BWPs for multiple UEs for DL operation. In this instance, the sub-band LBT of this embodiment on each BWP can be performed independently, such as when the multiple BWPs are non-overlapping with each other; and for common sub-band that is shared by more than one BWPs, a single LBT process can be maintained on this sub-band, which can be potentially used for transmission if LBT is successful on this sub-band.

In a forth embodiment, the frequency unit to perform LBT can be partial bandwidth of the entire wideband, where the partial bandwidth can be a carrier bandwidth part (BWP). In one example of this embodiment, the BWP that passes the LBT can be potentially utilized for transmission. In another example of this embodiment, the wideband can be the carrier bandwidth of the NR-U transmitter. In yet another example of this embodiment, the NR-U transmitter can perform LBT over a single BWP, wherein the BWP can be an activated BWP for either DL or UL operation, and this BWP can be potentially utilized for transmission if LBT passed on this BWP.

In yet another example of this embodiment, for a downlink operation, a gNB can perform separate LBT processes over multiple BWPs, wherein the multiple BWPs can be the configured BWPs or activated BWPs for the same or different UEs, and that different BWPs could be of same or different bandwidth and can be partially overlapping in the frequency domain; and the BWP(s) that have passed the LBT can be potentially utilized for transmission.

In one instance of this example, the gNB can perform multiple LBT processes over the activated BWPs associated with different UEs of the gNB, and the activated BWP(s) that have passed LBT can be utilized for downlink transmission. In another instance of this example, the gNB can perform multiple LBT processes over the configured/activated BWPs associated with the same UE, and one of the BWP(s) that has passed LBT can be utilized for downlink transmission, with the current activated BWP of the UE can be prioritized to be chosen as the BWP for downlink transmission.

In yet another instance of this example, the gNB can perform multiple LBT processes over the configured/activated BWPs associated with the same UE, and all the BWP(s) that have passed LBT can be utilized for downlink transmission. For this instance, multiple activated BWPs may need to be configured to the UE.

In yet another example of this embodiment, for uplink operation, the UE can perform LBT process over multiple BWPs, wherein the multiple BWPs can be the configured BWPs or activated BWPs for the UE, and that different BWPs could be of same or different bandwidth and can be partially overlapping in the frequency domain; and the BWP(s) that have passed the LBT can be potentially utilized for transmission. In one instance of this example, the UE can perform multiple LBT processes over the UE's configured BWPs, and one of the BWP(s) that has passed LBT can be utilized for uplink transmission, with the current activated BWP of the UE being prioritized to be chosen as the BWP for uplink transmission.

In yet another instance of this example, the UE can perform multiple LBT processes over the configured/activated BWPs, and all the BWP(s) that have passed LBT can be utilized for uplink transmission. For this instance, multiple activated BWPs may need to be supported by the UE.

In yet another embodiment, for the frequency units chosen according to one of the first embodiment to the forth embodiment in the aforementioned embodiments, the different frequency units for the LBT process for wideband operation can be non-consecutive and/or partially overlapping in the frequency domain. In one example of this embodiment, when the frequency unit is a BWP and the wideband is the entire carrier bandwidth, different frequency units (i.e., BWPs) within the carrier can be non-consecutive and/or partially overlapping in the frequency domain.

In yet another embodiment, if the frequency unit to perform LBT is partial bandwidth, the actual bandwidth to perform a separate LBT process can be of one or multiple of the frequency units (i.e., the bandwidth to perform different LBT processes can be different), or the frequency unit can be defined with unequal size.

In yet another embodiment, if the frequency unit to perform LBT is partial bandwidth of the entire wideband, then NR-U transmitter can perform the LBT operation on every frequency unit within the entire wideband, or a subset of all the frequency units within the entire wideband.

In one example of this embodiment, the NR-U transmitter can determine a subset of all the frequency units within the entire wideband for the LBT operation, wherein the NR-U transmitter intends to transmit over the subset of all the frequency units that is chosen upon successful LBT operation; while the NR-U transmitter does not need to perform LBT operation over the frequency unit(s) within the wideband wherein the NR-U transmitter does not intend to transmit. In one instance of this example, for DL operation, the gNB can only choose to perform LBT operation over the frequency units within the wideband wherein downlink signals/channels are intended to be transmitted. In another instance of this example, for UL operation, the UE can only choose to perform LBT operation over the frequency units within the wideband (e.g., active BWP of the UE) wherein uplink signals/channels are allocated for the UE.

In yet another embodiment, NR-U can support multiple component carriers on the unlicensed bands, wherein all component carriers can be chosen according to only one of the first embodiment to the forth embodiment in the aforementioned embodiments as the frequency unit for LBT operation.

In yet another embodiment, NR-U can support multiple component carriers on the unlicensed bands, wherein each component carrier can be chosen according to one of the first embodiment to the forth embodiment in the aforementioned embodiment as the frequency unit for LBT operation, which can be different from the choice of other component carrier(s).

FIG. 14A illustrates an example type A LBT and MCOT 1400 according to embodiments of the present disclosure. The embodiment of the LBT and MCOT 1400 illustrated in FIG. 14A is for illustration only. FIG. 14A does not limit the scope of this disclosure to any particular implementation.

FIG. 14B illustrates an example type B LBT and MCOT 1450 according to embodiments of the present disclosure. The embodiment of the LBT and MCOT 1450 illustrated in FIG. 14B is for illustration only. FIG. 14B does not limit the scope of this disclosure to any particular implementation.

From the perspective of an individual LBT process, the channel access procedure and directionality of the LBT operations are important design considerations. The following types of channel access procedures can be considered for an LBT process, which are also illustrated in FIGS. 14A and 14B.

In one embodiment, "Type A" channel access procedure: listen-before-talk with random backoff within a variable contention window size. Type A channel access procedure is similar to category 4 LBT adopted by LTE-LAA. Contention window size (CWS), defer durations, energy detection (ED) threshold, channel access priority, maximum channel occupancy time (MCOT), and CWS adaptation rules are important factors to determine the Type A channel access procedure.

In another embodiment, "Type B" channel access procedure: transmissions are performed after sensing the channel to be idle for a fixed sensing interval. The energy detection (ED) threshold, sensing duration, and MCOT are important factors to determine the Type B channel access procedure.

FIG. 15A illustrates an example Type 1 LBT 1500 according to embodiments of the present disclosure. The embodiment of the Type 1 LBT 1500 illustrated in FIG. 15A is for illustration only. FIG. 15A does not limit the scope of this disclosure to any particular implementation.

FIG. 15B illustrates an example Type 2 LBT 1550 according to embodiments of the present disclosure. The embodiment of the Type 2 LBT 1550 illustrated in FIG. 15B is for illustration only. FIG. 15B does not limit the scope of this disclosure to any particular implementation.

The following types of LBT regarding the directionality of an LBT process to support multi-beam operation of NR unlicensed are possible, which are also illustrated in FIGS. 15A and 15B.

In one embodiment, "Type 1" LBT where LBT is performed omni-directionally, such that the energy from every direction is sensed uniformly. In one example of this embodiment, the Type 1 LBT can also be extended to the LBT wherein the spatial RX parameter is over a quasi-omni-directional beam. For instance, quasi-omni-directional LBT can be utilized for above-7 GHz NR unlicensed system.

In another embodiment, "Type 2" LBT where LBT is performed directionally. Type 2 LBT depends on both the receive beam-width, and the beam direction that the node receives from (e.g., the intended transmit beam direction of the transmitter).

In one example of this embodiment, the spatial RX parameter for Type 2 LBT operation can be chosen to be the same beam direction as in the intended spatial TX parameter for the corresponding data transmission.

In another example of this embodiment, when hybrid beamforming or digital beamforming is supported by the NR-U transmitter, the NR-U transmitter can perform Type 2 LBT over multiple spatial RX parameters simultaneously.

Given that for the wideband LBT in NR unlicensed system, the bandwidth and directionality can be different for the LBT process on different frequency units, the ED threshold for Type A/Type B LBT can be adapted correspondingly.

In one embodiment, the ED threshold for LBT scales proportionally with the bandwidth of the LBT process. In one example, the ED threshold with omnidirectional LBT and bandwidth BW1 can be defined according to ED threshold adaptation procedure of LTE-LAA. In another example, given a reference LBT process with bandwidth $BW_{ref}$ and ED threshold $\Gamma_{ref}$, the ED threshold for LBT process with bandwidth BW1 and the same other LBT parameters same as the reference process can be determined as $\Gamma=\Gamma_{ref}\times BW_1/BW_2$.

In addition to adjust the ED threshold according to the bandwidth, the ED threshold for Type 2 LBT (i.e., directional LBT) at a given beamwidth of LBT can be adapted as follows.

In one embodiment, a uniform ED threshold can be used for different beam-width, which can be the same as the omni-directional LBT. In another embodiment, when directional LBT is performed, ED threshold can be adjusted based on the beam-width over which the directional LBT is performed. In one example of this embodiment, since wider/narrower beam transmissions with a beamwidth θ may cause interference to more/less nodes, the ED threshold can be a non-increasing function of θ.

In another example of this embodiment, compared to transmissions with reference beamwidth $\theta_{ref}$ with ED threshold $\Gamma_{ref}$ (e.g., omni-directional transmissions), the ED threshold for LBT process with beamwidth θ can be $\Gamma=\Gamma_{ref}\times\theta_{ref}/\theta$, i.e., $\Gamma$ (dBm)=$\Gamma_{ref}$(dBm)–10 log 10($\theta/\theta_{ref}$). In another embodiment, when directional LBT is performed, ED threshold can be adjusted based on the corresponding antenna/beamforming gain.

In one example of this embodiment, from the transmitter's perspective, higher antenna gain corresponds to higher receive antenna gain during the LBT process, and thus the ED threshold can be a non-decreasing function with respect to the antenna gain G(θ), wherein θ is the beamwidth and G(θ) can be the maximum antenna gain in any direction, or the antenna gain along the beam steering direction.

In another example of this embodiment, compared to a reference scenario with antenna gain $G_{ref}$ and ED threshold $\Gamma_{ref}$, the ED threshold with antenna gain G(θ) can be $\Gamma$ (dBm)=$\Gamma_{ref}$ (dBm)+10 log 10(G(θ)/$G_{ref}$). In another example of this embodiment, from the affected receiver's perspective, higher antenna/beamforming gain from the transmitter corresponds to higher interference, and thus the ED threshold can be a non-increasing with respect to the antenna gain G(θ). In another example of this embodiment, compared to a reference scenario with antenna gain $G_{ref}$ and ED threshold $\Gamma_{ref}$, the ED threshold with antenna gain G(θ) can be $\Gamma$ (dBm)=$\Gamma_{ref}$ (dBm)–10 log 10(G(θ)/$G_{ref}$).

In one embodiment, when directional LBT is performed, ED threshold can be adjusted based on the beam-width over which the directional LBT is performed and the corresponding antenna/beamforming gain. In one example of this embodiment, from the transmitter's perspective, the ED threshold can be a non-decreasing function with respect to the beamwidth θ and antenna gain G(θ).

In another example of this embodiment, compared to a reference scenario (e.g., omni-directional LBT) with beamwidth $\theta_{ref}$, antenna gain G($\theta_{ref}$), and ED threshold $\Gamma_{ref}$, the LBT process of the transmitter with beamwidth θ and antenna gain G(θ) may observe $\theta/\theta_{ref}$ relative fraction of interferers with relative antenna gain G(θ)/G($\theta_{ref}$). Thus, the corresponding ED threshold can be a non-decreasing function of θ and G(θ), such as $\Gamma$ (dBm)=$\Gamma_{ref}$ (dBm)+10 log 10($\theta/\theta_{ref}$)+10 log 10(G(θ)/G($\theta_{ref}$)).

In another example of this embodiment, from the affected receiver's perspective, the ED threshold can be a non-increasing function with respect to the beamwidth θ and antenna gain G(θ). In another example of this embodiment, compared to a reference scenario (e.g., omni-directional transmission) with beamwidth $\theta_{ref}$, antenna gain G($\theta_{ref}$), and ED threshold $\Gamma_{ref}$; the transmission from the transmitter with beamwidth 0 and antenna gain G(θ) may affect $\theta/\theta_{ref}$ relative fraction of receivers with relative antenna gain G(θ)/G($\theta_{ref}$). Thus, the corresponding ED threshold can be a non-increasing function of θ and G(θ), such as $\Gamma$ (dBm)=$\Gamma_{ref}$(dBm)–10 log 10($\theta/\theta_{ref}$)–10 log 10(G(θ)/G($\theta_{ref}$)).

Given the above design considerations and parameter configurations of wideband LBT, the possible procedures of wideband LBT are detailed in the following embodiments.

In one embodiment, wideband LBT with single intended transmit beam can be provided. The wideband LBT procedures are detailed when the intended beam direction and the corresponding beam-width is the same for different frequency units over the entire wideband. In this case, all the frequency units may correspond to the same intended transmit beam direction (i.e., spatial TX parameter), and one or multiple of the following embodiments of the wideband LBT can be simultaneously supported for NR unlicensed. In addition, this embodiment also applies to when the NR-U transmitter supports hybrid/digital BF and/or multi-panels such that the transmitter can transmit in multiple beam directions (i.e., spatial TX parameters) simultaneously as well as perform LBT over multiple beam directions (i.e., spatial RX parameters) simultaneously over the same frequency resources.

Figure 16:
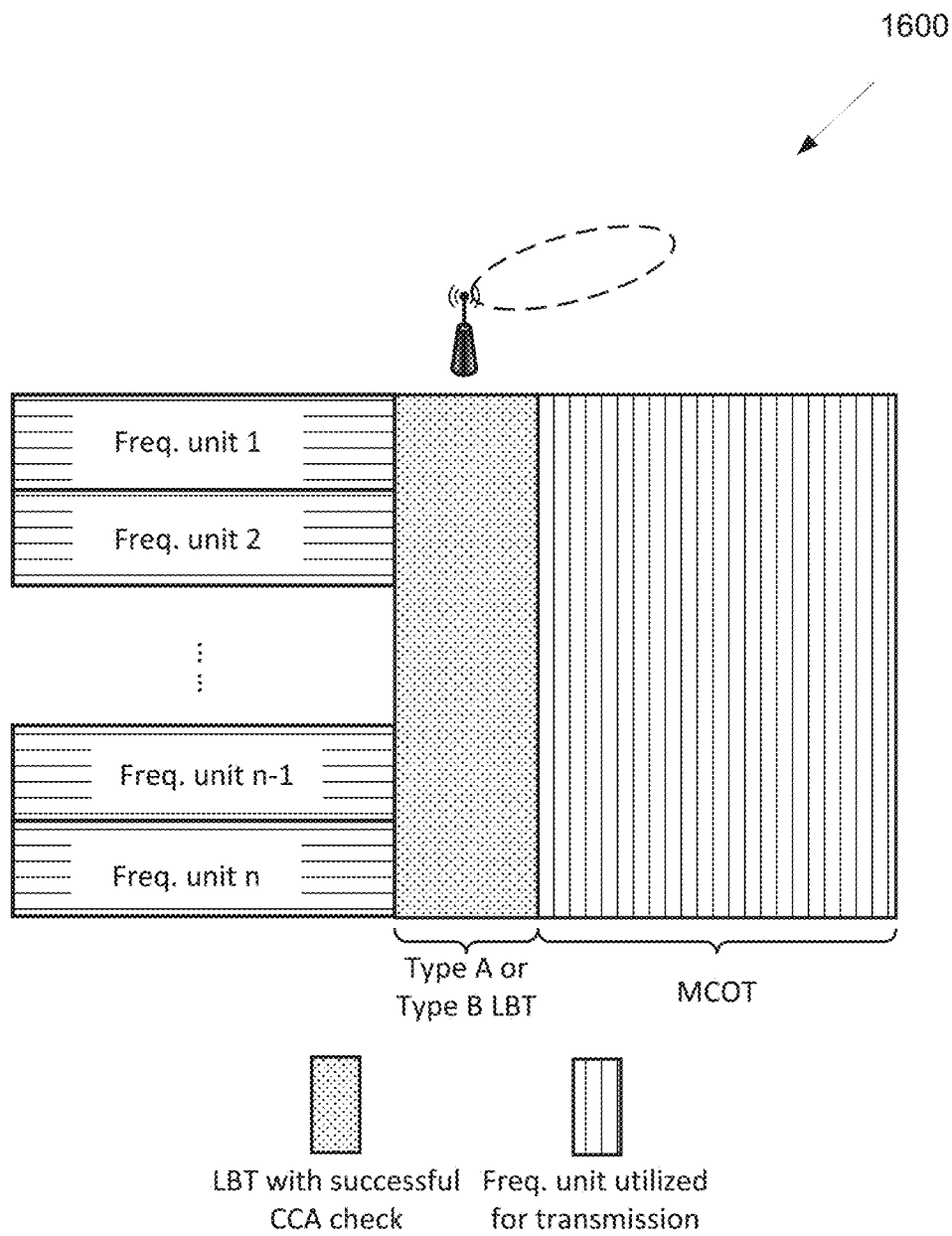
FIG. 16 illustrates an example LBT process according to embodiments of the present disclosure.

FIG. 16 illustrates an example LBT process 1600 according to embodiments of the present disclosure. The embodiment of the LBT process 1600 illustrated in FIG. 16 is for illustration only. FIG. 16 does not limit the scope of this disclosure to any particular implementation.

In one embodiment, a single LBT process can be performed on the whole wideband. In one example of this embodiment, the LBT can be either type A (i.e., LBT with random back-off) such as for data transmissions, or type B (i.e., single-shot LBT) such as transmitting control information. The LBT parameters such as the ED threshold can be determined according to the procedures detailed in aforementioned embodiments. This procedure is simple to implement with low computational complexity, but the spectrum utilization efficiency can be low when the wideband LBT fails due to strong interferers in only certain sub-band(s). An illustration of this embodiment is provided in FIG. 16.

In another example of this embodiment, the directionality of the LBT can be a directional LBT which is performed over the intended beam direction (i.e., Type 2 LBT). In another example of this embodiment, the directionality of the LBT can be an omni-directional/quasi-omni-directional LBT (i.e., Type 1 LBT).

Figure 17:
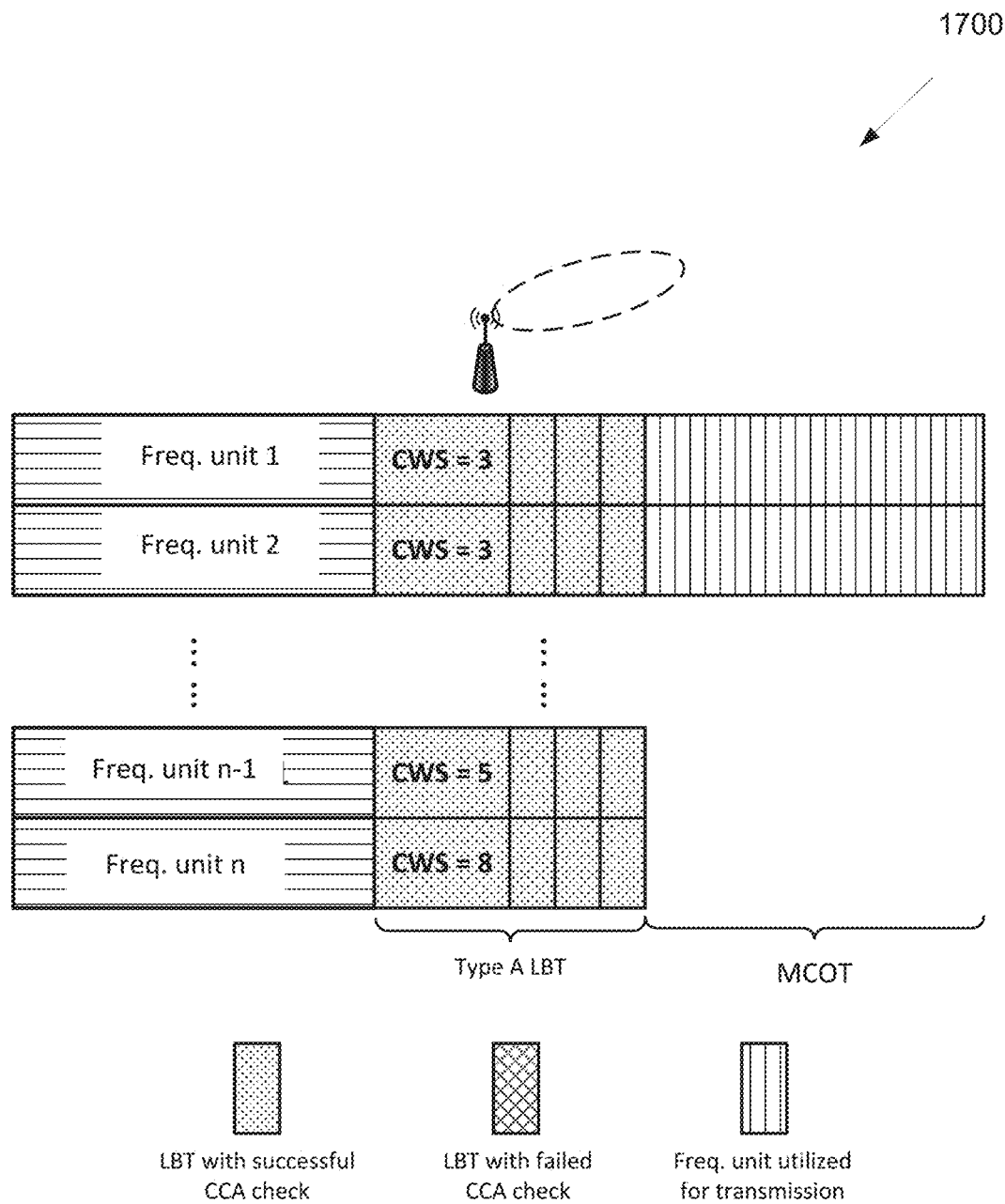
FIG. 17 illustrates another example LBT process according to embodiments of the present disclosure.

FIG. 17 illustrates another example LBT process 1700 according to embodiments of the present disclosure. The embodiment of the LBT process 1700 illustrated in FIG. 17 is for illustration only. FIG. 17 does not limit the scope of this disclosure to any particular implementation.

In another embodiment, the prospective transmitter can perform a separate type A LBT process on every frequency unit, wherein the LBT processes can start simultaneously. One example of this option is illustrated in FIG. 17. In one example of this embodiment, the LBT parameters such as contention window size, contention window size adaptation can be independently chosen for each separate LBT process across frequency units according to the procedures detailed in the aforementioned embodiments.

In another example of this embodiment, the LBT parameters such as the contention window size, channel access priority class for different frequency units can be chosen to be the same as those of a reference frequency unit. In one sub-example, this reference frequency unit can be the frequency unit with the largest bandwidth. In another sub-example, this reference frequency unit can be chosen to be the frequency unit that has the largest CWS when every frequency unit first randomly generates the CWS. In another sub-example, this reference frequency unit can be chosen to be the frequency unit that has the largest channel access priority class. In yet another sub-example, this reference frequency unit can be chosen uniformly among all the frequency units.

In this case, the reference frequency unit can be re-selected every time the prospective transmitter attempts LBT, or can be fixed throughout time, or can be fixed for certain period of time and re-selected afterwards. In another sub-example, when the frequency unit is chosen to be a configured BWP, the reference frequency unit can one currently activated BWP or the most recently used activated BWP among the configured BWPs.

In another example of this embodiment, the directionality of the LBT on each frequency unit can be a directional LBT which is performed over the intended beam direction (i.e., Type 2 LBT). In another example of this embodiment, the directionality of the LBT on each frequency unit can be an omni-directional/quasi-omni-directional LBT (i.e., Type 1 LBT).

In addition to the LBT parameters, another important design consideration for this option is how to determine the frequency units that can be utilized for transmission upon successful LBT. In one example of this embodiment, the transmitter can transmit over the frequency unit that first succeeds in LBT.

In another example of this embodiment, when there are multiple frequency units that succeed in LBT, the transmitter can choose to transmit in the frequency that has the largest bandwidth. In another example of this embodiment, the transmitter can choose to transmit in the union of the frequency units that succeed in LBT, and an illustration is provided in FIG. 17.

In another example of this embodiment, the transmitter can choose to transmit in a subset of the union of the frequency units that succeed in LBT. In another example of this embodiment, the transmitter can choose to transmit in the currently activated BWP or the most recently used activated BWP, if the LBT frequency unit is a BWP and that the currently activated BWP or the most recently used activated BWP have passed LBT.

Figure 18:
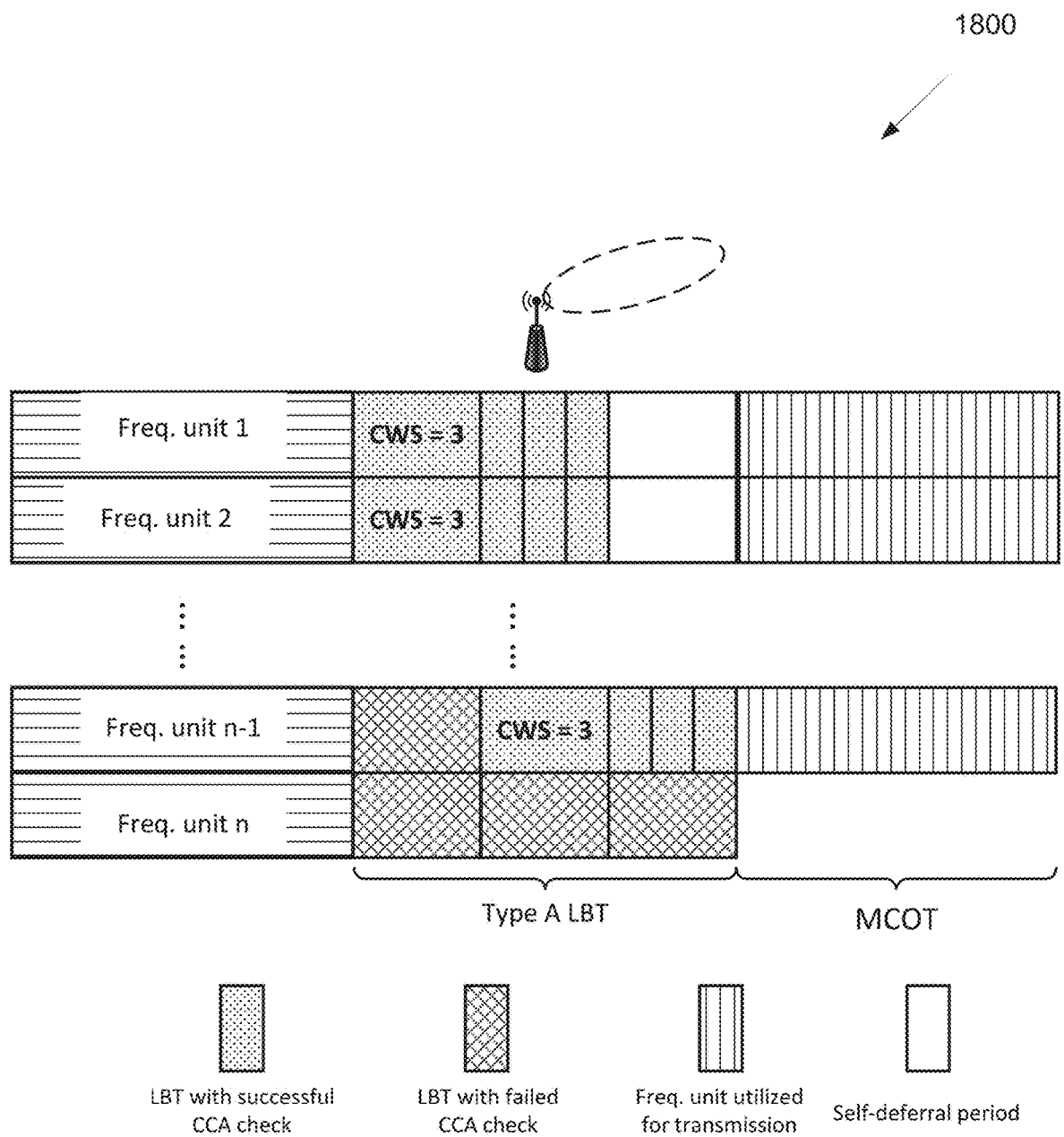
FIG. 18 illustrates yet another example LBT process according to embodiments of the present disclosure.

FIG. 18 illustrates yet another example LBT process 1800 according to embodiments of the present disclosure. The embodiment of the LBT process 1800 illustrated in FIG. 18 is for illustration only. FIG. 18 does not limit the scope of this disclosure to any particular implementation.

In another example of this embodiment, upon the first successful LBT, the transmitter can apply a self-deferral period similar to multi-carrier LBT in LTE-LAA, during which the transmitter can wait for the completion of the LBT process on other frequency units. Upon the end of the self-deferral period, the transmitter can utilize the frequency units that succeed in LBT to transmit. An illustration is provided in FIG. 18.

In another example of this embodiment, upon the first successful type A LBT, the transmitter can perform a type B LBT on the frequency units that have not yet completed the type A LBT process; and the transmitter can utilize the frequency units that have completed the type A LBT, as well as the frequency units that succeed in the type B LBT for transmission. In this case, the MCOT of the frequency units that succeeded in type B LBT can be the same as the MCOT of the reference frequency unit, or follow the MCOT that corresponds to the type B LBT.

Figure 19:
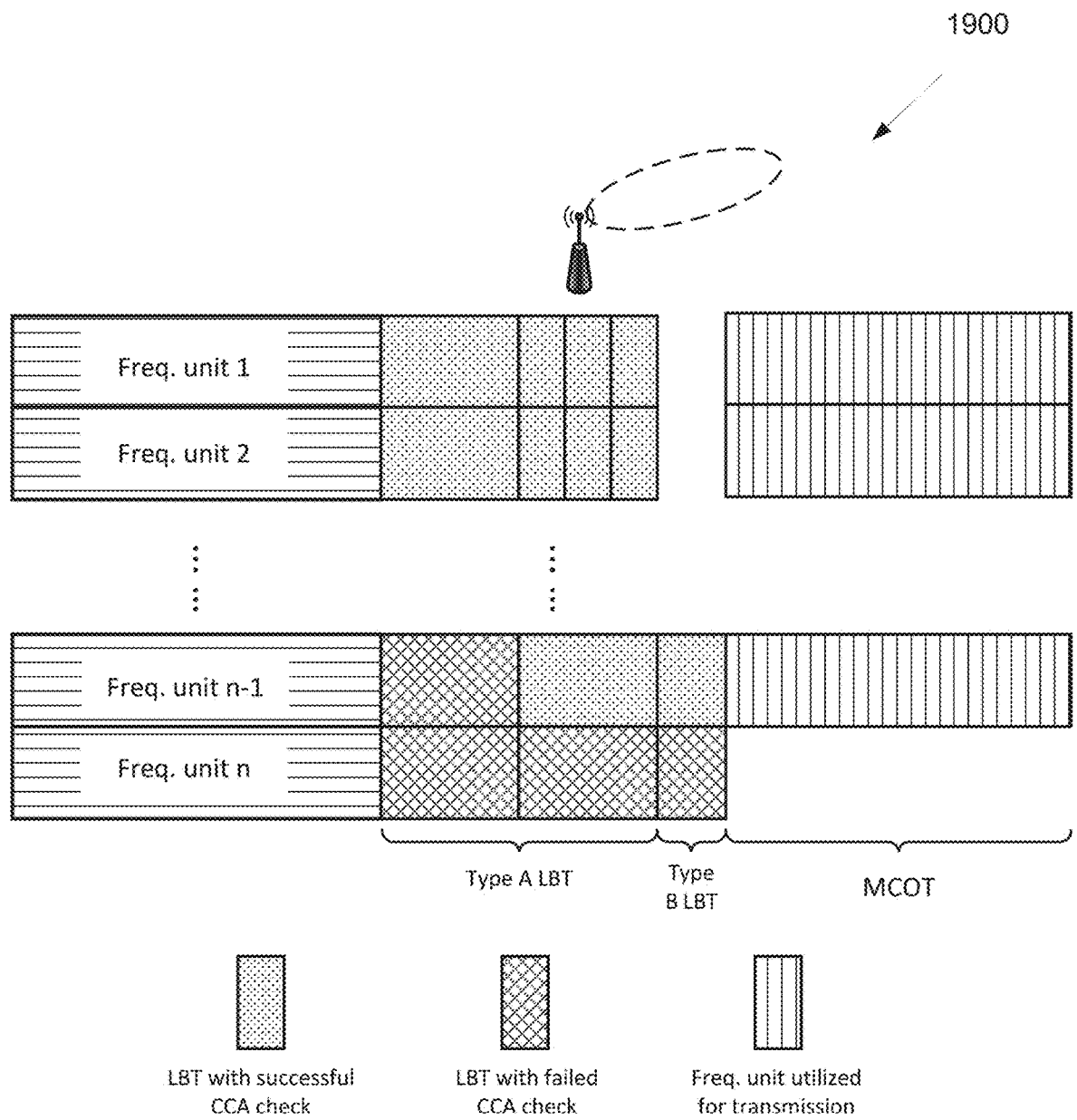
FIG. 19 illustrates yet another example LBT process according to embodiments of the present disclosure.

FIG. 19 illustrates yet another example LBT process 1900 according to embodiments of the present disclosure. The embodiment of the LBT process 1900 illustrated in FIG. 19 is for illustration only. FIG. 19 does not limit the scope of this disclosure to any particular implementation.

In one sub-example, this example can be supported under the scenario when reference frequency unit is chosen to be the frequency unit that has the largest CWS when every frequency unit first randomly generates the CWS. One illustration is provided in FIG. 19.

When the transmitter ceases the transmission, another design consideration is how contention window size is adapted.

In one example of this embodiment, the contention window size is adapted independently on each frequency unit that the transmitter succeeded in LBT. For instance, for each frequency unit i that the transmitter succeeded in LBT, the transmitter can adapt the CWS of frequency unit i according to the HARQ-ACK values of the corresponding transmissions on frequency unit i.

In another example of this embodiment, the contention window size for all the frequency units that the transmitter succeeded in LBT are updated collectively. For instance, if at least Z fraction of transmissions on all the frequency units that were transmitted is determined to be NACK, the CWS on every one of these frequency unit may be increased to the next allowed higher value for the channel access priority class of the CWS.

In another embodiment, the prospective transmitter can perform a type A LBT process on a reference frequency unit; and when the type A LBT is finished on the reference frequency unit, other frequency unit performs a type B LBT also over the intended beam direction; and the frequency units that succeed in LBT can be utilized for transmission.

In one example of the embodiment, the reference frequency unit can be chosen according to one of the following rules: in one sub-example, the reference frequency unit is uniformly chosen among all the frequency units; in another sub-example, the reference frequency unit is chosen as the one with the largest bandwidth; in another sub-example, this reference frequency unit can be chosen to be the frequency unit that has the largest CWS when every frequency unit first randomly generates the CWS; in another sub-example, this reference frequency unit can be chosen to be the frequency unit that has the largest channel access priority class; in another sub-example, when the frequency unit is chosen to be a configured BWP, the reference frequency unit can one currently activated BWP or the most recently used activated BWP among the configured BWPs.

In another example of this embodiment, the directionality of the LBT on each frequency unit can be a directional LBT which is performed over the intended beam direction (i.e., Type 2 LBT). In another example of this embodiment, the directionality of the LBT on each frequency unit can be an omni-directional/quasi-omni-directional LBT (i.e., Type 1 LBT). In another example of this embodiment, when the transmitter ceases the transmission, the contention window size on each frequency unit can be adapted according to the rules defined in the previous embodiment.

Figure 20:
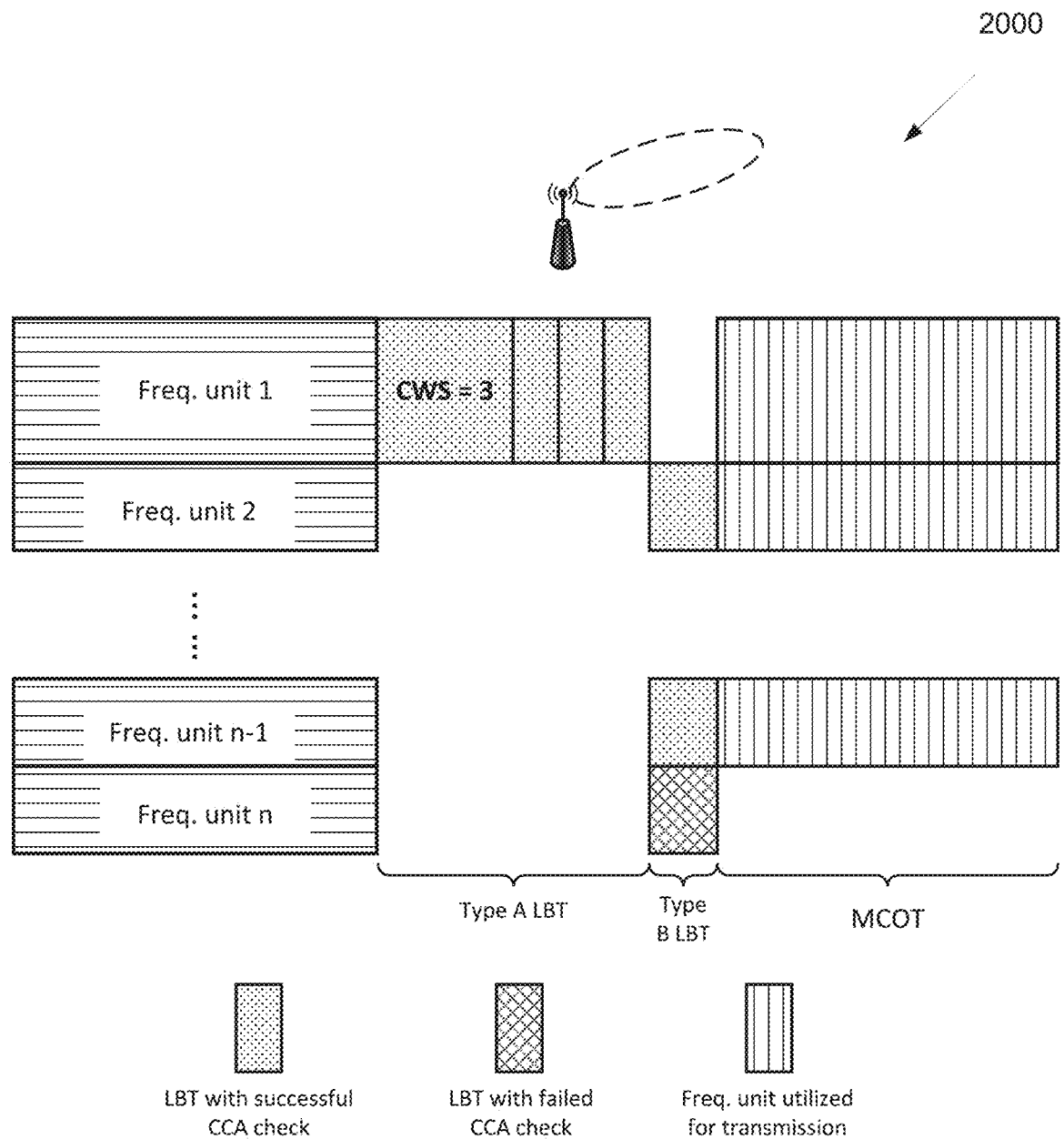
FIG. 20 illustrates yet another example LBT process according to embodiments of the present disclosure.

FIG. 20 illustrates yet another example LBT process 2000 according to embodiments of the present disclosure. The embodiment of the LBT process 2000 illustrated in FIG. 20 is for illustration only. FIG. 20 does not limit the scope of this disclosure to any particular implementation.

In another example of this embodiment, the contention window size on each frequency unit can be adapted according to the rules defined in Type B multi-carrier access procedure of the LTE-LAA. One instance of this embodiment is illustrated in FIG. 20, wherein frequency unit 1 with the largest bandwidth is chosen as the reference frequency unit for type A LBT.

In another embodiment, the prospective transmitter can perform a separate type A LBT process on every frequency unit, where each LBT process can apply a self-deferral before the start of the LBT. Specifically, when the contention window size for each frequency unit is $CWS_1$, $CWS_2, \ldots, CWS_n$, the frequency unit i may defer to start the LBT process after max $(D-CWS_i, 0)$ slot durations, wherein $D=\min\{\max\{CWS_1, CWS_2, \ldots, CWS_n\}, CWS_{ref}\}$ for some $CWS_{ref} \geq 0$, and the slot can be chosen according to the unlicensed regulation (e.g., 9 µs in 5 GHz unlicensed band; 5 µs in 60 GHz unlicensed band). In another example of this embodiment, the directionality of the LBT on each frequency unit can be a directional LBT which is performed over the intended beam direction (i.e., Type 2 LBT). In another example of this embodiment, the directionality of the LBT on each frequency unit can be an omni-directional/quasi-omni-directional LBT (i.e., Type 1 LBT).

In one example of this embodiment, the transmitter can transmit over the frequency unit that first succeeds in LBT. In another example of this embodiment, when there are multiple frequency units that succeed in LBT, the transmitter can choose to transmit in the frequency that has the largest bandwidth. In another example of this embodiment, the transmitter can choose to transmit in the union of the frequency units that succeed in LBT. In yet another example of this embodiment, the transmitter can choose to transmit in a subset of the union of the frequency units that succeed in LBT. In yet another example of this embodiment, the transmitter can choose to transmit in the currently activated BWP or the most recently used activated BWP, if the LBT frequency unit is a BWP and that the currently activated BWP or the most recently used activated BWP have passed LBT.

In yet another example of this embodiment, no further self-deferral can be performed between the end of successful LBT and the start of transmission. In yet another example of this embodiment, further self-deferral can be performed between the end of successful LBT and the start of transmission, such as when one or multiple frequency unit has failed certain step of the respective LBT procedure. In yet another example of this embodiment, when the transmitter ceases the transmission, the contention window size can be adapted independently on each frequency unit that the transmitter succeeded in LBT, or the contention window size for frequency units that succeeded in LBT can be updated collectively, according to the rules defined in second embodiment of this embodiment.

Figure 21:
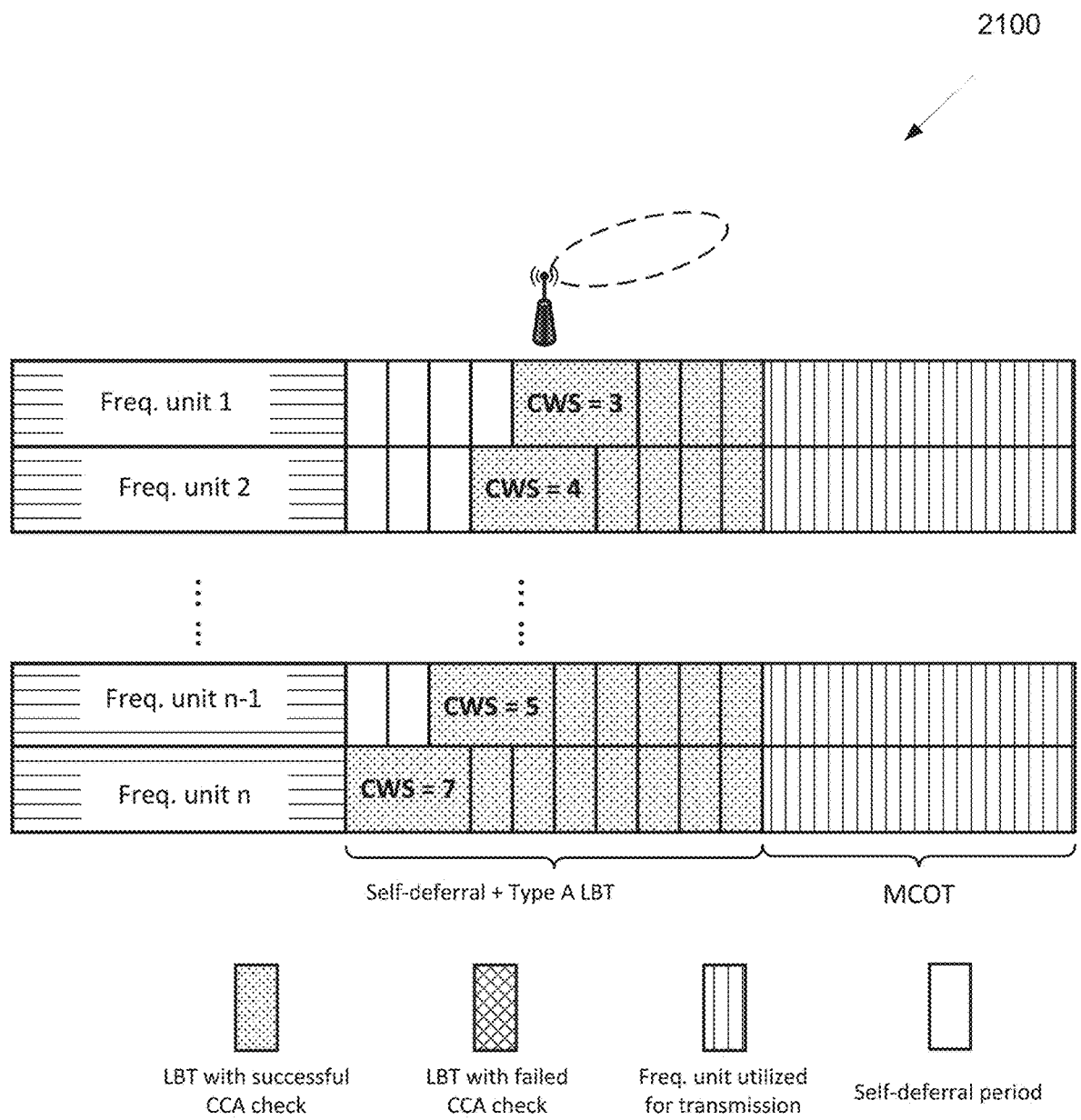
FIG. 21 illustrates yet another example LBT process according to embodiments of the present disclosure.

FIG. 21 illustrates yet another example LBT process 2100 according to embodiments of the present disclosure. The embodiment of the LBT process 2100 illustrated in FIG. 21 is for illustration only. FIG. 21 does not limit the scope of this disclosure to any particular implementation.

One instance of this embodiment is illustrated in FIG. 21 where D=7.

In another embodiment, the prospective transmitter can perform a separate type B LBT process on every frequency unit over the intended beam direction (e.g., for transmitting control information). In one example of the embodiment, the frequency units that may be utilized for transmissions can be the frequency unit with the largest bandwidth that succeed in LBT. In another example of the embodiment, the frequency units that may be utilized for transmissions can be the consecutive frequency units that succeeded in LBT with the largest bandwidth. In yet another example of the embodiment, the frequency units that may be utilized for transmissions can be the union of the frequency units that succeed in the LBT can be utilized for transmission.

In yet another example of this embodiment, this embodiment can be used for transmission of PRACH, wherein UE can be configured with multiple LBT sub-bands to attempt transmitting PRACH, wherein the sub-band can potentially belong to the same or different configured BWPs of the UE. In yet another example of this embodiment, the transmitter can choose to transmit in the currently activated BWP or the most recently used activated BWP, if the LBT frequency unit is a BWP and that the currently activated BWP or the most recently used activated BWP have passed LBT.

In another embodiment, the prospective transmitter can perform an iterative type B LBT down-selection process (e.g., for transmitting control information). Specifically, index the frequency units by $1, 2, 3, \ldots, N$ in the order of increasing frequency location. The LBT down-selection process may first perform LBT over the entire wideband, which contains the frequency units $\{1, 2, 3, \ldots, N\}$. If the LBT is successful with the ED threshold determined according to the aforementioned embodiments, the entire wideband can be utilized for transmission. Otherwise, the prospective transmitter then can perform n separate LBT processes, wherein each separate LBT process performs LBT over the frequency ranges that contain frequency units $\{1, 2, \ldots \lceil N/n \rceil\}$, $\{\lceil N/n \rceil+1, \ldots, 2*\lceil N/n \rceil\}, \ldots, \{(n-1)*\lceil N/n \rceil+1, \ldots N\}$ respectively.

In one example of this embodiment, the LBT parameters for each separate LBT process can be determined according to the aforementioned embodiments.

In another example of this embodiment, the directionality of the LBT on each frequency unit can be a directional LBT which is performed over the intended beam direction (i.e., Type 2 LBT). In another example of this embodiment, the directionality of the LBT on each frequency unit can be an omni-directional/quasi-omni-directional LBT (i.e., Type 1 LBT).

In another example of this embodiment, the frequency ranges that succeeded in LBT can be utilized for transmission. For instance, if the LBT is successful on multiple frequency ranges, the transmitter can utilize the union of these frequency ranges, or the frequency range that has the largest bandwidth, or a random frequency range for transmission. In another instance, if all the frequency ranges failed in LBT, the iterative process further continues until the LBT is successful, or each frequency range is an individual frequency unit. Once the LBT is successful, this wideband down-selection process can be restarted for future LBT procedures.

Figure 22:
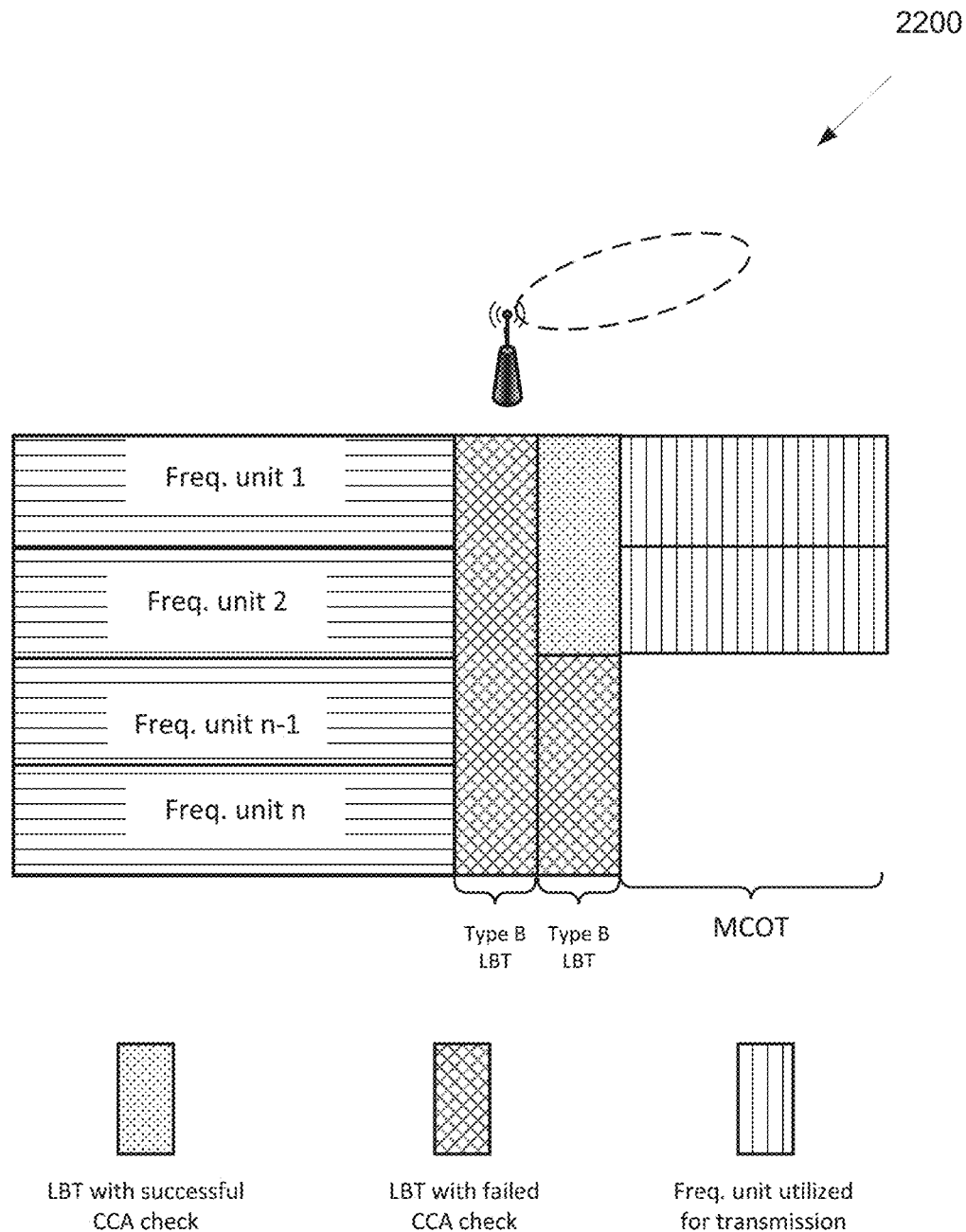
FIG. 22 illustrates yet another example LBT process according to embodiments of the present disclosure.

FIG. 22 illustrates yet another example LBT process 2200 according to embodiments of the present disclosure. The embodiment of the LBT process 2200 illustrated in FIG. 22 is for illustration only. FIG. 22 does not limit the scope of this disclosure to any particular implementation.

In another example of this embodiment, the directionality of the LBT on each frequency unit can be a directional LBT which is performed over the intended beam direction (i.e., Type 2 LBT). In another example of this embodiment, the directionality of the LBT on each frequency unit can be an omni-directional/quasi-omni-directional LBT (i.e., Type 1 LBT).

An illustration of this example is provided in FIG. 22 where N=4, n=2, and LBT is successful after the second iteration. Note in this illustration, the approach specified in this embodiment requires 3 CCA checks, which has smaller computational complexity than the previous embodiment that requires N=4 CCA checks.

In another embodiment, if the frequency unit to perform LBT is partial bandwidth, the actual bandwidth to perform a separate LBT process can be of one or multiple frequency units (e.g., one or multiple sub-bands or carrier BWPs), which can balance the computational complexity and the spectral utilization of the wideband LBT.

In one embodiment, wideband LBT with multiple intended transmit beams is provided. In this embodiment, the wideband LBT procedures are detailed when there exists multiple intended transmit beams over the entire wideband. In this case, different frequency unit can have different intended beam direction(s), and/or different beamwidth(s). Specifically, denote by N the total number of frequency units that a separate LBT process can be performed; the set D as the set of beam directions and corresponding beamwidth (e.g., half-power beamwidth) on each frequency unit.

For example, in the case of 2-D beamforming, the set D can be D={$(d_1, HPBW_1), \ldots, (d_N, HPBW_N)$}; and similar definition can be extended to 3-D beamforming as well. Denote by M the total number of unique pairs in the set D, and D=$D_1 \cup D_2 \ldots \cup D_M$ wherein $D_i$ contains the set of frequency units that correspond to the i-th unique beam direction(s) and beamwidth pair(s) in set D ($1 \le i \le M$). In particular, denote by |•| the cardinality of a set, then $|D_1|+|D_2|+\ldots+|D_M|=|D|=N$. Given the above definitions, one or multiple of the following options of the wideband LBT can be simultaneously supported for NR unlicensed.

In addition, this embodiment also applies to when the NR-U transmitter supports hybrid/digital BF and/or multi-panels such that the NR-U transmitter can transmit in multiple beam directions (i.e., spatial TX parameters) simultaneously as well as perform LBT over multiple beam directions (i.e., spatial RX parameters) simultaneously over a frequency unit. In this case, on each frequency unit, there can exist multiple beam directions and corresponding beamwidths (e.g., half-power beamwidths), and that the i-th beam direction(s) and beamwidth pair(s) in set D, i.e., ($d_i$, $HPBW_i$) with $1 \Leftarrow i \Leftarrow N$, can correspond to multiple beam directions and corresponding beamwidths.

In one embodiment, the prospective transmitter can perform a type A LBT process over the entire wideband with omni-directional or quasi omni-directional LBT; and when the type A LBT is finished, every frequency unit can perform a type B LBT over the intended beam; and the frequency units that succeed in their respective type B LBT can be utilized for transmission.

In one example of the embodiment, the ED thresholds for the type A LBT process and type B LBT process can be determined according to the aforementioned embodiment, such as adapting the ED thresholds according to the bandwidth of the LBT process and the beam-width of the LBT process. In another example of the embodiment, the MCOT on each frequency unit that succeeded in both type A and type B LBT can follow the MCOT that correspond to the type A LBT.

In another example of the embodiment, when the transmitter ceases the transmission, the contention window size of the type A LBT process is adapted according to the frequency units that the transmitter utilized for transmission. For instance, if at least Z fraction of transmissions on all the frequency units that were transmitted are determined to be NACK, the CWS for the type A LBT that is performed over the entire band may be increased to the next allowed higher value for the channel access priority class of the CWS.

Figure 23:
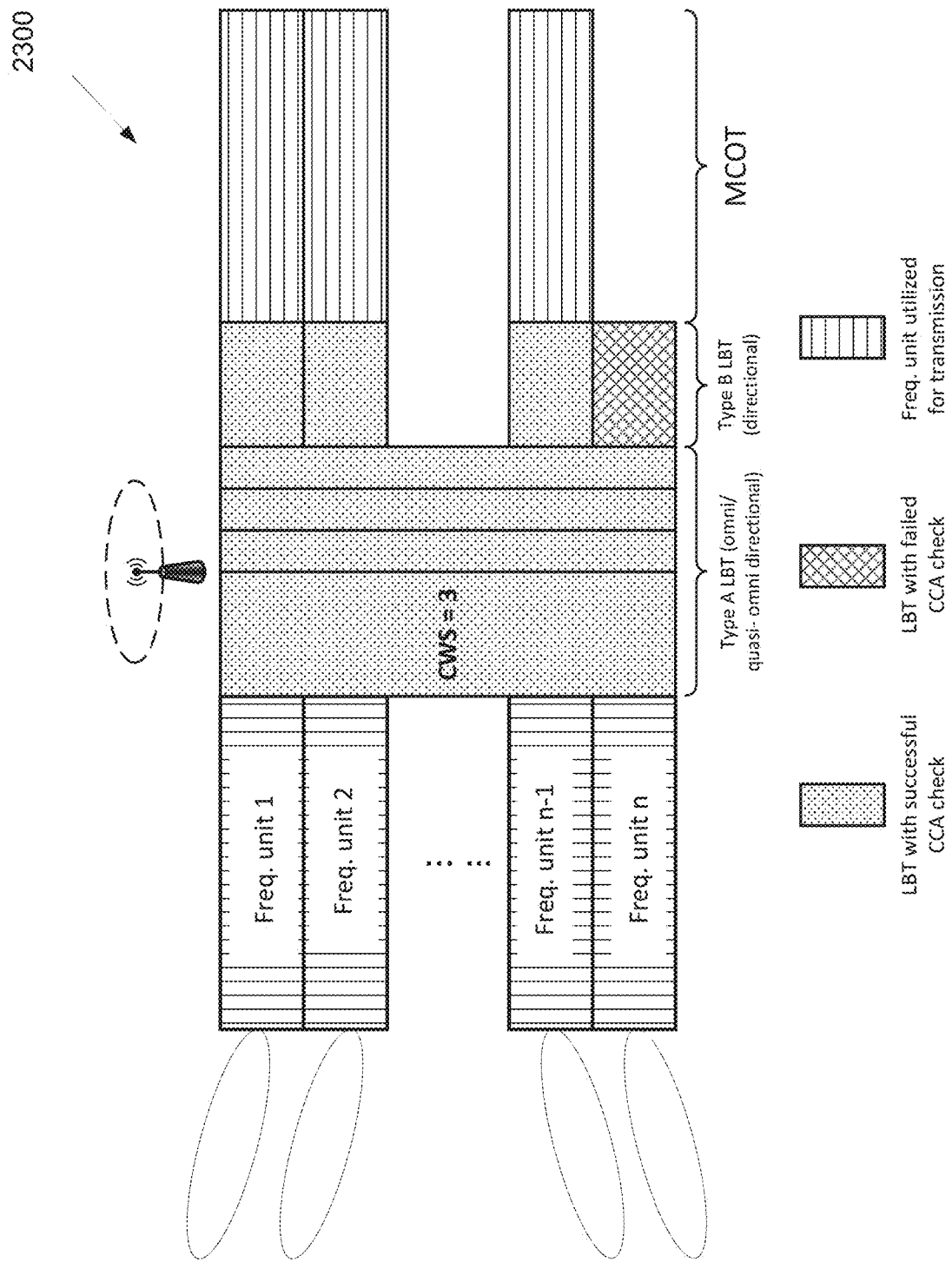
FIG. 23 illustrates yet another example LBT process according to embodiments of the present disclosure.

FIG. 23 illustrates yet another example LBT process 2300 according to embodiments of the present disclosure. The embodiment of the LBT process 2300 illustrated in FIG. 23 is for illustration only. FIG. 23 does not limit the scope of this disclosure to any particular implementation.

In another embodiment, the prospective transmitter can perform a separate type A LBT process on every frequency unit. In one example of the embodiment, the transmitter can maintain separate contention window size on each frequency unit. In another example of this embodiment, the contention window size of all frequency units can be chosen according to a reference frequency unit chosen according to the second embodiment in the aforementioned embodiments.

In another example of this embodiment, the contention window size of frequency units for set $D_i$($1 \le i \le M$) can be the same as a reference frequency unit within $D_i$ chosen according to the embodiment in the aforementioned embodiments.

In another example of this embodiment, the directionality of the LBT on each frequency unit can be a directional LBT which is performed over the intended beam direction (i.e., Type 2 LBT) of the frequency unit. In another example of this embodiment, the directionality of the LBT on each frequency unit can be an omni-directional/quasi-omni-directional LBT (i.e., Type 1 LBT).

In another example of this embodiment, the transmitter can start the type A LBT process on every frequency unit simultaneously. In another example of this embodiment, the transmitter can defer the start of the LBT process on frequency units according to embodiment in the aforementioned embodiments.

In another example of this embodiment, when the type A LBT is successful on one or multiple frequency units, the following scenarios are possible to determine which frequency unit(s) can be utilized for transmission. In one sub-example, the transmitter can apply a self-deferral for certain period, and the frequency units that succeed in LBT after the self-deferral can be applied for transmission. This sub-example is suitable for scenarios where the LBT processes started simultaneously across frequency units.

Figure 24:
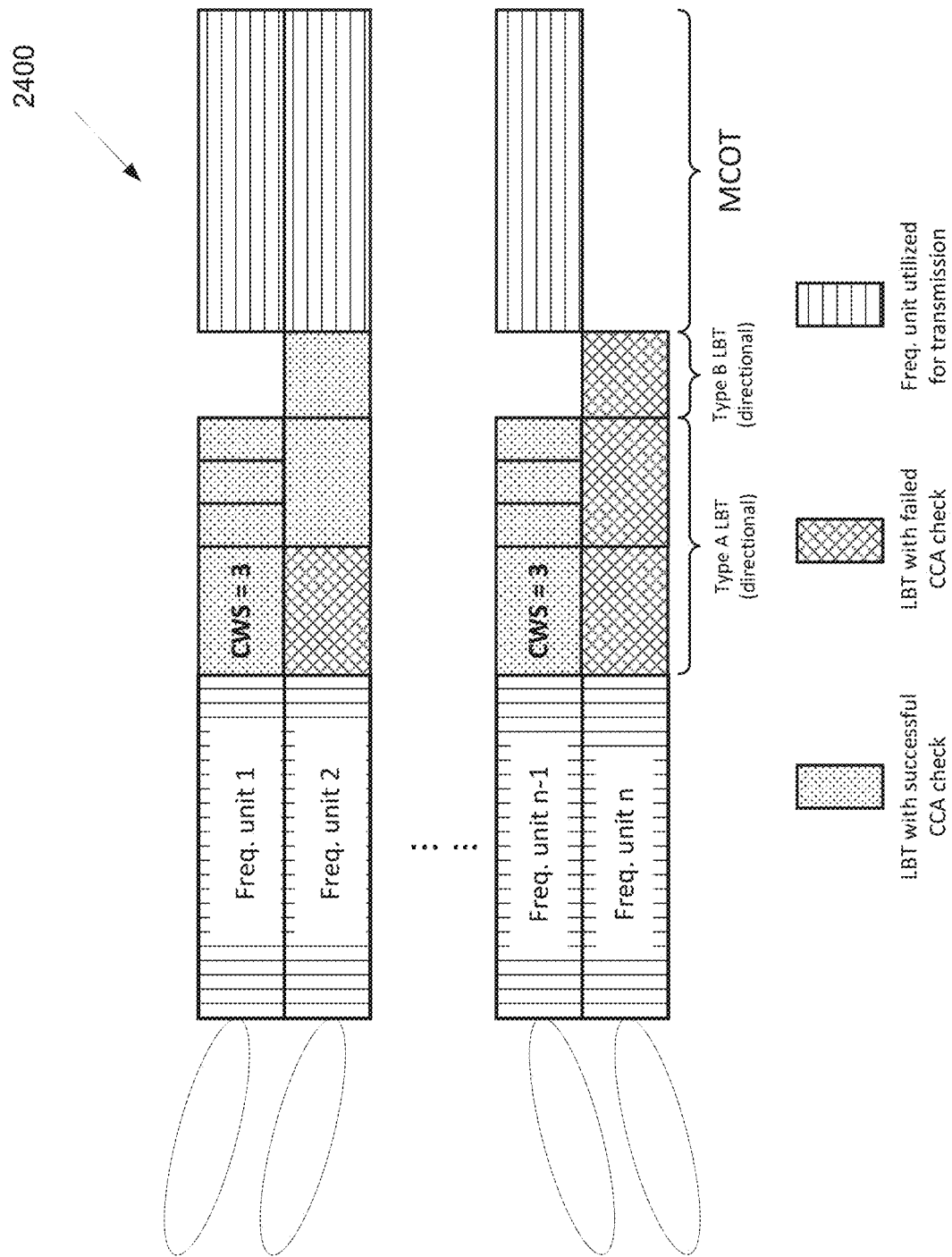
FIG. 24 illustrates yet another example LBT process according to embodiments of the present disclosure.

FIG. 24 illustrates yet another example LBT process 2400 according to embodiments of the present disclosure. The embodiment of the LBT process 2400 illustrated in FIG. 24 is for illustration only. FIG. 24 does not limit the scope of this disclosure to any particular implementation.

In another sub-example, the transmitter can apply a type B LBT on the frequency units with the same intended beam as the frequency unit that succeed in type A LBT. The frequency units that succeed in type A or type B can therefore be utilized for transmission. The MCOT of a frequency unit that succeeded in type B LBT can be the same as the MCOT of the frequency unit that succeeded in type A LBT with the same intended beam, or can be MCOT that corresponds type B LBT. An illustration of this sub-example is provided in FIG. 24.

In another example, the transmitter only utilizes the frequency unit(s) that succeed in type A LBT for transmission.

When the transmitter ceases the transmission, another consideration is how the contention window size is adapted. In one example of this embodiment, the contention window size for type A LBT is adapted independently on each frequency unit that the transmitter succeeded in LBT. In another example of this embodiment, the contention window size for type A LBT of all the frequency units that the transmitter succeeded in LBT are updated collectively. For instance, if at least Z fraction of transmissions on all the frequency units that were transmitted is determined to be NACK, the CWS on every one of these frequency unit may be increased to the next allowed higher value for the channel access priority class of the CWS.

In another example of this embodiment, the contention window size for type A LBT of the frequency units that the transmitter succeeded in LBT and that are within the same set $D_i$ are updated collectively.

In another embodiment, the prospective transmitter chooses a reference frequency unit within each set $D_i$ ($1 \leq i \leq M$) to perform a type A LBT; and when type A LBT succeeds in one or multiple frequency units, type B LBT is applied on frequency units within the same set $D_i$ of the reference frequency unit(s) that succeed in type A LBT.

In one example of the embodiment, the type A LBT parameters such as contention window size and adaptation rule for the M reference frequency units can follow the previous embodiments. For instance, each type A LBT can have unique contention window size. In another instance, the type A LBTs can have same contention window size, and the contention window size can be adapted independently or collectively when the transmitter ceases transmission.

In another example of this embodiment, the directionality of the LBT on each frequency unit can be a directional LBT which is performed over the intended beam direction (i.e., Type 2 LBT) of the frequency unit. In another example of this embodiment, the directionality of the LBT on each frequency unit can be an omni-directional/quasi-omni-directional LBT (i.e., Type 1 LBT). In another example of this embodiment, the directionality of the LBT the reference frequency unit and other frequency units within each set $D_i$ ($1 \leq i \leq M$) can be different.

In another example of the embodiment, a self-deferral period can be applied before the start of each type A LBT process according to the aforementioned embodiments in the aforementioned embodiments.

In another example of the embodiment, a self-deferral period can be applied after one or multiple type A LBT processes are finished. In another example of the embodiment, the MCOT of a frequency unit that succeeded in type B LBT can be the same as the MCOT of the frequency unit that succeeded in type A LBT with the same intended beam. In another example of the embodiment, the MCOT of a frequency unit that succeeded in type B LBT can be MCOT that corresponds type B LBT. In another example of the embodiment, self-deferral can be optionally applied either before the start of type A LBTs or after type A LBT first succeeds on one or multiple frequency units.

Figure 25:
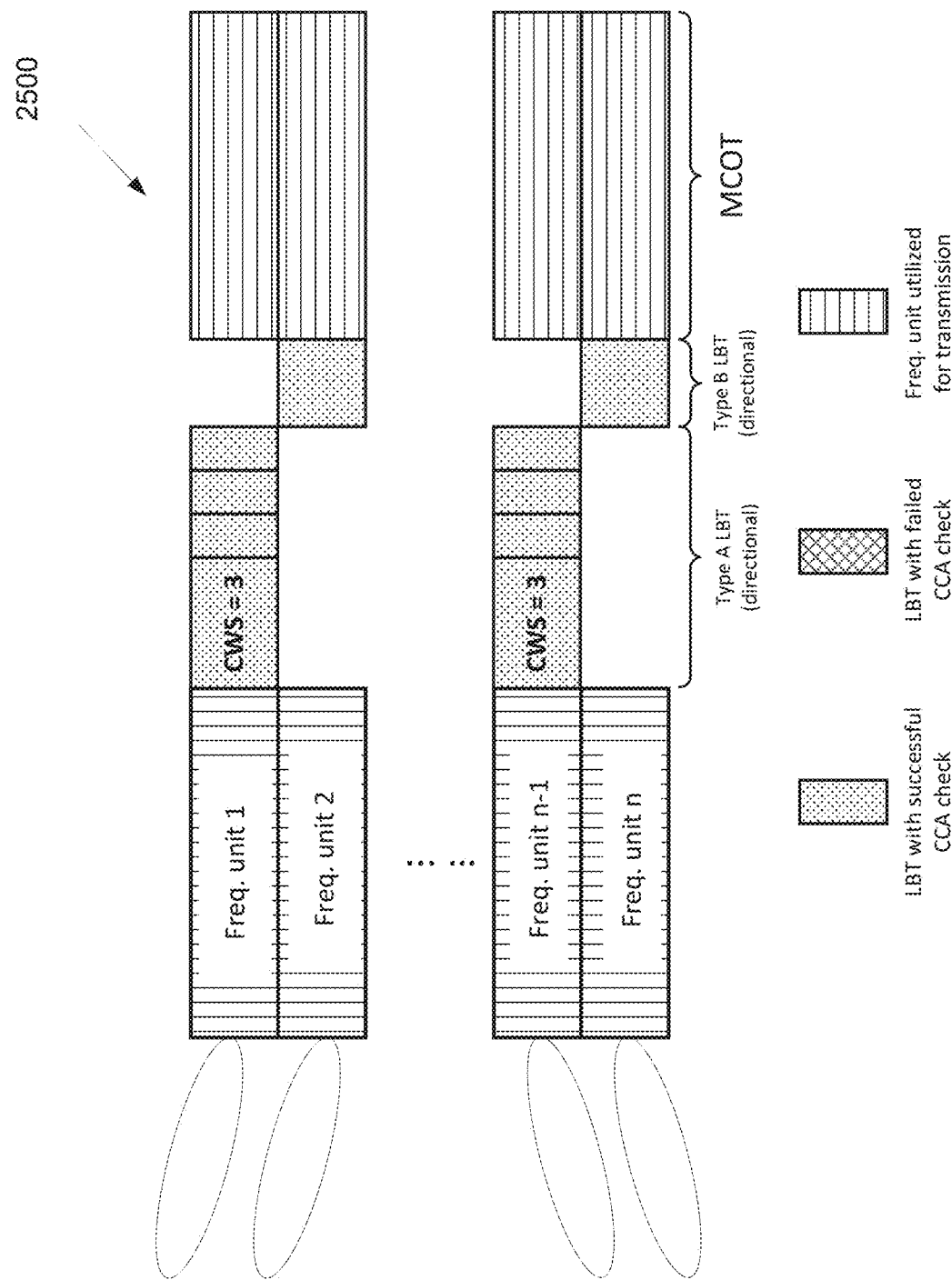
FIG. 25 illustrates yet another example LBT process according to embodiments of the present disclosure.

FIG. 25 illustrates yet another example LBT process 2500 according to embodiments of the present disclosure. The embodiment of the LBT process 2500 illustrated in FIG. 25 is for illustration only. FIG. 25 does not limit the scope of this disclosure to any particular implementation.

In another embodiment, the prospective transmitter performs M separate type A LBT processes, wherein the i-th ($1 \leq i \leq M$) LBT process is performed over the union of the frequency units in set $D_i$. Specifically, the energy perceived for the i-th LBT process is the total energy perceived over all the frequency units in $D_i$.

In one example of this embodiment, for the i-th ($1 \leq i \leq M$) LBT process, the LBT parameters such as ED threshold are determined according to the union of the frequency units in set $D_i$; and parameters such as contention window size, and contention window size adaptation rule are determined or adapted collectively according to the frequency units in set $D_i$.

In another example of this embodiment, the directionality of the LBT on the union of frequency units in set $D_i$ can be a directional LBT which is performed over the intended beam of set $D_i$ (i.e., Type 2 LBT) of the frequency unit. In another example of this embodiment, the directionality of the LBT on the union of frequency units in set $D_i$ can be can be an omni-directional/quasi-omni-directional LBT (i.e., Type 1 LBT).

In another example of this embodiment, a self-deferral period can be applied before the start of each LBT process according to the aforementioned embodiments in the aforementioned embodiments. In another example of this embodiment, a self-deferral period can be applied after one or multiple LBT processes are finished before the start of the transmissions.

Figure 26:
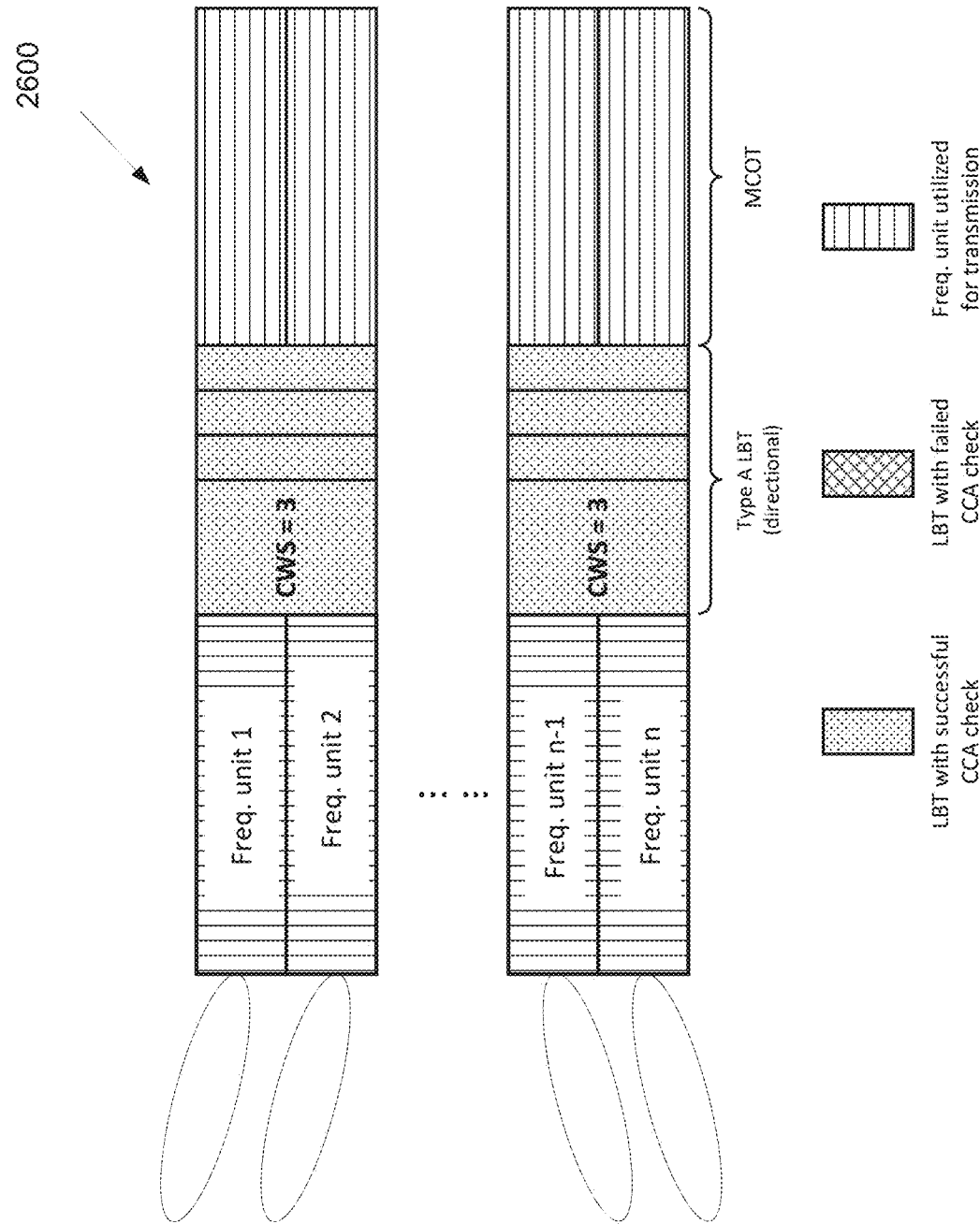
FIG. 26 illustrates yet another example LBT process according to embodiments of the present disclosure.

FIG. 26 illustrates yet another example LBT process 2600 according to embodiments of the present disclosure. The embodiment of the LBT process 2600 illustrated in FIG. 26 is for illustration only. FIG. 26 does not limit the scope of this disclosure to any particular implementation.

In another embodiment, the prospective transmitter performs type B LBT processes (e.g., for transmitting control information). In one example of this embodiment, each type B LBT process can be performed over every frequency unit over the intended beam independently, thus there can be a total of N type B LBT processes. In another example of this embodiment, each type B LBT process can be performed over the union of frequency units of set $D_i$ over the intended beam of $D_i$, and there can be a total of M type B LBT processes.

In another example of this embodiment, there can be a single type B LBT process over an omni-directional or quasi omni-directional beam. In one example of this embodiment, each type B LBT process can be performed over every frequency unit over an omni-directional or quasi omni-directional beam, thus there can be a total of N type B LBT processes. In another example of this embodiment, the ED threshold can be determined according to the bandwidth of the LBT process and directionality of the LBT process, according to the aforementioned embodiments. In another example of this embodiment, this embodiment can be used for transmission of PRACH, wherein UE can be configured with multiple LBT sub-bands to attempt transmitting PRACH, wherein the sub-band can potentially belong to the same or different configured BWPs of the UE. An illustration of this embodiment is provided in FIG. 27 when there are M LBT processes with each type B LBT process is performed over the union of the frequency units of each set $D_i$ over the intended beam of $D_i$.

Figure 27:
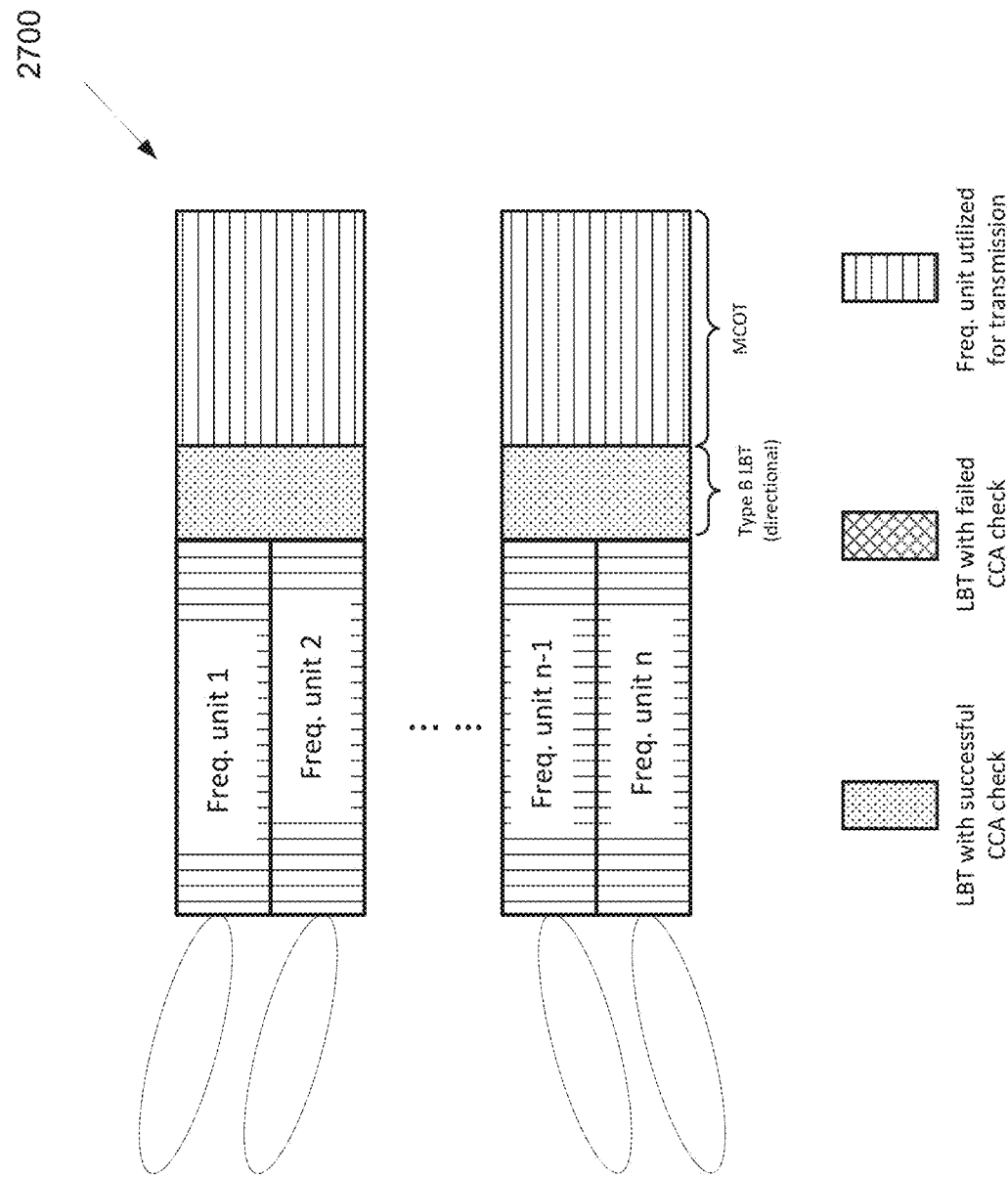
FIG. 27 illustrates yet another example LBT process according to embodiments of the present disclosure.

FIG. 27 illustrates yet another example LBT process 2700 according to embodiments of the present disclosure. The embodiment of the LBT process 2700 illustrated in FIG. 27 is for illustration only. FIG. 27 does not limit the scope of this disclosure to any particular implementation.

In addition to the conventional downlink-only and uplink-only slot structures, NR supports the self-contained slot structures wherein for a DL-centric self-contained slot, the HARQ-ACK feedback can be reported shortly after the end of the DL data transmissions; while for the UL-centric self-contained slot, the uplink transmission can be started shortly after the reception of the UL assignment. This self-contained slot structure with flexible DL/UL switching can lead to much reduced latency (e.g., for HARQ-ACK feedback or UL data transmission) and higher scheduling flexibility compared to LTE.

Figure 28:
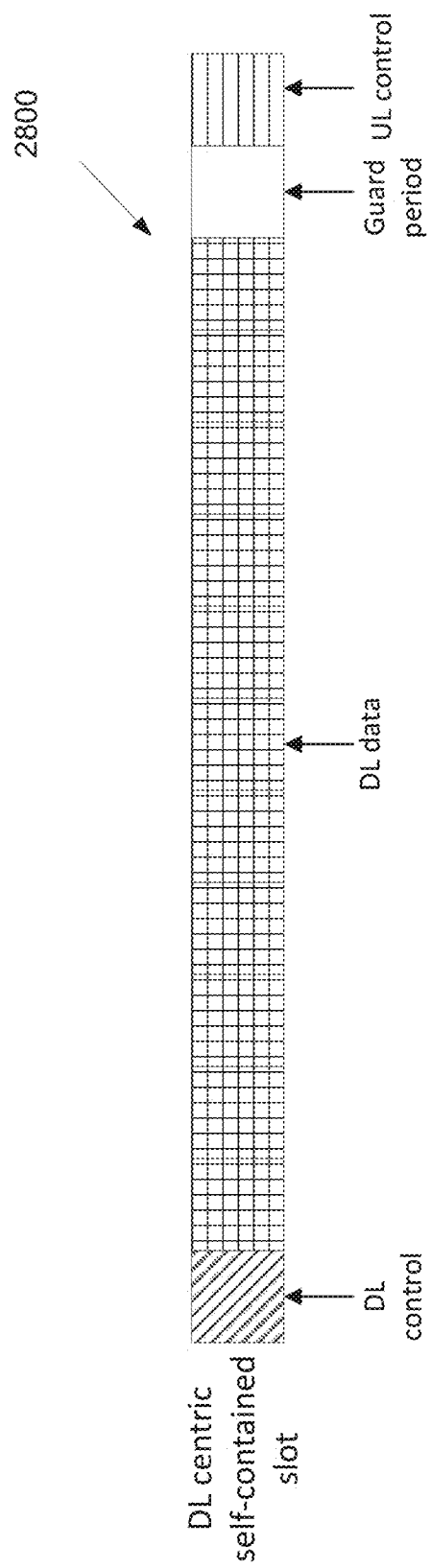
FIG. 28 illustrates an example slot structure according to embodiments of the present disclosure.

FIG. 28 illustrates an example slot structure 2800 according to embodiments of the present disclosure. The embodiment of the slot structure 2800 illustrated in FIG. 28 is for illustration only. FIG. 28 does not limit the scope of this disclosure to any particular implementation.

Figure 29:
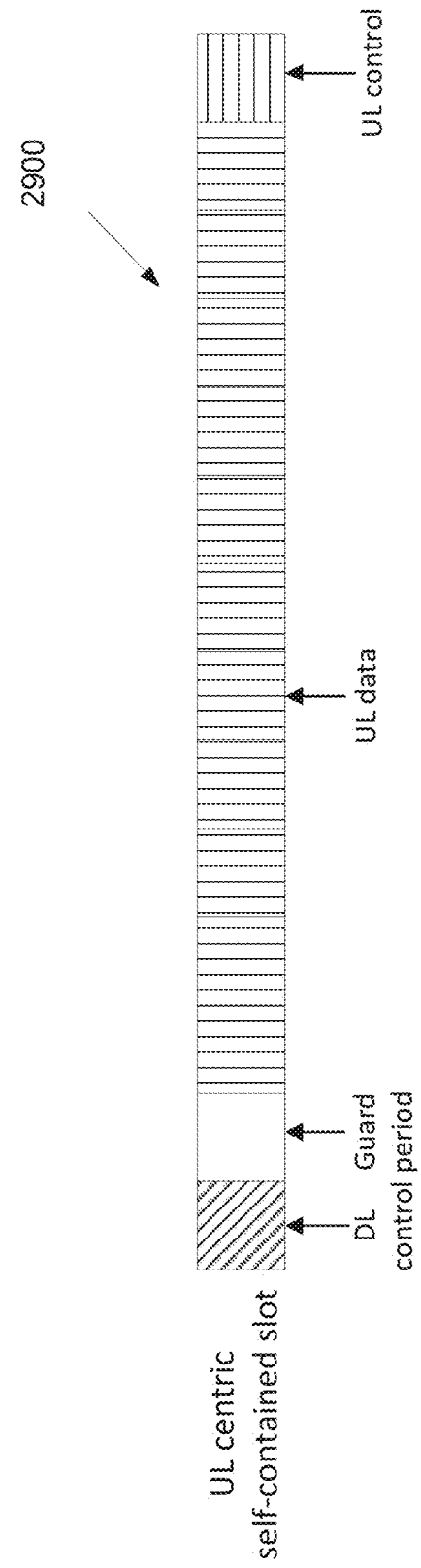
FIG. 29 illustrates another example slot structure according to embodiments of the present disclosure.

FIG. 29 illustrates another example slot structure 2900 according to embodiments of the present disclosure. The embodiment of the slot structure 2900 illustrated in FIG. 29 is for illustration only. FIG. 29 does not limit the scope of this disclosure to any particular implementation.

FIG. 28 and FIG. 29 illustrate the examples of the downlink centric self-contained slot and uplink centric self-contained slot respectively. Naturally, the self-contained slot structures of NR licensed can also be supported by NR unlicensed.

In one embodiment, besides supporting the self-contained slot structure as in NR licensed, the self-contained structure can be further extended by NR-U, such that there can exist one or multiple DL/UL switching points within the channel occupancy time (COT). A DL/UL switching point can refer to a switching from DL to UL switching or UL to DL switching.

The channel occupancy time is referred to as the duration that a transmitter is allowed to transmit, after the transmitter has successfully gained access to the channel in unlicensed band through listen-before-talk (LBT). For LTE-LAA that operates in the 5 GHz unlicensed band, different LBT priority class corresponds to different contention window size (CWS) and different maximum channel occupancy time (MCOT), which is illustrated in TABLE 1. In addition, for the 60 GHz unlicensed band, the EU regulation requires the MCOT to be 9 ms.

TABLE 1

CW size and MCOT

| LBT priority class | MCOT | Set of CW sizes |
|---|---|---|
| 1 | 2 ms | {3, 7} |
| 2 | 3 ms | {7, 15} |
| 3 | 10 or 8 ms | {15, 31, 63} |
| 4 | 10 or 8 ms | {15, 31, 63, 127, 255, 511, 1023} |

The self-contained COT structure for NR-U allows more efficient resource utilization in the unlicensed band and faster link adaptation based on HARQ/ACK feedbacks similar to NR licensed, especially when there are multiple DL/UL switching points within the self-contained COT. In addition, supporting multiple DL/UL switching points within the self-contained COT can also enable more flexible contention window size adaptation for LBT, reduce the hidden node issue of NR-U with directional transmissions/receptions.

Furthermore, given the support of the self-contained COT structure and the inherent scalable subcarrier spacings (SCSs) of NR-U, new channel access mechanisms, including the time granularity to perform LBT and the overall LBT procedure, can be designed for NR-U to achieve fair coexistence with coexisting radio access technologies (RATs).

In the following embodiments, the details on the self-contained COT structures for NR-U, the time-domain granularity to perform LBT, as well as a new self-contained LBT scheme are specified.

In one embodiment, self-contained channel occupancy time (COT) for NR unlicensed may be considered.

The structures of the self-contained COT for NR-U are specified in this embodiment. In one embodiment, similar to the self-contained slot for NR licensed, a self-contained COT can be referred to the COT wherein there are one or multiple DL/UL switching points within the COT.

In one example of the self-contained COT, the self-contained COT can be downlink-centric self-contained COT, which can be referred to as the self-contained COT wherein the majority of the OFDM symbols within the COT are for DL transmission (e.g., DL control and DL data), while the remaining symbols are for guard period (GP) and short UL transmission (e.g., UCI or SRS).

In one example of the self-contained COT, the self-contained COT can come after a successful LBT at the gNB side only; or a successful LBT at the gNB side followed by a handshake message transmission from the gNB; or a successful LBT at the gNB side followed by a successful handshake message exchange between the gNB and the UE.

In one example of the self-contained COT, the self-contained COT can be uplink-centric self-contained COT, which can be referred to as the self-contained COT wherein the majority of the OFDM symbols within the COT are for UL transmission (e.g., UL data, UCI, SRS), while the remaining symbols are for guard period (GP) and short DL transmission (e.g., DL control).

In one example of the self-contained COT, the self-contained COT can come after a successful LBT at the UE side only; or a successful LBT at the UE side followed by a handshake message transmission from the UE; or a successful LBT at the UE side followed by a successful handshake message exchange between the gNB and the UE; or a successful LBT at the gNB side only, in which case the uplink transmission can be perceived as sharing the COT with the downlink LBT.

Given the supported MCOT at unlicensed bands and the scalable SCSs for NR-U, multiple slots can be contained within the MCOT duration.

In one embodiment, depending on the ending position of the LBT and the COT duration, the starting slot and/or ending slot within the COT can include less than 14 symbols, by supporting mini-slot(s) or partial slot with flexible start/end symbol position.

In another embodiment, at each DL/UL switching point(s) within the COT, a single-shot LBT with duration $\tau 1$ can be performed before the start of DL (UL) transmission that follows the end of previous UL (DL) transmission or LBT (e.g., the LBT for data transmission); or the LBT is not required if the gap between the start of DL (UL) transmission that follows the end of previous UL (DL) transmission or LBT (e.g., the LBT for data transmission) is less than certain duration $\tau 2$. For example, $\tau 1$ and $\tau 2$ can be the PIFS and SIFS duration of the Wi-Fi system (e.g., 25 μs and 16 μs for sub-7 GHz unlicensed bands, and 8 μs and 3 μs for above-7 GHz unlicensed bands) that coexists with NR-U respectively.

One important design consideration is regarding the structure of the self-contained COT for NR-U in terms of the number of supported DL/UL switching points within the COT, which are detailed as follows.

Figure 30:
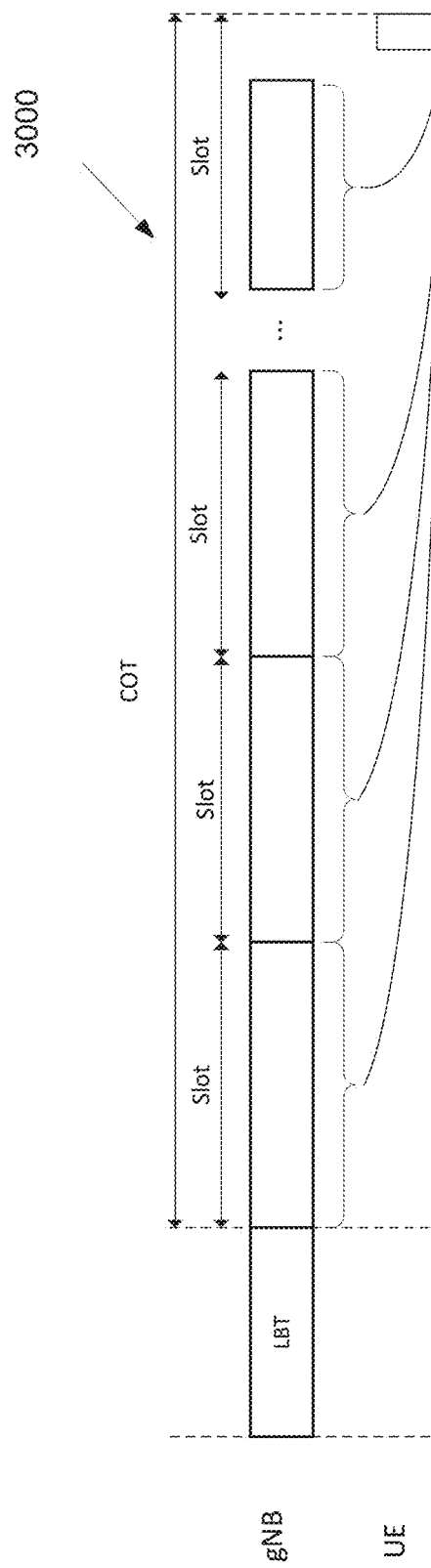
FIG. 30 illustrates an example COT structure according to embodiments of the present disclosure.

FIG. 30 illustrates an example COT structure 3000 according to embodiments of the present disclosure. The embodiment of the COT structure 3000 illustrated in FIG. 30 is for illustration only. FIG. 30 does not limit the scope of this disclosure to any particular implementation.

In one embodiment, the self-contained COT can have one switching point. In one example of this embodiment, for the case of a gNB obtained COT, i.e., the COT is obtained following a successful CAT-4 LBT at the gNB side (e.g., downlink-centric self-contained COT), the UL transmission part can be transmitted at the end of the MCOT. An illustration of this example is illustrated in FIG. 30, wherein the UL transmission (e.g., HARQ-ACK) happens at the end of the COT.

In another example of this embodiment, when the LBT for data transmissions follows LBT with a random backoff counter wherein the backoff counter is generated according to an adaptive contention window size (e.g. similar to the channel access procedure of the category 4 LBT adopted by LTE-LAA/eLAA), the contention window size can be updated based on the HARQ-ACK values corresponding to the PDSCH transmission(s) within the self-contained COT. In one sub-example, if at least Z ($0 \Leftarrow Z \Leftarrow 100$) percent of HARQ-ACK values are determined as NACK, the contention window size (CWS) can be increased to the next higher allowed value; otherwise the CWS can be set to the minimum allowed CWS value for a given LBT priority class.

Figure 31:
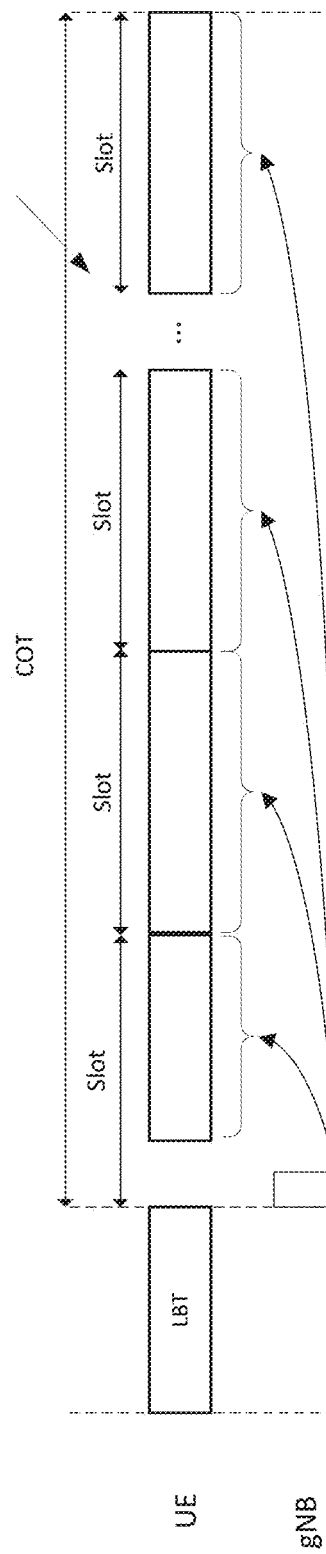
FIG. 31 illustrates another example COT structure according to embodiments of the present disclosure.

FIG. 31 illustrates another example COT structure 3100 according to embodiments of the present disclosure. The embodiment of the COT structure 3100 illustrated in FIG. 31 is for illustration only. FIG. 31 does not limit the scope of this disclosure to any particular implementation.

In another example of this embodiment, for the case of a UE obtained COT, i.e., the COT is obtained following a successful CAT-4 LBT at the UE side (e.g., uplink-centric self-contained COT), the DL transmission part can be transmitted at the beginning of the COT. An illustration of this example is provided in FIG. 31, wherein the DL transmission (e.g., UL grant) happens at the beginning of the COT.

This self-contained COT option requires lower UE implementation complexity as less DL/UL switching point is needed. However, if LBT is required before UL transmission for the downlink-centric COT, the potential LBT failure can cause the UL control information (e.g., feedback for all PDSCHs within the COT) cannot be reported. Similarly, if LBT is required before DL transmission for the uplink-centric COT, the potential LBT failure can cause the DL control (e.g., UL grant) cannot be reported. In addition, when highly directional transmissions/receptions are used (e.g., in 60 GHz unlicensed bands), the hidden node to the receiver of this self-contained COT option can obtain channel access during the COT.

Figure 32:
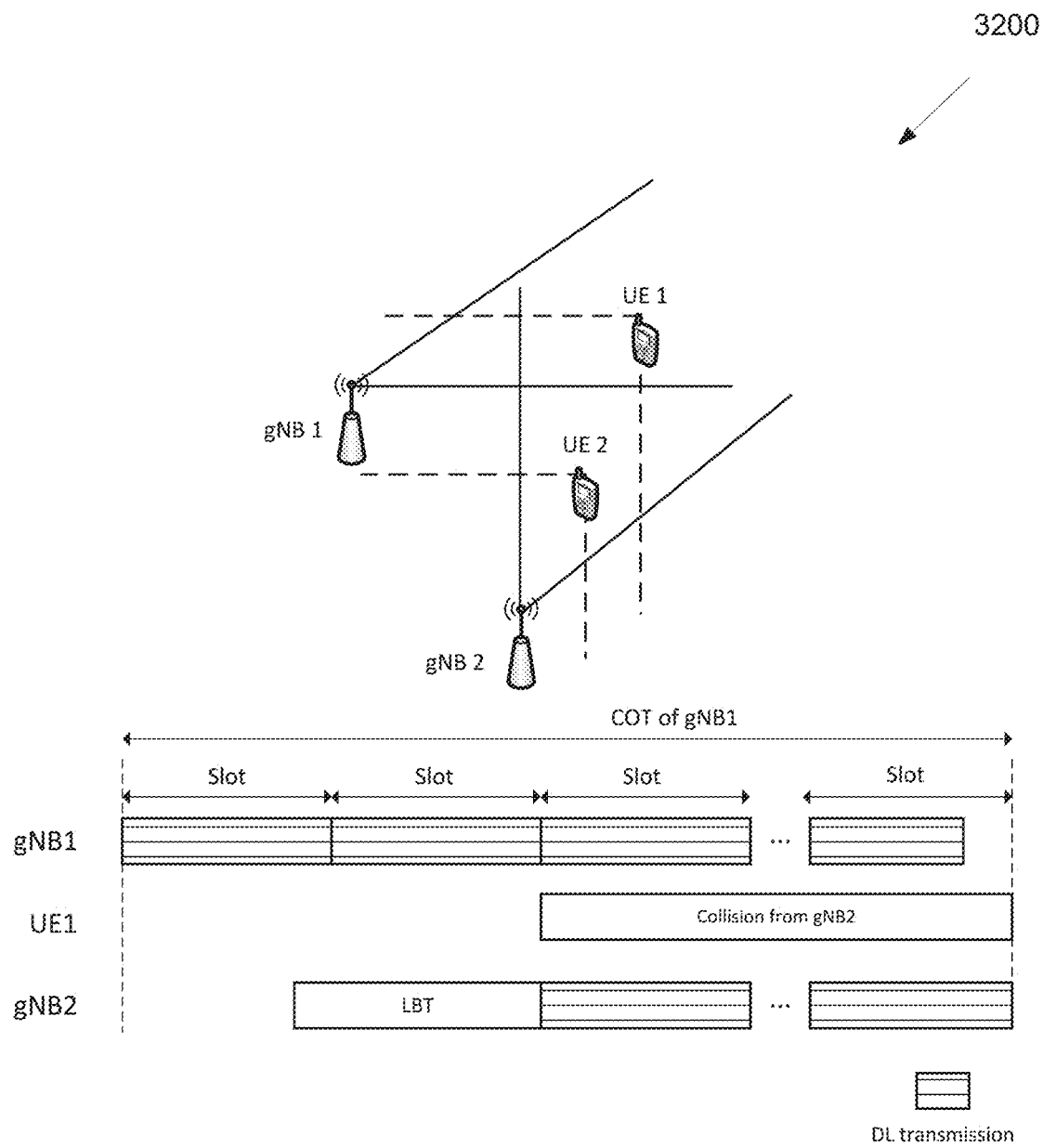
FIG. 32 illustrates an example downlink centric COT structure according to embodiments of the present disclosure.

FIG. 32 illustrates an example downlink centric COT structure 3200 according to embodiments of the present disclosure. The embodiment of the downlink centric COT structure 3200 illustrated in FIG. 32 is for illustration only. FIG. 32 does not limit the scope of this disclosure to any particular implementation.

An illustration is provided in FIG. 32, wherein a gNB1 transmits to UE1 in a downlink-centric self-contained COT with option 1, while a gNB2 intends to transmit to UE2. The LBT at the gNB2 is successful since the gNB2 is not beam-aligned with the gNB1 and the gNB2 is unaware that the transmission direction may collide at the receiving direction of UE1, but the transmission from the gNB2 causes strong interference at UE1.

In another embodiment, the self-contained MCOT can have at most one DL to UL switching point and/or one UL to DL switching at every slot within the COT, with additional resource may be reserved before each switching point for the LBT operation.

In one example of this embodiment, for the case of a gNB obtained COT, i.e., the COT is obtained following a successful CAT-4 LBT at the gNB side (e.g., downlink-centric self-contained COT), within a slot of the COT, there can exist (at most) a switching from a DL transmission part to an UL transmission part (e.g., HARQ-ACK feedback) within this slot; in addition, there can exist a paired switching from UL back to DL either at the end of this slot, or at the beginning of the following slot. An illustration of this example is provided in FIG. 33 wherein the UL transmissions happen at the end of each slot.

Figure 33:
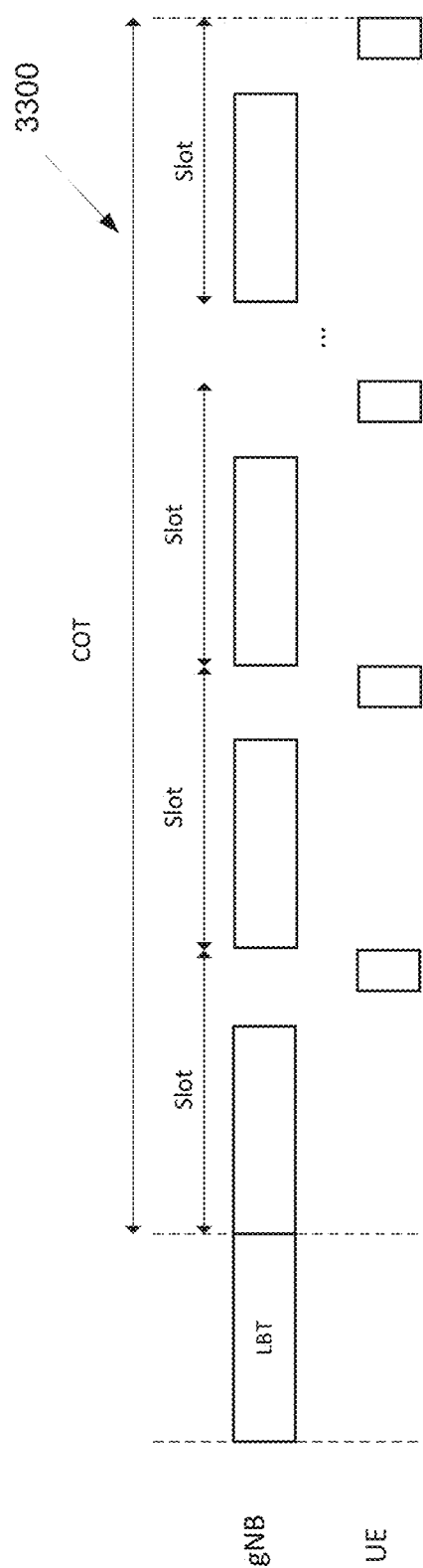
FIG. 33 illustrates yet another example COT structure according to embodiments of the present disclosure.

FIG. 33 illustrates yet another example COT structure 3300 according to embodiments of the present disclosure. The embodiment of the COT structure 3300 illustrated in FIG. 33 is for illustration only. FIG. 33 does not limit the scope of this disclosure to any particular implementation.

In another example of this embodiment, when the LBT for data transmissions follows LBT with a random backoff counter wherein the backoff counter is generated according to an adaptive CWS, the CWS can be updated based on the HARQ-ACK values corresponding to the PDSCH transmission(s) within the self-contained COT. In one sub-example, if at least Z ($0 \Leftarrow Z \Leftarrow 100$) percent of HARQ-ACK values in a reference slot are determined as NACK, the contention window size (CWS) can be increased to the next higher allowed value; otherwise the CWS can be set to the minimum allowed CWS value for a given LBT priority class. The reference slot can be determined as the first slot within the COT wherein the HARQ-ACK feedbacks are received; or the first slot within the COT; or a random slot within the COT; or the slot within the COT wherein most HARQ-ACK feedbacks are received. In another example, if at least Z ($0 \Leftarrow Z \Leftarrow 100$) percent of all the HARQ-ACK values received within the COT are determined as NACK, the contention window size (CWS) can be increased to the next higher allowed value; otherwise the CWS can be set to the minimum allowed CWS value for a given LBT priority class.

Figure 34:
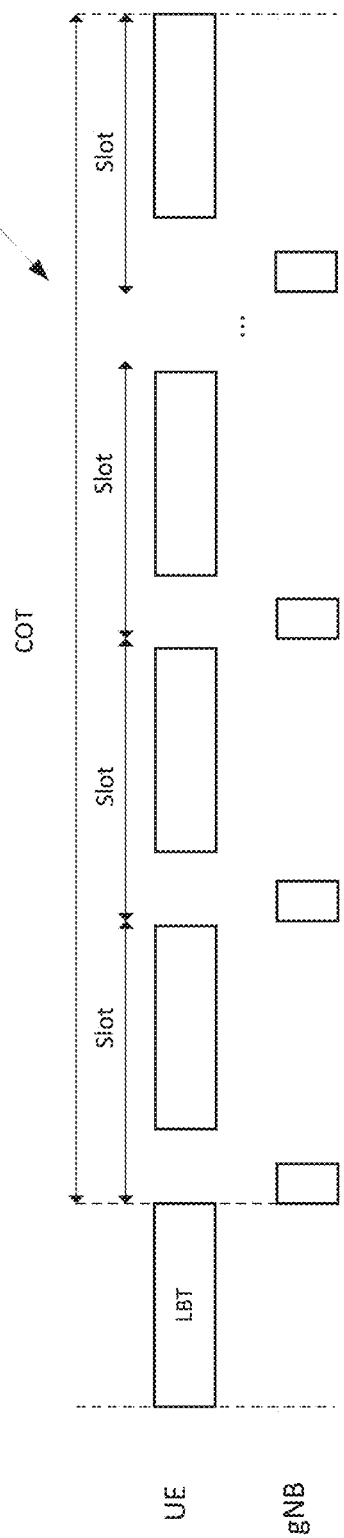
FIG. 34 illustrates yet another example COT structure according to embodiments of the present disclosure.

FIG. 34 illustrates yet another example COT structure 3400 according to embodiments of the present disclosure. The embodiment of the COT structure 3400 illustrated in FIG. 34 is for illustration only. FIG. 34 does not limit the scope of this disclosure to any particular implementation.

In one example of this embodiment, for the case of a UE obtained COT, i.e., the COT is obtained following a successful CAT-4 LBT at the UE side (e.g., uplink-centric self-contained COT), within a slot of the COT, there can exist (at most) a switching from a DL/UL transmission part to an UL/DL transmission part at this slot; in addition, there can exist a paired switching from UL/DL back to DL/UL either at the end of this slot, or at the beginning of the following slot. An illustration of this example is provided in FIG. 34, wherein the DL transmission (e.g., UL grant) happens at the beginning of each slot. Another possible instance of this example is where the UE first transmits UL transmissions at the beginning of each slot, while a gNB responds with HARQ-ACK in DL transmission part at the end of each slot.

In another example of this embodiment, within the COT, if a slot has the DL/UL switching point(s), the switching point position can be possibly different from the switching point of other slots within the COT. In another example, within the COT, some fraction of the slots can have one DL to UL switching point and/or one UL to DL switching point; while other slots can have no switching points, with a maximum of one DL to UL switching point and/or one UL to DL switching point every slot.

Figure 35:
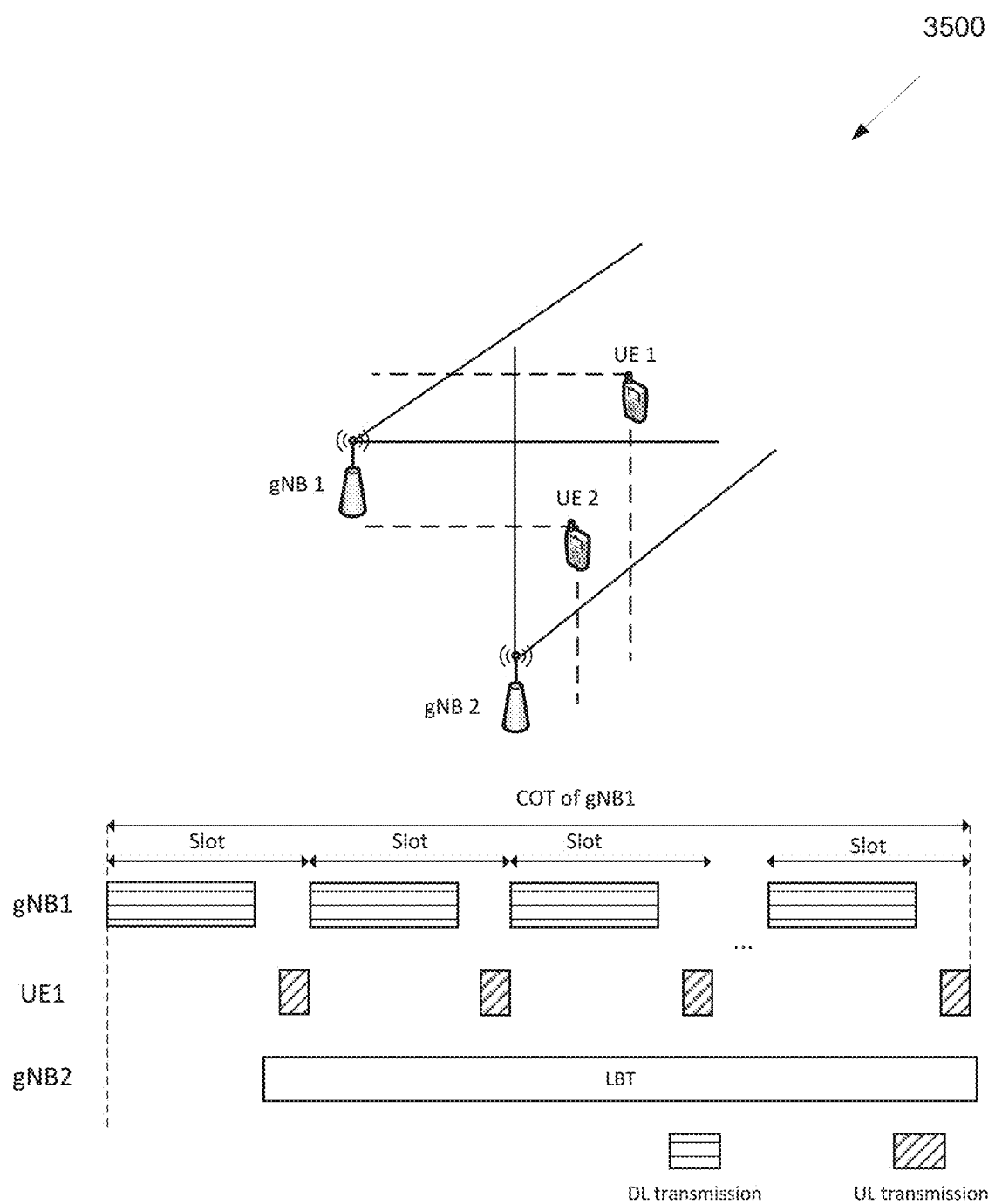
FIG. 35 illustrates another example downlink centric COT structure according to embodiments of the present disclosure.

FIG. 35 illustrates another example downlink centric COT structure 3500 according to embodiments of the present disclosure. The embodiment of the downlink centric COT structure 3500 illustrated in FIG. 35 is for illustration only. FIG. 35 does not limit the scope of this disclosure to any particular implementation.

This embodiment is inherent from the self-contained slot structure of NR licensed, and the downlink-centric self-contained slot has more frequent HARQ-ACK reports which allow faster link adaptation based on UE feedbacks. In addition, this embodiment allows more frequent DL/UL switching within the COT, and supporting that it can reduce the probability for new hidden terminal to appear during the transmission compared to option 1. An illustration is provided in FIG. 35, wherein a gNB1 transmits to UE1 in a downlink-centric self-contained COT with this embodiment, while a gNB2 intends to transmit to UE2. Since UL transmission from UE1 happens at the end of every slot and that the gNB2 can detect the transmission from UE1, the LBT of the gNB2 fails during the COT of the gNB1. Therefore, the gNB2 may not transmit while UE1 is receiving from the gNB1 with self-contained COT option 2, as opposed to scenario in FIG. 32.

In another embodiment, the self-contained COT can have at most one DL to UL switching point and/or one UL to DL switching point at every N (N>1) slots within the COT. In one example of this embodiment, N can be predefined, for a given carrier frequency range. In another example of this embodiment, N can be configurable by the higher layer as a value, from a list, for a given carrier frequency range.

In one example of this embodiment, for the case of a gNB obtained COT, i.e., the COT is obtained following a successful CAT-4 LBT at the gNB side (e.g., downlink-centric self-contained COT), there can exist (at most) a switching from a DL transmission part to an UL transmission part (e.g., HARQ-ACK feedback) at every N (N>1) slots; in addition, there can exist a paired switching from UL back to DL following the end of the UL transmission.

Figure 36:
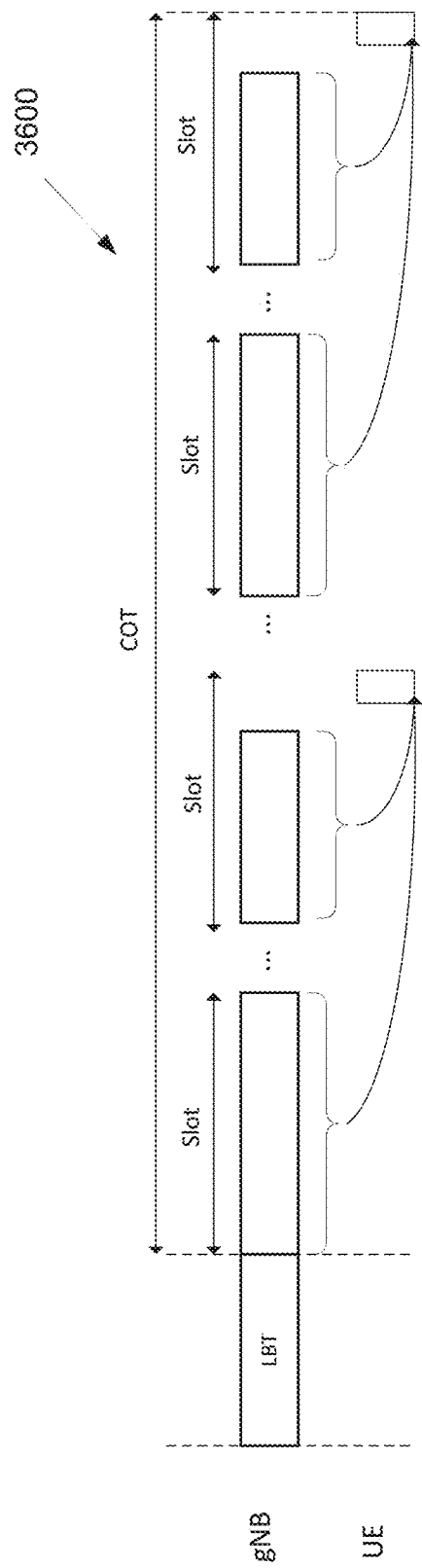
FIG. 36 illustrates yet another example COT structure according to embodiments of the present disclosure.

FIG. 36 illustrates yet another example COT structure 3600 according to embodiments of the present disclosure. The embodiment of the COT structure 3600 illustrated in FIG. 36 is for illustration only. FIG. 36 does not limit the scope of this disclosure to any particular implementation.

In another example of this embodiment, if the number of slots within the COT M is not an integer multiple of N, a short UL transmission part can be transmitted at the end of the COT that corresponds to the last M−N*floor(M/N) slots. An illustration of the downlink-centric self-contained COT for this embodiment is provided in FIG. 36, wherein the UL transmissions happen at the end of every N slots.

In one example of this embodiment, when the LBT for data transmissions follows LBT with a random backoff counter wherein the backoff counter is generated according to an adaptive CWS, the CWS can be updated based on the HARQ-ACK values corresponding to the PDSCH transmission(s) within the self-contained COT. In one sub-example, if at least Z (0⇐Z⇐100) percent of HARQ-ACK values in a reference UL transmission part are determined as NACK, the contention window size (CWS) can be increased to the next higher allowed value; otherwise the CWS can be set to the minimum allowed CWS value for a given LBT priority class. The reference UL transmission part can be corresponded to the first N slots within the COT wherein the HARQ-ACK feedbacks are received; or the first N slots within the COT; or N slots within the COT wherein most HARQ-ACK feedbacks are received. In another sub-example, if at least Z (0⇐Z⇐100) percent of all the HARQ-ACK values received within the COT are determined as NACK, the contention window size (CWS) can be increased to the next higher allowed value; otherwise the CWS can be set to the minimum allowed CWS value for a given LBT priority class.

Figure 37:
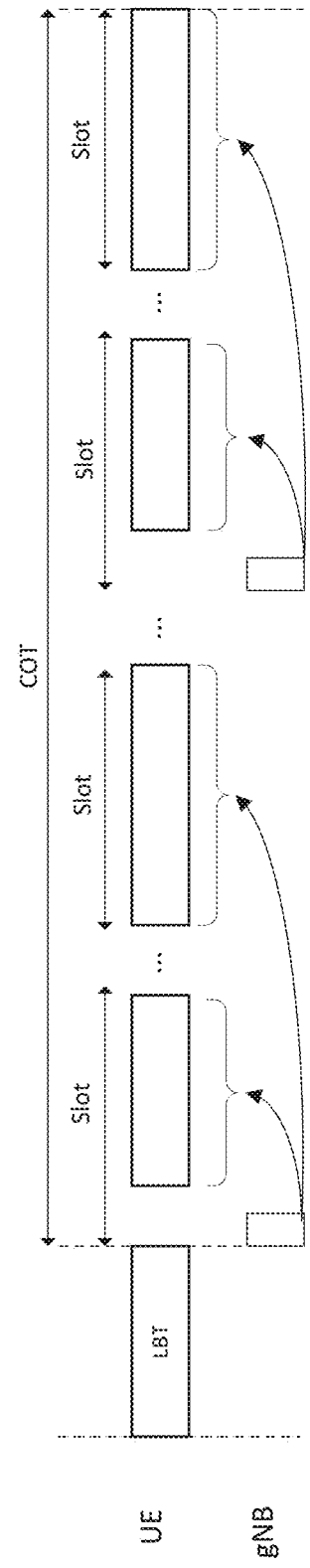
FIG. 37 illustrates yet another example COT structure according to embodiments of the present disclosure.

FIG. 37 illustrates yet another example COT structure 3700 according to embodiments of the present disclosure. The embodiment of the COT structure 3700 illustrated in FIG. 37 is for illustration only. FIG. 37 does not limit the scope of this disclosure to any particular implementation.

In one example of this embodiment, for the case of a UE obtained COT, i.e., the COT is obtained following a successful CAT-4 LBT at the UE side (e.g., uplink-centric self-contained COT), there can exist (at most) a switching from a DL/UL transmission part to an UL/DL transmission part at every N (N>1) slots; in addition, there can exist a paired switching from UL/DL back to DL/UL following the end of the UL/DL transmission. In one sub-example, if the number of slots within the COT M is not an integer multiple of N, a short DL transmission part can be transmitted at the beginning of the remaining M−N*floor(M/N) slots within the COT. An illustration of the uplink-centric self-contained COT for this example is provided in FIG. 37, wherein the DL transmission (e.g., UL grant) happens at the beginning of every N (N>1) slots. Another possible instance of this example is where the UE first transmits UL transmissions while a gNB responds with HARQ-ACK in DL transmission part at the end of every N (N>1) slots.

In another example of this embodiment, the switching point positions for different N (N>1) slots within the COT can be different. In another example, within the COT, some fraction of the slots can have one DL to UL switching point and/or one UL to DL switching point; while other slots can have no switching points, with a maximum of one DL to UL switching point and/or one UL to DL switching point every N (N>1) slot within the COT.

This embodiment can lead to better balance between the UE implementation complexity and latency (e.g., feedback latency for DL-centric) compared to previous two embodiments. In addition, it also can reduce the probability for new hidden terminal to appear during the transmission compared to option 1 (e.g., the scenario in FIG. 32).

In another embodiment, the self-contained COT can also have at most one or multiple DL to UL switching points and/or UL to DL switching points within one slot. In one example of this embodiment, this can be supported through having multiple DL and UL portions within one slot. In another example of this embodiment, this can be supported through including multiple mini-slots within one slot, wherein the mini-slot can be DL-only/UL-only or DL-centric/UL-centric with one switching point. In another example of this embodiment, the maximum number of DL/UL switching points supported within one slot can be predefined by the specification, or configurable such as through downlink control information (DCI) or higher layer parameter.

Figure 38:
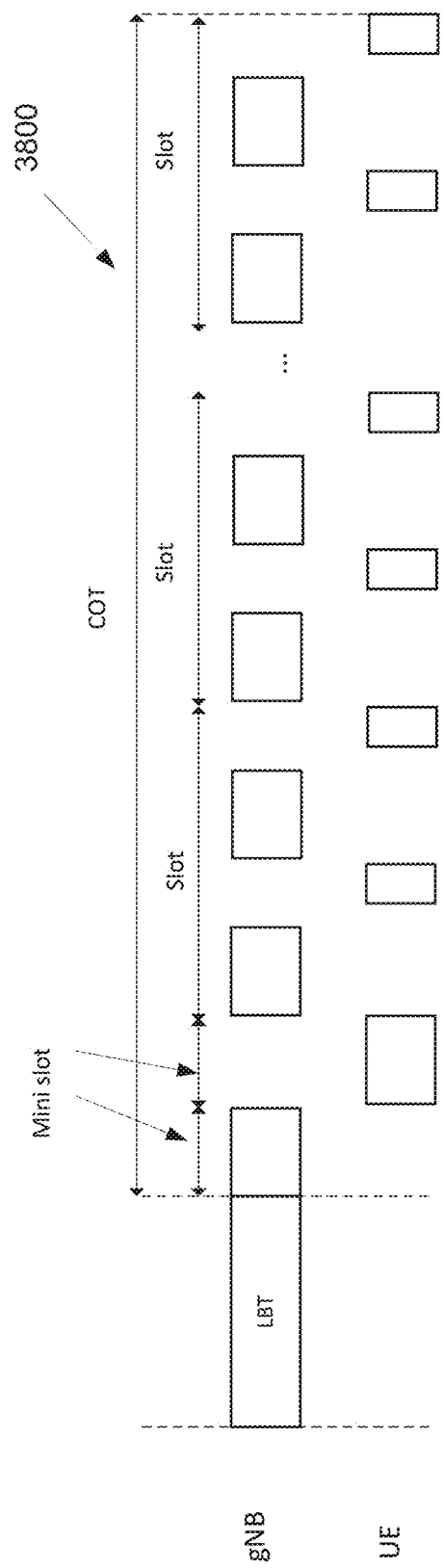
FIG. 38 illustrates yet another example COT structure according to embodiments of the present disclosure.

FIG. 38 illustrates yet another example COT structure 3800 according to embodiments of the present disclosure. The embodiment of the COT structure 3800 illustrated in FIG. 38 is for illustration only. FIG. 38 does not limit the scope of this disclosure to any particular implementation.

In one example of this embodiment, for the case of a gNB obtained COT, i.e., the COT is obtained following a successful CAT-4 LBT at the gNB side (e.g., downlink-centric self-contained COT), within a slot of the COT, there can exist (at most) one or multiple DL to UL switching and/or UL to DL switching(s). In one sub-example, one or multiple UL transmission part (e.g., UL control information; UE handshake message) can be transmitted within one slot. An illustration of this example is provided in FIG. 38, wherein a downlink mini-slot and an uplink mini-slot are transmitted at the beginning of the COT (e.g., for handshake message change between a gNB and a UE), and there can exist multiple UL transmission parts within every slot.

In another example of this embodiment, when the LBT for data transmissions follows LBT with a random backoff counter wherein the backoff counter is generated according to an adaptive CWS, the CWS can be updated based on the HARQ-ACK values corresponding to the PDSCH transmission(s) within the self-contained COT. In one sub-example, if at least $Z$ ($0 \Leftarrow Z \Leftarrow 100$) percent of HARQ-ACK values in a reference UL transmission part are determined as NACK, the contention window size (CWS) can be increased to the next higher allowed value; otherwise the CWS can be set to the minimum allowed CWS value for a given LBT priority class. The reference UL transmission part can be corresponded to the first UL transmission part within the COT wherein the HARQ-ACK feedbacks are received; or the UL transmission part within the COT wherein most HARQ-ACK feedbacks are received. In another sub-example, if at least $Z$ ($0 \Leftarrow Z \Leftarrow 100$) percent of HARQ-ACK values in a reference slot are determined as NACK, the contention window size (CWS) can be increased to the next higher allowed value; otherwise the CWS can be set to the minimum allowed CWS value for a given LBT priority class.

The reference slot can be the slot within the COT wherein the HARQ-ACK feedbacks are received; or the slot within the COT wherein most HARQ-ACK feedbacks are received. In another sub-example, if at least $Z$ ($0 \Leftarrow Z \Leftarrow 100$) percent of all the HARQ-ACK values received within the COT are determined as NACK, the contention window size (CWS) can be increased to the next higher allowed value; otherwise the CWS can be set to the minimum allowed CWS value for a given LBT priority class.

Figure 39:
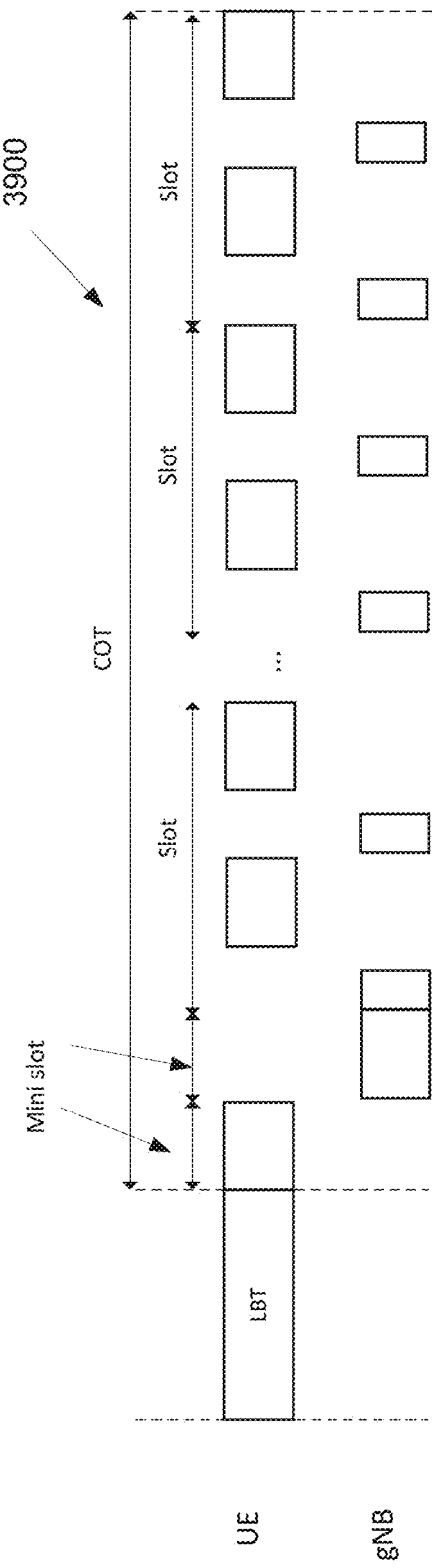
FIG. 39 illustrates yet another example COT structure according to embodiments of the present disclosure.

FIG. 39 illustrates yet another example COT structure 3900 according to embodiments of the present disclosure. The embodiment of the COT structure 3900 illustrated in FIG. 39 is for illustration only. FIG. 39 does not limit the scope of this disclosure to any particular implementation.

In one example of this embodiment, for the case of a UE obtained COT, i.e., the COT is obtained following a successful CAT-4 LBT at the UE side (e.g., uplink-centric self-contained COT), within a slot of the COT, there can exist (at most) one or multiple UL to DL switching and DL to UL switching. An illustration of the uplink-centric self-contained COT for this example is provided in FIG. 39, wherein an uplink mini-slot and a downlink mini-slot are transmitted at the beginning of the COT (e.g., for handshake message change between a gNB and a UE), and there can exist multiple DL transmission parts within every slot.

In another example of this embodiment, within the COT, if a slot has the DL/UL switching point(s), the switching point position can be possibly different from the switching point of other slots within the COT. In another example, within the COT, some fraction of the slots can have one or multiple switching points; while other slots can have no switching points, with the total number of DL to UL and/or UL to DL switching points within each slot does not exceed N.

This embodiment can be used to transmit handshake messages between a gNB and a UE, or to support even faster HARQ-ACK feedback for the downlink-centric self-contained slot. In addition, it also further reduce the probability for new hidden terminal to appear during the transmission (e.g., the scenario in FIG. 32) compared to other options.

In another embodiment, the self-contained COT can also have at most N (N>=1) DL/UL switching points within the COT.

In one example of this embodiment, N can be predefined, for a given carrier frequency range. In another example of this embodiment, N can be configurable such as through downlink control information (DCI) or higher layer parameter. In one sub-example, N can be scalable with respect to the COT length and/or the sub-carrier spacing, such that a higher number of N can be chosen with larger COT length and/or higher subcarrier spacing.

In another example of this embodiment, the exact position for each DL/UL switching point can be flexible within the COT. In one sub-example, the switching point position can be up to the gNB determination. In another sub-example, within the COT, some fraction of the slots can have one or multiple switching points; while other slots can have no switching points, with the total number of DL to UL and UL to DL switching points does not exceed N.

Figure 40:
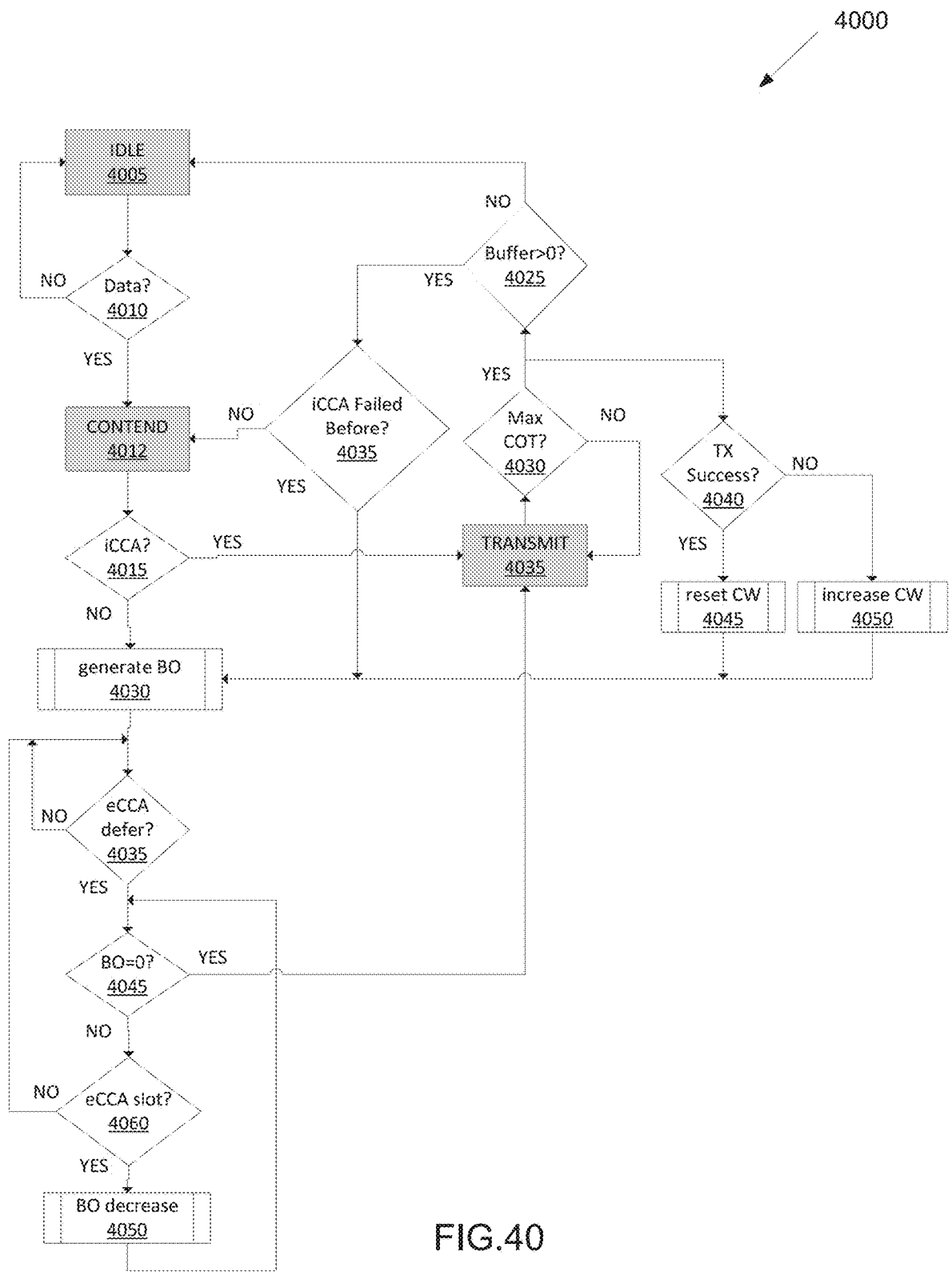
FIG. 40 illustrates a flowchart of a method for an LBT operation according to embodiments of the present disclosure.

FIG. 40 illustrates a flowchart of a method 4000 for an LBT operation according to embodiment of the present disclosure, as may be performed by a base station (BS) (e.g., 101-103 as illustrated in FIG. 1) or user equipment (UE) (e.g., 111-116 as illustrated in FIG. 1). The embodiment of the method 4000 illustrated in FIG. 40 is for illustration only. FIG. 40 does not limit the scope of this disclosure to any particular implementation.

As illustrated in FIG. 40, an eNB (e.g., BS) may perform a transmission after sensing the channel to be idle during the slot durations of a defer duration (4015) and after the backoff counter (BO) is zero (405). The backoff counter is adjusted by sensing the channel for additional slot duration(s) according to the steps below.

In step (1), the counter is set as a random number uniformly distributed between 0 and contention window (CW) value (4030), and go to step (4). In step (2), if the counter is greater than 0, and the eNB chooses to decrement the counter, decrease the counter by 1 (4050). In step (3), the channel is sensed for additional slot duration, and if the additional slot duration is idle, go to step (4); else, go to step (5). In step (4), if the counter is 0, stop; else, go to step (2). In step (5), the channel is sensed until either a busy slot is detected within an additional defer duration or all the slots of the additional defer duration are detected to be idle. In step (6), if the channel is sensed to be idle during all the slot durations of the additional defer duration, go to step (4); else, go to step (5). In one embodiment, time granularity to perform LBT for NR unlicensed is provided. The time granularity to perform LBT is referred to as the minimum time unit for performing LBT. In one example, this can be the duration for the channel to be sensed as idle in order to decrement the contention window size (CWS) for LBT with random back-off schemes (e.g., category 4 LBT of LTE-LAA). Specifically, when LTE-LAA performs the category 4 LBT according to the procedure in FIG. 40, LBT with a random backoff counter, the backoff counter is decremented if the channel is idle for one eCCA slot duration with 9 μs. This time granularity for LBT is much smaller than the 71.4 μs OFDM symbol period of LTE-LAA, and it also coincides with the slot length of Wi-Fi system that operates in the 5 GHz unlicensed band, wherein the Wi-Fi slot is the minimum Wi-Fi time unit for performing LBT and is predefined based on carrier frequency.

In addition, the 34 μs iCCA period/eCCA defer period of LTE-LAA category 4 LBT in FIG. 40 is the same as the DIFS duration of the 5 GHz Wi-Fi, and the 25 µs single-shot LBT duration of LTE-LAA is the same as the PIFS duration of 5 GHz Wi-Fi. Due to the time granularity of LTE-LAA LBT is much shorter than the OFDM symbol period, as well as the choice of iCCA period/eCCA defer period, the end of category 4 LBT or single-shot LBT for LTE-LAA can succeed in the middle of an OFDM symbol, and reservation/alignment signal needs to be transmitted to align the start of LAA transmission, which leads to significant resource overhead for LTE-LAA.

In one embodiment, similar to LTE-LAA, NR-U can also utilize the Wi-Fi slot length as the time granularity for performing LBT at a predefined carrier frequency, which is 9 µs in the 5 GHz unlicensed band and 5 µs in the 60 GHz unlicensed band. In addition, the iCCA period/eCCA defer period of category 4 LBT for NR-U can also be the same as the DIFS duration of Wi-Fi, which is 34 µs and 13 µs for 5 GHz and 60 GHz unlicensed band respectively; and the single-shot LBT duration of NR-U to be the same as the PIFS duration of Wi-Fi, which is 25 µs and 8 µs for 5 GHz and 60 GHz unlicensed band respectively. However, the end of NR-U LBT with this option can still occur in the middle of an OFDM symbol, such that reservation/alignment signal needs to be transmitted to align the start of NR-U transmission.

In contrast to LTE-LAA which only supports a fixed subcarrier spacing of 15 KHz, NR-U can inherit from NR licensed to support flexible subcarrier spacing for different carrier frequency range. TABLE 2 illustrates the potential supported subcarrier spacing, as well as the corresponding average symbol length and slot length for NR-U. It can be observed from TABLE 2 that NR-U symbol length with higher subcarrier spacing than 15 KHz can become similar to or even smaller than Wi-Fi slot length. Specifically, in the 5 GHz unlicensed band, NR-U symbol length with 60 KHz subcarrier spacing is comparable to the 9 µs Wi-Fi slot (e.g., 802.11 ac) length; and in the 60 GHz unlicensed band, NR-U symbol length with 120 KHz/240 KHz/480 KHz subcarrier spacing is comparable to or even smaller than the 5 µs Wi-Fi slot (e.g., 802.11 ad/ay) length.

TABLE 2

Symbol and slot length for subcarrier spacing

| Subcarrier spacing | Average symbol length | Slot length |
|---|---|---|
| 15 KHz | 71.4 µs | 1000 µs |
| 30 KHz | 35.7 µs | 500 µs |
| 60 KHz | 17.8 µs (normal CP) 20.8 µs (extended CP) | 250 µs |
| 120 KHz | 8.9 µs | 125 µs |
| 240 KHz | 4.46 µs | 62.5 µs |
| 480 KHz | 2.23 µs | 31.25 µs |

In one embodiment, based on the above observation, NR-U can use one or multiple NR-U symbol length(s) as the granularity to perform NR-U LBT for a given subcarrier spacing at a certain carrier frequency. In particular, for a certain unlicensed carrier frequency, denote the NR-U symbol duration at a given subcarrier spacing as TN and the Wi-Fi slot length as $\tau_W$, respectively, the following options regarding NR-U LBT time granularity are possible: in a first example of this embodiment, denoted by option 1, the time granularity of NR-U LBT can be chosen as only one NR-U symbol durations $\tau_N$; in a second example of this embodiment, denoted by option 2: the time granularity of NR-U LBT can be chosen as $n_1 * \tau_N$, wherein $n_1 = \mathrm{ceil}(\tau_W/\tau_N)$; and In a third example of this embodiment, denoted by option 3: the time granularity of NR-U LBT can be chosen as $n_2 * \tau_N$, wherein $n_2 = \max(1, \mathrm{round}(\tau_W/\tau_N))$, wherein round( ) can refer to rounding to the nearest integer operation or rounding down operation (i.e., floor).

TABLE 3 and TABLE 4 illustrate the examples of NR-U LBT granularity for various options in 5 GHz unlicensed band with 9 µs Wi-Fi slot length and 60 GHz unlicensed band with 5 µs Wi-Fi slot length respectively.

TABLE 3

NR-U LBT granularity

| Subcarrier spacing | LBT granularity with option 1 | LBT granularity with option 2 | LBT granularity with option 3 |
|---|---|---|---|
| 15 KHz | 1 symbol | 1 symbol | 1 symbol |
| 30 KHz | 1 symbol | 1 symbol | 1 symbol |
| 60 KHz | 1 symbol | 1 symbol | 1 symbol |
| 120 KHz | 1 symbol | 2 symbols | 1 symbol |

TABLE 4

NR-U LBT granularity

| Subcarrier spacing | LBT granularity with option 1 | LBT granularity with option 2 | LBT granularity with option 3 |
|---|---|---|---|
| 60 KHz | 1 symbol | 1 symbol | 1 symbol |
| 120 KHz | 1 symbol | 1 symbol | 1 symbol |
| 240 KHz | 1 symbol | 2 symbols | 1 symbol |
| 480 KHz | 1 symbol | 3 symbols | 2 symbols |

In one sub-embodiment, when NR-U uses LBT with a random backoff counter scheme with similar procedure to that in FIG. 40, the LBT procedure can be modified to incorporate the LBT time granularity of NR-U. In one example, the random back-off counter can be initially generated according to the same procedure as in FIG. 40 with an LBT granularity of eCCA slot length $\tau_W$. If the random backoff counter value is N, and the time granularity of NR-U LBT is $n * \tau_N$, then the updated random back-off counter for NR-U becomes $N' = \mathrm{ceil}(N * \tau_W / n / \tau_N)$. In this case, the updated random back-off counter is decremented if the channel is sensed idle for duration of $n * \tau_N$, and the LBT procedure is successful if the updated random back-off timer reaches 0. In particular, when the time granularity of NR-U LBT includes multiple eCCA slots (e.g., NR-U with 15/30 KHz SCS in 5 GHz unlicensed band), this LBT procedure for NR-U can be viewed as a "quantized" random backoff procedure compared to the legacy CAT-4 LBT procedure of LTE-LAA in FIG. 40. In another example, dedicated contention window sizes for various LBT priority class can be defined for NR-U with an LBT time granularity of one or multiple NR-U symbol length(s). This can be applied to both sub-7 GHz NR unlicensed system and above-7 GHz NR unlicensed system.

In another embodiment, the iCCA period/eCCA defer period of category 4 LBT (e.g., LBT with variable contention window size), as well as the single-shot LBT duration for NR-U can also be chosen as one or multiple NR-U symbol length(s). In particular, for a certain unlicensed carrier frequency, denote the NR-U symbol duration at a given subcarrier spacing as $\tau_N$ and the defer duration as $\tau_D$ respectively (e.g., the iCCA or eCCA period), the following examples are possible.

In one example, the iCCA period/eCCA defer period of category 4 LBT for NR-U can be chosen as $n_3 * \tau_N$, wherein $n_3 = \mathrm{ceil}(\tau_D/\tau_N)$.

In another example, the iCCA period/eCCA defer period of category 4 LBT for NR-U can be chosen as $n_4 * \tau_N$, wherein $n_4 = \max(1, \text{round}(\tau_D/\tau_N))$, and round( ) can refer to rounding to the nearest integer operation or rounding down operation (i.e., floor).

In another example, the single-shot LBT duration of NR-U can be chosen as $n_5 * \tau_N$, wherein $n_5 = \text{ceil}(\tau_P/\tau_N)$ and $\tau_P$ denotes the PIFS duration (e.g., 25 μs and 8 μs for sub-7 GHz bands and above-7 GHz bands respectively).

In yet another example, the single-shot LBT duration of NR-U can be chosen as $n_6 * \tau_N$, wherein $n_6 = \max(1, \text{round}(\tau_P/\tau_N))$, and round( ) can refer to rounding to the nearest integer operation or rounding down operation (i.e., floor), wherein $n_5 = \text{ceil}(\tau_P/\tau_N)$ and $\tau_P$ denotes the PIFS duration (e.g., 25 μs and 8 μs for sub-7 GHz bands and above-7 GHz bands respectively).

In yet one example, if defer period of category 4 LBT for NR-U is can be chosen as $\tau_D = \tau_s + m_p * \tau_W$, $\tau_s$ is the SIFS duration, $\tau_W$ is the slot duration, while $m_p$ is the number of consecutive slots within the defer duration, then the iCCA period/eCCA defer period of category 4 LBT for NR-U can be chosen as $\tau_s + n_6 * \tau_N$, wherein $n_6 = \text{ceil}(m_p * \tau_W/\tau_N)$.

In yet one example, if defer period of category 4 LBT for NR-U is can be chosen as $\tau_D = \tau_s + m_p * \tau_W$, $\tau_s$ is the SIFS duration, $\tau_W$ is the slot duration, while $m_p$ is the number of consecutive slots within the defer duration, then the iCCA period/eCCA defer period of category 4 LBT for NR-U can be chosen as $\tau_s + n_7 * \tau_N$, wherein $n_7 = \max(1, \text{round}(m_p * \tau_W/\tau_N))$.

In yet one example, if defer period of category 4 LBT for NR-U is can be chosen as $\tau_D = \tau_s + m_p * \tau_W$, $\tau_s$ is the SIFS duration, $\tau_W$ is the slot duration, while $m_p$ is the number of consecutive slots within the defer duration, then the iCCA period/eCCA defer period of category 4 LBT for NR-U can be chosen as $(n_9 + n_8) * \tau_N$, wherein $n_8 = \text{ceil}(m_p * \tau_W/\tau_N)$ and $n_9 = \text{ceil}(\tau_s/\tau_N)$.

In yet one example, if defer period of category 4 LBT for NR-U is can be chosen as $\tau_D \tau_s + m_p * \tau_W$, $\tau_s$ is the SIFS duration, $\tau_W$ is the slot duration, while $m_p$ is the number of consecutive slots within the defer duration, then the iCCA period/eCCA defer period of category 4 LBT for NR-U can be chosen as $(n_{11} + n_{10}) * \tau_N$, wherein $n_{11} = \max(1, \text{round}(m_p * \tau_W/\tau_N))$ and $n_{10} = \max(1, \text{round}(\tau_s/\tau_N))$.

By utilizing the time-domain parameters for NR-U LBT provided in the aforementioned embodiments, some other details regarding the NR-U LBT are detailed as follows. In one embodiment, using NR-U symbol length(s) as the LBT granularity can ensure that the end of LBT is always aligned at NR-U symbol boundary. As a result, NR-U transmission can start immediately following the symbol that finishes the LBT (e.g., transmission can start at a mini-slot that follows the symbol which finishes LBT), in which case no reservation signal is needed. However, UE may need to monitor for PDCCH of mini-slot with potentially higher power consumption. In another embodiment, the COT corresponding to the LBT can end at a slot boundary for simplicity; or a mini-slot/partial slot boundary to maximize resource utilization.

In yet another embodiment, the provided time-domain parameters for NR-U LBT can be used by NR-U for NR-U and Wi-Fi coexistence, as well as NR-U and NR-U coexistence when Wi-Fi is not present; in addition, besides the 5 GHz and 60 GHz unlicensed bands, these parameters can also be used by NR-U in other unlicensed/shared spectrum such as the 6 GHz and 37 GHz bands.

The benefits of the provided LBT procedures for NR-U with provided time-domain NR-U LBT parameters can include: (1) reservation/alignment signal similar to LTE-LAA can be eliminated; (2) using OFDM symbol(s) as LBT time granularity can make it simpler to configure the time-domain resource for NR-U LBT procedure in general, for both category 4 and single-shot type of LBT; (3) simpler implementation for NR-U LBT and correspondingly less power consumption since LBT is performed on NR-U symbol-level; and (4) supporting OFDM symbol as LBT time granularity can also facilitate the design for performing LBT utilizing the self-contained MCOT.

In one embodiment, self-contained LBT for NR unlicensed is provided.

In general, a potential transmission in the unlicensed band can be granted channel access if the following two conditions can be met simultaneously: condition (1): the receiver(s) of the potential transmission is ready to receive; and condition (2): the potential transmission may not cause strong interference to the receivers of ongoing transmissions.

Satisfying condition (1) ensures that the potential transmission can have enough SINR and can avoid the hidden node issue. Satisfying condition (2) ensures that the potential transmission can provide fair coexistence with ongoing transmissions, which is an essential requirement by unlicensed band regulations. Given the support of self-contained COT for NR-U, a "self-contained LBT" scheme can be provided for NR-U by utilizing the self-contained COT structure, such that at least condition (2) can be ensured by performing LBT at the potential transmitter side for NR-U.

In one embodiment, the self-contained LBT scheme refers to the NR-U LBT schemes that utilize the self-contained COT structure of NR-U, such that the LBT duration performed by a potential NR-U transmitter can be chosen to span over one or multiple DL/UL switching points of the self-contained COT of neighboring NR-U transmissions. This self-contained LBT scheme can enable the potential transmitter to obtain the information of neighboring NR-U transmitters and receivers, such that the potential transmitter can determine whether or not the transmission may cause strong interference to ongoing NR-U transmissions.

Figure 41:
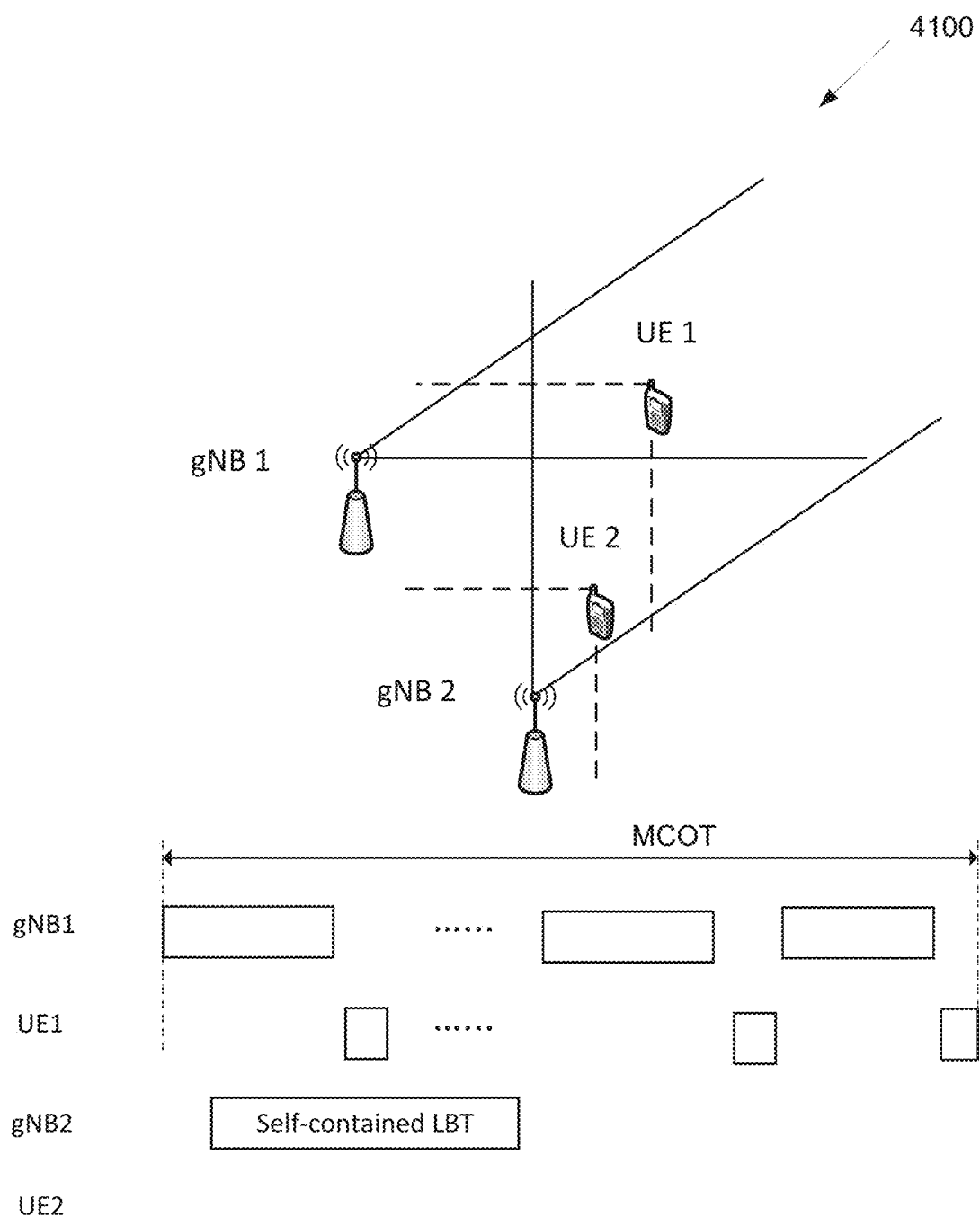
FIG. 41 illustrates an example LBT procedure according to embodiments of the present disclosure.

FIG. 41 illustrates an example LBT procedure 4100 according to embodiments of the present disclosure. The embodiment of the LBT procedure 4100 illustrated in FIG. 41 is for illustration only. FIG. 41 does not limit the scope of this disclosure to any particular implementation.

Figure 42:
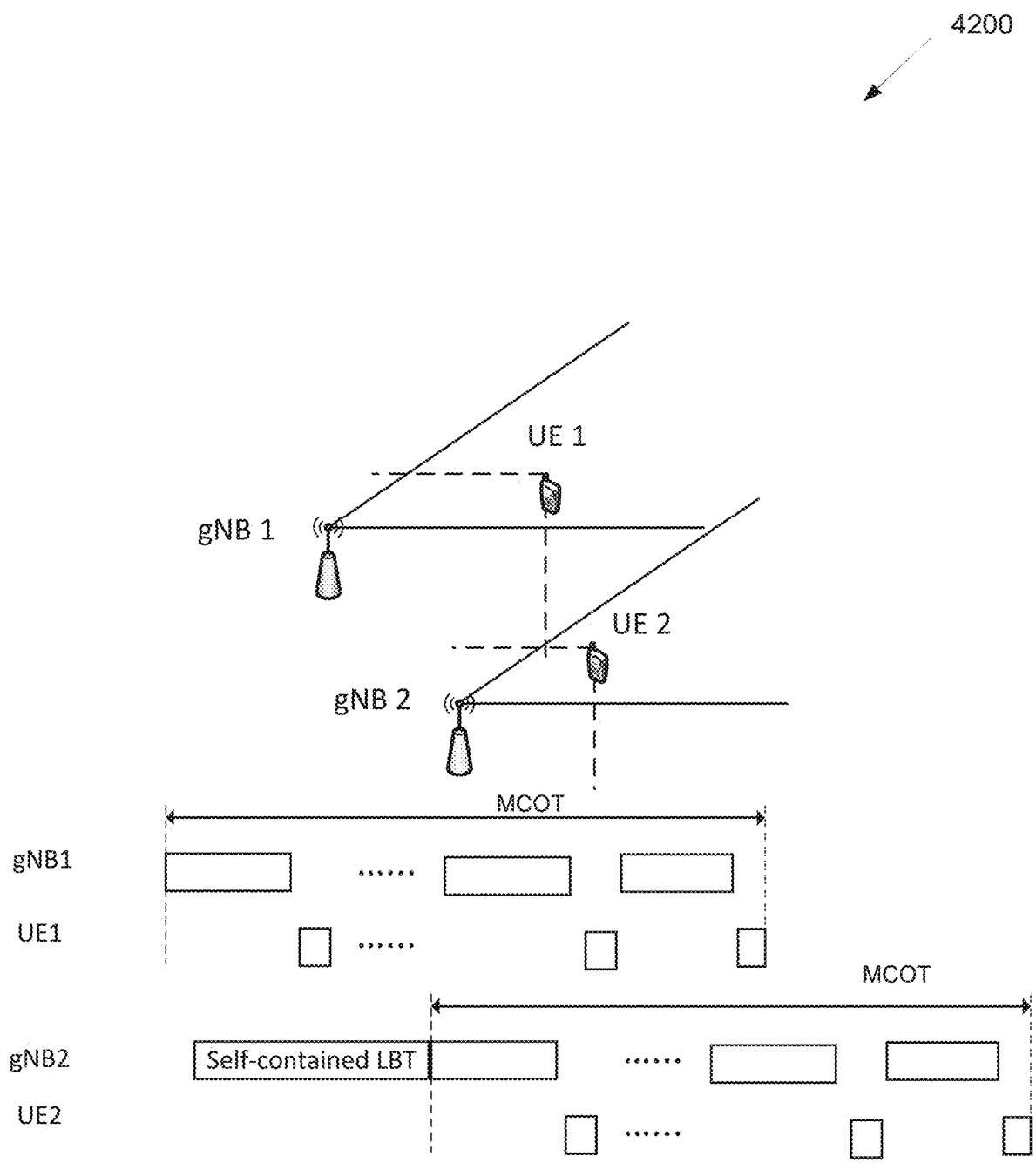
FIG. 42 illustrates another example LBT procedure according to embodiments of the present disclosure.

FIG. 42 illustrates another example LBT procedure 4200 according to embodiments of the present disclosure. The embodiment of the LBT procedure 4200 illustrated in FIG. 42 is for illustration only. FIG. 42 does not limit the scope of this disclosure to any particular implementation.

FIG. 41 and FIG. 42 provide illustrations of two examples for the self-contained LBT procedure. Specifically, in both FIG. 41 and FIG. 42, a gNB2 performs the self-contained LBT to determine whether or not the gNB2 can transmit to UE2, while a gNB1 is currently transmitting to UE1 with a self-contained COT, wherein the self-contained follows option 2, option 3 or option 4. In addition, the LBT duration performed by the gNB2 spans over at least one DL/UL switching point of the self-contained COT for the gNB1. FIG. 41 illustrates the scenario where with the self-contained LBT, the gNB2 can detect the strong energy on the uplink symbol, and thus the gNB2 can infer that the transmission may collide at existing receiver of ongoing transmissions. Without the self-contained MCOT structure or if the self-contained LBT at the gNB2 does not include the uplink symbol of the gNB1-UE1 MCOT, the gNB2 can succeed in LBT and transmit as a hidden node to UE1.

FIG. 42 illustrates the scenario wherein the energy level detected by a gNB2 over the entire self-contained LBT duration is below certain threshold, thus the gNB2 determines the gNB2 can transmit to a UE2 without causing interference at the existing gNB1 to a UE1 transmission. The details of the self-contained LBT procedure are discussed in the rest of the embodiment.

One design consideration is regarding the procedure for the self-contained LBT. In order for the self-contained LBT to be effective, the LBT duration may contain one or multiple DL/UL switching points for the self-contained COT of neighboring transmission. For a given self-contained COT structure (e.g., option 2, option 3, or option 4 in the aforementioned embodiments) utilized by existing transmissions, this means there exists a minimum duration for LBT (e.g., LBT needs to be at least one NR-U slot if there is one switching point at every slot within the COT). Such requirement cannot be guaranteed by the LAA CAT4 LBT in general, since the random backoff counter of CAT4 LBT is within 0 and CWS-1, and the CAT4 LBT duration can be as short as the eCCA defer period, or PIFS.

In one embodiment, the following new LBT types can be defined for NR-U to enable the self-contained LBT.

In one example of this embodiment, denoted by LBT type 1, the self-contained LBT can be performed for a fixed duration T, which can be one or multiple NR-U slot (or mini-slot if the DL/UL switching happens on mini-slot level) duration(s).

In one sub-example, the time granularity to perform LBT can be one or multiple NR-U symbol durations as detailed in the aforementioned embodiments and the self-contained LBT can be determined as successful if the energy perceived on every time granularity within the LBT duration does not exceed certain energy detection threshold $\Gamma_1$. For instance, $\Gamma_1$ can be determined by following the energy detection threshold adaptation procedure of LTE-LAA. In another instance, $\Gamma_1$ can be determined as $\Gamma_1=k*\Gamma$, wherein k can be ceil(NR-U LBT time granularity/Wi-Fi slot length), and F can be determined by following the energy detection threshold adaptation procedure of LTE-LAA.

In another sub-example, the self-contained LBT can be determined as successful if the energy perceived over the entire LBT duration does not exceed certain energy detection threshold $\Gamma_2$. In one instance, $\Gamma_2$ can be chosen as $\Gamma_2=m*\Gamma_1$, where m is the number of time granularity within the LBT duration T, and the time granularity can be determined according to the aforementioned embodiments.

In another example of this embodiment, denoted by LBT type 2, the self-contained LBT can first be performed for a fixed duration T, which can be one or multiple NR-U slot (or mini-slot if the DL/UL switching happens on mini-slot level) durations; plus an additional flexible LBT period, which can be used to align the end of the LBT at the slot boundary. Since the self-contained LBT can start at a flexible symbol position within the NR-U slot, the duration of type 2 self-contained LBT may depend on the starting symbol position of the LBT.

In one sub-example, the time granularity to perform LBT can be one or multiple NR-U symbol durations as detailed in the aforementioned embodiments and the self-contained LBT can be determined as successful if the energy perceived on every time granularity within the LBT duration does not exceed certain energy detection threshold $\Gamma_1$. In one instance, $\Gamma_1$ can be determined by following the energy detection threshold adaptation procedure of LTE-LAA. In another example, $\Gamma_1$ can be determined as $\Gamma_1=k*\Gamma$, wherein k can be ceil (NR-U LBT time granularity/Wi-Fi slot length), and $\Gamma$ can be determined by following the energy detection threshold adaptation procedure of LTE-LAA.

In another sub-example, the self-contained LBT can be determined as successful if the energy perceived over the entire LBT duration does not exceed certain energy detection threshold $\Gamma_2$. In one example, $\Gamma_2$ can be chosen as $\Gamma_2=m*\Gamma_1$, where m is the number of time granularity within the LBT duration, and the time granularity can be determined according to the aforementioned embodiments.

In another example of this embodiment, denoted by LBT type 3, the self-contained LBT can be performed by following an LBT with a random backoff counter scheme, wherein the random back-off counter is randomly chosen between a minimum counter value and a maximum counter value, with the minimum counter value can correspond to a positive value.

In one sub-example, the minimum counter value can be one or multiple NR-U slot (or mini-slot if the DL/UL switching happens on mini-slot level) durations. As a result, the LBT duration with this type of self-contained LBT performed by a potential transmitter can contain one or multiple DL/UL switching points for the self-contained COT of neighboring transmissions.

In another sub-example, the time granularity to perform LBT can be one or multiple NR-U symbol durations as detailed in the aforementioned embodiments and the random back-off counter can be decremented if the energy perceived on one time granularity within the LBT duration does not exceed certain energy detection threshold $\Gamma_1$. In one instance, $\Gamma_1$ can be determined by following the energy detection threshold adaptation procedure of LTE-LAA. In another example, $\Gamma_1$ can be determined as $\Gamma_1=k*\Gamma$, wherein k can be ceil (NR-U LBT time granularity/Wi-Fi slot length), and $\Gamma$ can be determined by following the energy detection threshold adaptation procedure of LTE-LAA.

In another sub-example, the time granularity to perform LBT can be one Wi-Fi slot length similar to LTE-LAA, and the random back-off counter can be decremented if the energy perceived on one time granularity within the LBT duration does not exceed certain energy detection threshold $\Gamma_2$. In one example, $\Gamma_2$ can be determined by following the energy detection threshold adaptation procedure of LTE-LAA.

In another sub-example, the LBT type 3 is successful if the backoff counter reaches zero.

Another design consideration for the self-contained LBT procedure is regarding the beam directions to perform the self-contained LBT. In one embodiment, the potential transmitter can perform the self-contained LBT over one intended beam direction. In another embodiment, when hybrid BF architecture is supported, the transmitter can perform the self-contained LBT over multiple intended beam directions simultaneously; and the beam directions that succeed in the self-contained LBT can be utilized for data transmissions. In one example, it is up to the transmitter implementation to select the specific beam direction(s) to perform LBT.

Another design consideration is regarding the actions at the potential transmitter side if LBT fails during the self-contained LBT procedure. In one embodiment, if the self-contained LBT fails, the potential transmitter can switch to another transmit beam direction and restart new self-contained LBT procedure. In another embodiment, the potential transmitter can restart the self-contained LBT procedure on the same transmit beam direction. In one example, for LBT type 3, the random backoff counter can be re-generated for the new self-contained LBT procedure. In another embodiment, if the self-contained LBT fails on only a subset of beam directions over which the potential transmitter performs the self-contained LBT, the potential transmitter can cease these failed self-contained LBT procedures and continue the self-contained procedure on the remaining beam directions.

Another design consideration is regarding the MCOT that corresponds to a successful LBT for the three LBT types defined above. In one embodiment, the MCOT after a successful self-contained LBT can be 8 or 10 NR-U slots, which is similar to LBT priority class 3 and 4 of LTE-LAA. In another embodiment, since the self-contained LBT needs to span over at least one or multiple NR-U slots, the MCOT for self-contained LBT can be even longer to reward the longer LBT process, subject to unlicensed regulation. Specifically, the MCOT can be $\min(16/20$ NR-U slots, $T_{reg})$; wherein $T_{reg}$ is the MCOT allowed by regulation and is predefined for each unlicensed band, which can be 10 ms and 9 ms for 5 GHz band and 60 GHz band respectively.

Utilizing the self-contained LBT can enable a potential transmitter to determine if the transmission may cause strong interference to the ongoing transmissions, by performing the LBT only at the transmitter side. However, the potential transmitter cannot determine if the receiver(s) is ready to receive by only following the LBT type 1, type 2 or type 2 defined in this embodiment, and thus the hidden node issue is not fully addressed. As a result, another design consideration is regarding how to address the hidden node issue for the self-contained LBT process. One embodiment is to implement a simple handshake mechanism between a gNB and a UE after the self-contained LBT, such that the UE can indicate to the gNB whether or not it is ready receive through the handshake message/signal. Another embodiment is that for downlink transmission, the gNB can schedule multiple UEs in the first slot the gNB succeeds LBT, wherein these UEs can receive from the beam direction(s) that the gNB succeeds in self-contained LBT.

After the first slot, the gNB can re-allocate the resources based on which UE(s) respond the HARQ/ACK. If all UEs scheduled on one or multiple beam direction(s) that the gNB succeeds in self-contained LBT do not respond HARQ/ACK, e.g., due to a strong interferer nearby, the gNB can: (1) re-transmit to these the UEs again, or (2) transmit only on the other beams that also succeeded in self-contained LBT (if self-contained LBT is performed over multiple beams simultaneously) and HARQ/ACK from UEs are received, or (3) the gNB switches to other beam(s) which can require an extra self-contained LBT process.

To guarantee fair coexistence with the incumbent Wi-Fi system in the 5 GHz unlicensed spectrum, LTE Rel-13 licensed-assisted access (LAA), Rel-14 enhanced LAA (eLAA), and Rel-15 further enhanced LAA (feLAA) introduced energy detection based omni-directional clear channel assessment protocols for both downlink and uplink operations. The listen-before-talk (LBT) procedures of LTE-LAA/eLAA/feLAA can be utilized as the baseline channel access framework for NR unlicensed. In order to support new features of NR such as multi-beam operations and much wider channel bandwidth, enhancements over the baseline LTE-LAA/eLAA/feLAA channel access procedures need to be studied for NR unlicensed (NR-U).

To support the "multi-beam" operation on NR unlicensed, the directionality of LBT is an important design consideration. One baseline option is to perform LBT omni-directionally or quasi-omni-directionally similar to LAA and Wi-Fi. This option can provide good coexistence with these incumbent systems, but is conservative to support the "multi-beam" operation since interference from every direction is sensed uniformly. Another option is for the potential transmitter to perform directional LBT over the intended transmit direction, which is more suitable for multi-beam operation and can improve spatial reuse. However, directional LBT only at the potential transmitter side does not provide enough information about the status of the existing receivers of ongoing transmissions (e.g., the receiving directions), as well as the receiver(s) of the potential transmitter (e.g., if there exists nearby interferer to the receiver). As a result, this option can be inefficient, and the effect of hidden node issue and exposed node issue can be significant.

In general, a potential transmission in the unlicensed band can be granted channel access if the following two conditions can be met simultaneously: condition (1): the receiver(s) of the potential transmission is ready to receive; and condition (2): the potential transmission may not cause strong interference to the receivers of ongoing transmissions.

Satisfying condition (1) ensures that the potential transmission can have enough SINR and can avoid the hidden node issue. Satisfying condition (2) ensures that the potential transmission can provide fair coexistence with ongoing transmissions. LBT schemes that are performed at the potential transmitter side, which ensures the energy from the transmitters of ongoing transmissions is below certain threshold for certain duration (e.g., the LBT schemes in LTE-LAA), can approximately satisfy this condition. Such schemes could be effective for omni-directional communications such as LTE-LAA, wherein the interference perceived by the receiver can be approximated by the transmitter. However, for highly directional communications wherein the interference perceived by the directional transmitter and associated directional receiver differ drastically, such LBT schemes are not effective and the exposed node issue can be a result of such approximation.

There exist several methods for NR-U to at least approximately satisfy the two conditions for granting the channel access of a potential transmission, which are described as follows.

In one embodiment, NR-U can leverage the spatial reuse of the highly directional communications and NR interference or beam management techniques for NR-U/NR-U coexistence in both the above 7 GHz unlicensed/shared bands and sub-7 GHz unlicensed/shared bands.

In one embodiment, NR-U can leverage network coordination to synchronize and exchange information (e.g., UE beamforming information) among neighboring gNBs to satisfy condition (2), while condition (1) can be satisfied through UE measurement reporting over licensed carrier when NR-LAA mode is used.

In one embodiment, a most general method for NR-U transmission to satisfy both condition (1) and condition (2) is through message exchange or handshake mechanism between the gNB and the UE. Specifically, condition (1) can be met by handshake between the gNB and the UE of the potential transmission; while condition (2) can be met by monitoring for the nearby handshake message/signal of ongoing transmissions and/or coordination among neighboring NR-U gNBs/UEs to facilitate the channel access decision of a potential transmission.

In the following embodiments, the details of the directional LBT with handshake mechanism for NR-U are specified. In the rest of the present disclosure, a "spatial RX parameter" is referred to as a beamforming direction at the UE for downlink reception, or a beamforming direction at the gNB for uplink reception respectively (e.g., receive beamforming toward a certain direction). In addition, a "spatial TX parameter" is referred to as the beamforming direction at the gNB for downlink transmission, or the beamforming direction at the UE for uplink transmission respectively (e.g., transmit beamforming toward a certain direction). Example of a spatial RX/TX parameter is illustrated in FIG. 10. In addition, for the rest of this disclosure, the unlicensed spectrum can also include shared spectrum.

In one embodiment, general procedure for LBT with the handshake mechanism in NR unlicensed is provided.

In one embodiment, in order to achieve fair channel access with the existing radio access technology (RAT) on the unlicensed/shared spectrum, NR-U can support handshake exchange between the potential transmitter and receiver before the data transmission, wherein the handshake exchange can refer to the exchange of at least one of the channel access request (CARQ) and/or channel access response (CARP).

In one example of this embodiment, for a potential downlink transmission, the potential transmitter and receiver are the gNB and UE(s) respectively; and the CARQ can be transmitted by a gNB and the CARP is responded by at least one UE.

In another example of this embodiment, for a potential uplink transmission, the potential transmitter and receiver are the UE and gNB respectively, and the CARQ can be transmitted by a UE and the CARP is responded by a gNB.

In another example of this embodiment, for a potential transmission, only the CARQ can be transmitted from the potential transmitter to associated receiver(s), while the CARP does not be responded from the associated receiver(s) to the transmitter.

In another example of this embodiment, for a potential transmission, only the CARP can be transmitted from the potential receiver to the associated transmitter, while the CARQ does not need to be transmitted. In another sub-example, when the receiver is a UE, the CARP can be transmitted through grant-free uplink transmissions without being explicitly scheduled.

In another example of this embodiment, the CARQ can be optionally further utilized by the transmitter to indicate to the receiver(s) the start of the channel occupancy time (COT) following a successful LBT attempt, such that the receiver(s) can prepare to receive from the transmitter.

In another example of this embodiment, the CARP can be utilized by the receiver in indicating to associated transmitter the interference level perceived by the receiver through the CARP content.

In another example of this embodiment, when the CARP transmission is subject to LBT, the CARP can be used by the receiver to indicate if it is ready to receive. Some high level descriptions of the CARQ and CARP are provided as follows. In another embodiment, each of the CARQ and CARP can be either message-based or sequence-based.

In one example of this embodiment, the CARQ and/or CARP can be message-based, and the message information carried by CARQ and/or CARP message can include all or part of the following: the indicator for CARQ (CARP), the transmitter (receiver) identity, transmitter (receiver) spatial TX parameter(s), the maximum channel occupancy time (which indicates the channel reservation duration), etc. In addition, the interference perceived by the receiver can be indicated within the CARP message.

In another example of this embodiment, the CARQ and/or CARP can be sequence-based, and all or part of the following information can be carried implicitly through the sequence generating CARQ and/or CARP: the indication for CARQ (CARP), the transmitter (receiver) identity, transmitter (receiver) spatial TX parameter(s), etc.

Another design consideration is the configuration for CARQ and/or CARP. In one embodiment, the CARQ and/or CARP can be mandatory feature for NR-U in certain unlicensed bands, such as the 60 GHz unlicensed bands. In another embodiment, the configuration for CARQ and/or CARP can be carried by the DCI. In one example of this embodiment, the CARQ and/or CARP configuration can be conveyed by the DCI through the control channel associated to the data channel conveying CARQ and/or CARP, wherein the control and data channels can follow the NR slot/mini-slot structure. In another embodiment, the configuration for CARQ and/or CARP can be carried by higher layer parameters (e.g., RRC configured), which can be semi-statically configured or dynamically configured.

In another embodiment, the CARQ can be configured by the transmitter, e.g. it can be up to the transmitter to decide whether to transmit CARQ or not. In another embodiment, the CARP can be scheduled by the corresponding CARQ, and the configuration for CARP can be indicated through the CARQ. In another embodiment, for uplink transmissions, the CARP can be transmitted by the UE through grant-free transmissions.

Another design consideration for CARQ/CARP handshake exchange is the directionality for CARQ/CARP.

Figure 43A:
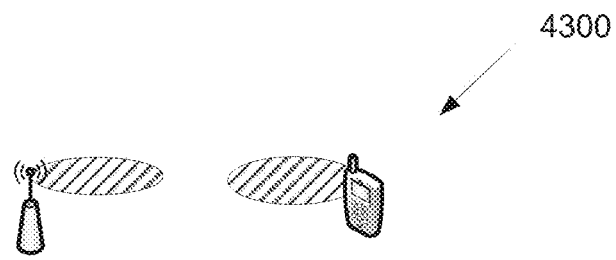
FIG. 43A illustrates an example subset of spatial TX parameters according to embodiments of the present disclosure.

FIG. 43A illustrates an example subset of spatial TX parameters 4300 according to embodiments of the present disclosure. The embodiment of the subset of spatial TX parameters 4300 illustrated in FIG. 43A is for illustration only. FIG. 43A does not limit the scope of this disclosure to any particular implementation.

Figure 43B:
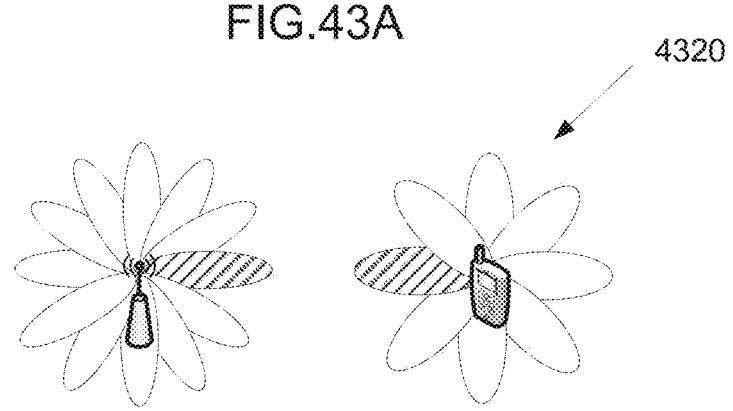
FIG. 43B illustrates another example subset of spatial TX parameters according to embodiments of the present disclosure.

FIG. 43B illustrates an example subset of spatial TX parameters 4320 according to embodiments of the present disclosure. The embodiment of the subset of spatial TX parameters 4320 illustrated in FIG. 43B is for illustration only. FIG. 43B does not limit the scope of this disclosure to any particular implementation.

Figure 43C:
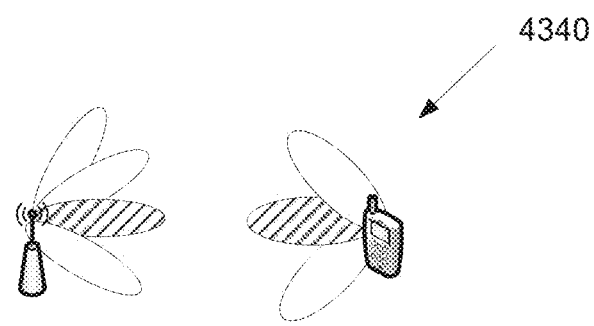
FIG. 43C illustrates yet another example subset of spatial TX parameters according to embodiments of the present disclosure.

FIG. 43C illustrates an example subset of spatial TX parameters 4340 according to embodiments of the present disclosure. The embodiment of the subset of spatial TX parameters 4340 illustrated in FIG. 43C is for illustration only. FIG. 43C does not limit the scope of this disclosure to any particular implementation.

Figure 43D:
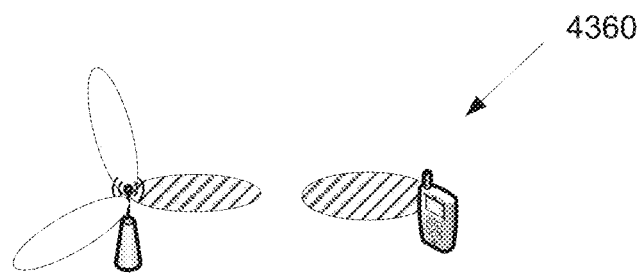
FIG. 43D illustrates yet another example subset of spatial TX parameters according to embodiments of the present disclosure.

FIG. 43D illustrates an example subset of spatial TX parameters 4360 according to embodiments of the present disclosure. The embodiment of the subset of spatial TX parameters 4360 illustrated in FIG. 43D is for illustration only. FIG. 43D does not limit the scope of this disclosure to any particular implementation.

In one embodiment, the CARQ (CARP) can be transmitted directionally over a spatial TX parameter from the transmitter (receiver) to the receiver (transmitter). In one example of this embodiment, the spatial TX parameter from the transmitter to the receiver in transmitting the CARQ can be the same as the spatial TX parameter of the data transmission in the corresponding channel occupancy time (COT). In another example of this embodiment, the spatial TX parameter of the receiver in transmitting the CARP can be the same as the spatial RX parameter of the receiver in receiving the data transmission in the corresponding COT. An illustration of this embodiment is provided in FIG. 43A.

In another embodiment, the CARQ and CARP can be transmitted through sweeping over the entire spatial TX parameters at the transmitter and/or receiver side to inform all the neighboring NR-U gNBs and UEs about the potential transmission. An illustration of this embodiment is shown in FIG. 43B.

In another embodiment, the CARQ and CARP can be transmitted by sweeping through a subset of all the spatial TX parameters at the transmitter and/or receiver to inform the neighboring NR-U gNBs and UEs about the potential transmission. An illustration of this embodiment is shown in FIG. 43C.

In another embodiment, the CARQ can be transmitted through multiple spatial TX parameters simultaneously when hybrid beamforming is supported at the potential transmitter. An illustration of this embodiment is shown in FIG. 43D.

In another embodiment, the CARP can be transmitted through multiple spatial TX parameters simultaneously when hybrid beamforming is supported at the receiver of the potential transmission.

In another embodiment, the CARQ can be transmitted through an omni-directional or quasi-omni-directional beam by the potential transmitter. In one example of this embodiment, for sub-7 GHz unlicensed band, the potential transmitter can transmit the CARQ through an omni-directional beam. In another example of this embodiment, for above-7 GHz unlicensed band, the potential transmitter can transmit the CARP through a quasi-omni-directional beam.

In another embodiment, the CARP can be transmitted through an omni-directional or quasi-omni-directional beam by the receiver of the potential transmission. In one example of this embodiment, for sub-7 GHz unlicensed band, the receiver of the potential transmission can transmit the CARP through an omni-directional beam. In another example of this embodiment, for above-7 GHz unlicensed band, the receiver of the potential transmission can transmit the CARP through a quasi-omni-directional beam.

In another embodiment, the spatial TX parameter(s) for CARQ and/or CARP can be up to gNB/UE implementation. In one example of this embodiment, the spatial TX parameter(s) for CARQ/CARP can be chosen according to whether or not hybrid beamforming is supported by the gNB/UE.

In another embodiment, the spatial TX parameter(s) for CARQ and/or CARP can be predefined by the specification. In one example of the embodiment, the predefined spatial TX parameter can be different at different unlicensed frequency band.

In another embodiment, the spatial TX parameter(s) for CARQ and/or CARP can be configurable. In one example of this embodiment, the spatial TX parameter(s) for CARQ and/or CARP can be configured through higher layer parameters (e.g., RRC). In another example of this embodiment, the spatial TX parameter for CARQ and/or CARP can be configured through DCI.

Another design consideration for the handshake exchange mechanism is the general timeline and procedure of the NR-U LBT scheme with the handshake mechanism.

In one embodiment, for a potential NR-U transmitter and receiver pair, the transmission can be granted if (1) the LBT for data transmission at the transmitter side is successful; and (2) the CARQ/CARP exchange between the transmitter and receiver is successful; and optionally that (3) through monitoring the CARQ/CARP from other NR-U transmitter/receiver pairs, the potential NR-U transmitter can determine that the transmission may not cause strong interference to existing transmissions. When the transmission is granted, the transmitter can obtain channel access for the duration given by a maximum channel occupancy time (MCOT).

In another embodiment, the following options regarding the time-domain order of LBT operation for data transmission and the transmission of CARQ/CARP are possible.

Figure 44:
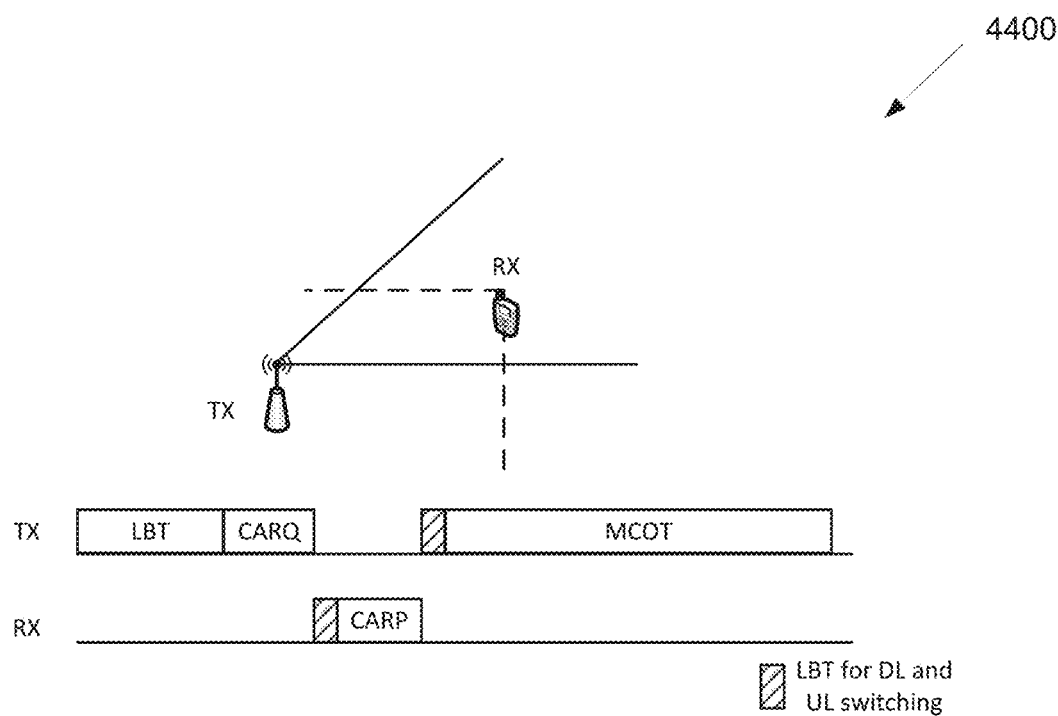
FIG. 44 illustrates yet another example LBT procedure according to embodiments of the present disclosure.

FIG. 44 illustrates yet another example LBT procedure 4400 according to embodiments of the present disclosure. The embodiment of the LBT procedure 4400 illustrated in FIG. 44 is for illustration only. FIG. 44 does not limit the scope of this disclosure to any particular implementation.

In one example of option 1, the CARQ/CARP exchange can happen after the LBT for data transmission. FIG. 44 provides an illustration of the general procedure for Option 1, wherein an extra LBT operation can be performed at each of the downlink and uplink switching points, wherein the LBT can be skipped if the gap between the downlink/uplink transmission and the following uplink/downlink transmission is smaller than a predefined duration, e.g. the SIFS duration of the coexisting Wi-Fi network, which can be 16 µs for 5 GHz band and 3 µs for 60 GHz band. In one example of this option, the LBTs for downlink and uplink switching points can be single-shot LBT. In another example of this option, both CARQ and CARP can be configured to be transmitted. I another example of this option, this option can also be extended to when only one of the CARQ or CARP can be configured to be transmitted.

Figure 45:
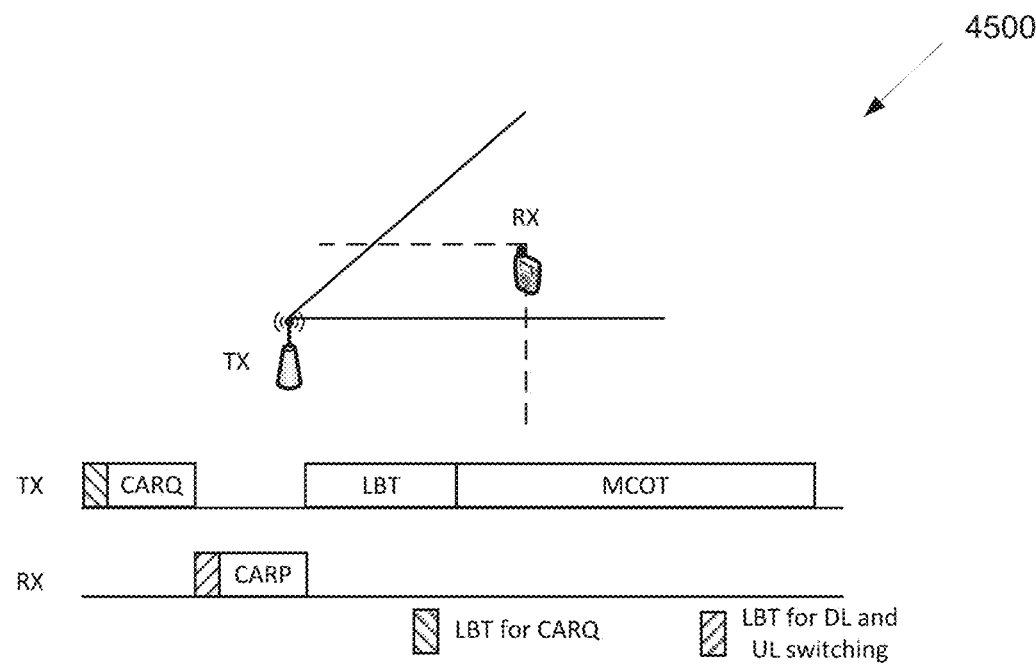
FIG. 45 illustrates yet another example LBT procedure according to embodiments of the present disclosure.

FIG. 45 illustrates yet another example LBT procedure 4500 according to embodiments of the present disclosure. The embodiment of the LBT procedure 4500 illustrated in FIG. 45 is for illustration only. FIG. 45 does not limit the scope of this disclosure to any particular implementation.

In one example of option 2, the CARQ/CARP exchanging can happen before the LBT for data transmission, e.g. to potentially save the procedure delay. FIG. 45 provides an illustration of the general procedure of Option 2, wherein a LBT can be performed before transmitting the CARQ, and another LBT can be optionally performed before transmitting CARP; wherein the LBT can be skipped if the gap between the downlink/uplink transmission and the following uplink/downlink transmission is smaller than a predefined duration, e.g. the SIFS duration of the coexisting Wi-Fi network, which can be 16 µs for 5 GHz band and 3 µs for 60 GHz band. In one example of this option, the LBT before transmitting the CARQ and the LBT for the downlink and uplink switching point can be single-shot LBT.

In one example of option 2, the LBT for data transmissions may not be performed if the CARQ/CARP exchange is unsuccessful. In another example of option 2, the LBT for data transmission can be performed (e.g., the contention window can be advanced) as long as the transmitter is not receiving the CARP. For example, if full-duplexing is supported at the transmitter, the transmitter can perform CARQ transmission while performing the LBT for data transmission simultaneously.

In another example of this option, both CARQ and CARP can be configured to be transmitted. I another example of this option, this option can also be extended to when only one of the CARQ or CARP can be configured to be transmitted.

In another embodiment, the CARQ/CARP exchanging procedure can be considered as separate from the COT that is associated with the LBT operation for data transmission at the transmitter side, such that the time duration for the CARQ/CARP exchange procedure does not need to be counted towards the COT limit associated with the LBT process for data transmission. FIG. 44 can be considered as instance of this embodiment.

In another embodiment, the CARQ/CARP exchanging procedure can be considered as part of the COT that is associated with the LBT operation for data transmission at the transmitter side. In one example of this embodiment, the CARQ/CARP exchange can be considered as a downlink/uplink switching point at the beginning of the COT associated with the LBT process for data transmission. In another example, the time duration for the CARQ/CARP exchange procedure can be counted towards the COT limit associated with the LBT process for data transmission.

In one embodiment, handshake message exchange between potential transmitter and receiver of NR unlicensed is provided.

In this embodiment, the details of each step of the procedure for the directional LBT scheme with handshake exchange are provided. One important design consideration is regarding the details of the LBT process for data transmission as defined in the aforementioned embodiment (e.g. as in the procedure option 1 shown in FIG. 44 and/or the procedure option 2 shown in FIG. 45.

A first design consideration is regarding the type of the LBT for data transmission. In one embodiment, the LBT for data transmission can be a LBT with a random backoff counter wherein the backoff counter is generated according to an adaptive contention window size (e.g. similar to the channel access procedure of the category 4 LBT adopted by LTE-LAA/eLAA). In one example, under the scenario that the completion timing of the LBT for data transmission is not aligned with a NR-U slot, mini-slot or symbol boundary, the data transmission following the completion timing of the associated LBT can start from the next NR-U slot, mini-slot, or symbol boundary, which can depend on the frame structure and scheduling granularity.

In another embodiment, the LBT for data transmission can be performed with a deterministic sensing duration (e.g. similar to the single-shot LBT of LTE-LAA/eLAA, which is performed before transmitting control information with shorter MCOT).

Another design consideration regarding the LBT process for data transmission is the spatial RX parameter(s) of the LBT performed at the potential transmitter side.

In one embodiment, the spatial RX parameter(s) of the LBT operation for data transmission can be determined by the transmitter, based on at least one of the current traffic requests from receivers, and the current availability of spatial TX parameters. In one example of this embodiment, the information on the current traffic requests from receivers and the current availability of spatial TX parameters can be obtained by the transmitter through monitoring the neighboring transmissions of CARQ/CARP.

In another embodiment, the LBT operation for data transmission can be performed over one spatial RX parameter. In one example of this embodiment, it is up to transmitter implementation to select the spatial RX parameter to perform LBT. In another example of this embodiment, the spatial RX parameter over which the LBT is performed can be the same as the intended spatial TX parameter for data transmission corresponding to the LBT operation. In another example of this embodiment, the LBT operation for data transmission can be performed over an omni-directional or quasi-omni directional spatial RX filter.

In another embodiment, the LBT for data transmission can be performed over multiple spatial RX parameters if hybrid beamforming is supported at the transmitter side. In one example of this embodiment, the transmitter can transmit to multiple receivers using multiple spatial TX parameters simultaneously when the LBT for data transmission and the corresponding RARQ/RARP exchange are successful. In one example of this embodiment, it is up to transmitter's implementation to select the spatial RX parameters from a predefined set of spatial RX parameters to perform LBT.

In another example of this embodiment, the spatial RX parameter(s), wherein the LBT for data transmission and the corresponding RARQ/RARP exchange are successful, can be chosen as the spatial TX parameter(s) for data transmission. In another sub-embodiment, the transmitter can make or adjust the transmitter's scheduling decision based on the LBT and/or RARQ and RARP exchange results from spatial TX/RX parameters.

Another important design consideration is on the details of time and frequency domain resources, as well as the procedures to exchange the CARQ and CARP between the transmitter and receiver, which is discussed in the following embodiments.

A first design consideration is regarding the time-domain and frequency-domain resource to transmit the CARQ message/sequence.

In one embodiment, the CARQ can be transmitted following the LBT operation for data transmission, as shown in the scenario of FIG. 44. In one example of this embodiment, the CARQ can be transmitted at the next slot/min-slot boundary after the LBT operation for data transmission is completed.

In another embodiment, if full-duplexing is supported at the transmitter, the CARQ can be transmitted while the transmitter is performing the LBT process for data transmission.

In another embodiment, the potential transmitter can first transmit the CARQ, wherein the CARQ transmission can be potentially subject to an LBT operation (e.g., a single-shot LBT); and the LBT operation for data transmission can be performed after the CARQ transmission. In one example of this embodiment, the CARQ can indicate to the receiver(s) of the potential transmission to respond the CARP, and the potential transmitter can continue with LBT process for transmitting data after the CARP is successful received. An illustration of this embodiment is shown in FIG. 45.

In another embodiment, the frequency domain resource to transmit the CARQ can be the same or a subset of the frequency-domain resource over which the LBT operation that grants CARQ transmission is performed.

In one example of this embodiment, the CARQ can be transmitted over the same frequency-domain resource over which the LBT operation that grants the CARQ transmission is performed.

In another example of this embodiment, the CARQ can be transmitted over a subset of the frequency-domain resource over which the LBT operation that grants the CARQ transmission is performed. For instance, if the CARQ is addressed to a UE, the CARQ can be transmitted over the scheduled frequency resource of the UE, which can be a sub-band of frequency-domain resource over which the LBT operation that grants the CARQ transmission is performed. In another instance, multiple CARQ messages/sequences can be transmitted in parallel, such that unlicensed regulation such as the occupied channel bandwidth can be met from a transmitter transmission perspective.

In another example of this embodiment, when the LBT operation that grants transmission for CARQ is performed over the entire carrier bandwidth, the CARQ can be transmitted over the entire carrier bandwidth as well, or a sub-band of the carrier bandwidth but subject to unlicensed regulation allowance (e.g., the occupied channel bandwidth regulation).

In another example of this embodiment, when the LBT operation that grants transmission for CARQ is performed over one or multiple frequency units in parallel, the CARQ can be transmitted over all or a subset of the frequency unit(s) that passes the LBT subject to unlicensed regulation allowance (e.g., the occupied channel bandwidth regulation). For instance, the frequency unit can be a bandwidth part (BWP); or a sub-band of fixed bandwidth, such as 20 MHz in the sub-7 GHz bands. In another instance, every frequency unit that passes the LBT can carry one CARQ message/sequence, with the CARQ transmitted in different frequency units can be addressed to one of the same or different UE(s). In yet another instance, among the frequency unit(s) that passes the LBT can carry one CARQ message/sequence, a subset of the frequency unit(s) can be utilized in transmitting the CARQ.

In another example of this embodiment, for uplink transmissions, the UE can perform LBT operation according to the frequency domain resource indicated by the UL grant, and the CARQ can transmit also over the same frequency domain resource after the LBT operation is successful.

In another embodiment, at least one of above the options can be supported simultaneously without impacts at the receiver end (e.g., when the scheduling information of CARP is carried by CARQ), and it can be up to transmitter's implementation to choose which option to use during the handshake LBT procedure.

Another design consideration is the spatial TX parameter(s) to transmit the CARQ.

In one embodiment, the spatial TX parameter(s) to transmit CARQ can be determined by the potential transmitter. In one example of this embodiment, the spatial TX parameter(s) wherein the CARQ is transmitted can be the same as the spatial RX parameter(s) wherein the LBT for data transmission is performed successfully. For instance, this example can be applied if the LBT for data transmission is completed before the CARQ/CARP exchange as in the scenario of FIG. 44. In another example of this embodiment, the spatial TX parameter(s) wherein the CARQ is transmitted can be determined from at least one of the current traffic requests from receivers, and the current availability of spatial TX parameters.

For instance, this example can be applied when the LBT for data transmission is completed after the CARQ/CARP exchange as in the scenario of FIG. 45. In another example of this embodiment, the CARQ can be transmitted in a sweeping manner through all or a subset of spatial TX parameters.

In another embodiment, the receiver may assume the antenna port for the reception of the DMRS of control channel conveying CARQ message (if message-based) or the reception of CARQ sequence (if sequence-based) can be QCL'ed with the antenna port for the reception of DMRS of control channel conveying data transmission, with respect to delay spread, Doppler spread, Doppler shift, average delay, and spatial reception parameters.

Another design consideration is regarding the receivers that each CARQ message/sequence is addressed to.

Figure 46A:
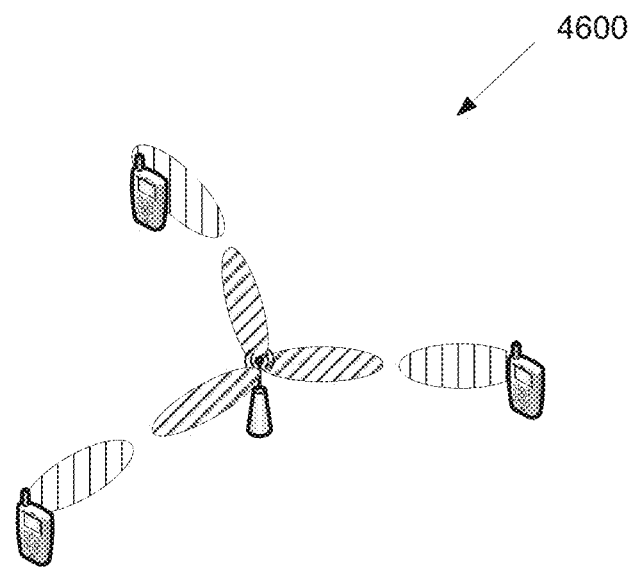
FIG. 46A illustrates an example beam direction according to embodiments of the present disclosure.

FIG. 46A illustrates an example beam direction 4600 according to embodiments of the present disclosure. The embodiment of the beam direction 4600 illustrated in FIG. 46A is for illustration only. FIG. 46A does not limit the scope of this disclosure to any particular implementation.

Figure 46B:
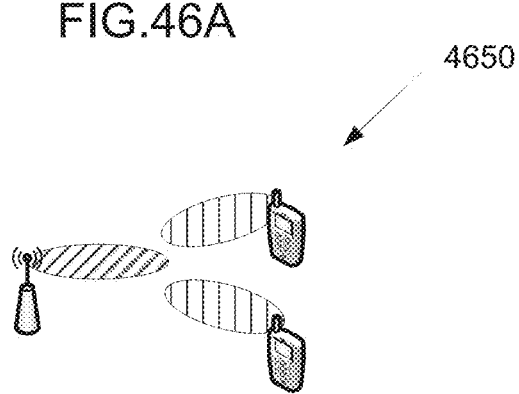
FIG. 46B illustrates another example beam direction according to embodiments of the present disclosure.

FIG. 46B illustrates an example beam direction 4650 according to embodiments of the present disclosure. The embodiment of the beam direction 4650 illustrated in FIG. 46B is for illustration only. FIG. 46B does not limit the scope of this disclosure to any particular implementation.

In one embodiment, each CARQ from the transmitter can be addressed to one receiver under each spatial RX parameter over which the LBT operation for data transmission is performed. In one example of this embodiment, for downlink transmission, the scheduling decision for the UE that the CARQ is addressed to is up to gNB implementation; while for uplink transmission, the CARQ from the UE is addressed to associated gNB. FIG. 46A provides an illustration of this embodiment.

In another embodiment, for downlink transmission, each CARQ from the gNB can be addressed to multiple UEs. In one example of this embodiment, the UEs can be under the same spatial RX parameter where the LBT for data transmission is performed, and the UEs requested by the CARQ can respond the CARP to the gNB. In another example of this embodiment, the CARQ from the gNB can be addressed to multiple UEs under each spatial RX parameter over which the LBT operation for data transmission is performed. FIG. 46B provides an illustration of this embodiment.

In another embodiment, for downlink transmission, CARQ from the gNB can be cell-specific. In one example of this embodiment, the CARQ can be used by the gNB to indicate the start of the COT. In another example of this embodiment, this embodiment can be used when only CARQ needs to be transmitted, while CARP is not needed. In another example of this embodiment, UEs associated with the gNB that detects the CARQ can potentially respond with CARP.

In another embodiment, for downlink transmission, CARQ from the gNB can be UE-specific. In one example of this embodiment, the UE, the CARQ is addressed, can potentially respond the CARP to the gNB, if the CARQ has been detected by the UE. In another example of this embodiment, the gNB can transmit multiple UE-specific CARQs, such that multiple UEs that the CARQs are addressed can potentially respond with the CARP.

In another embodiment, for downlink transmission, CARQ from the gNB be group-UE specific. In one example of this embodiment, the UEs, within the group wherein the CARQ is addressed, can potentially respond with CARP corresponding to this CARQ.

In another embodiment, for uplink transmission, the CARQ from the UE can be addressed to the serving gNB.

In another embodiment, the gNB can make or adjust the gNB's scheduling decision for the data transmission before the associated downlink transmission in MCOT, based on the CARP responses from the UEs requested by the CARQ of the gNB.

Another consideration is regarding the time and frequency resource to transmit the CARP.

In one embodiment, the CARP can be directly scheduled by the CARQ, such that the time and frequency resource allocation for transmitting CARP can be configured and/or indicated in the CARQ.

In one example of this embodiment, for a potential downlink transmission, when the CARQ is addressed to a UE (e.g., the CARQ is UE-specific), the UE that CARQ is addressed to can utilize the time and frequency domain resource indicated by CARQ to transmit the CARP.

In another example of this embodiment, for a potential downlink transmission, when the CARQ is addressed to multiple UEs, the multiple UEs can utilize the time and frequency resources indicated by the CARQ in transmitting the CARP, and the CARPs from different UEs can be potentially differentiated by the gNB through receiving the CARPs using different gNB spatial RX parameters; and/or through assigning the UEs to choose CARP sequences that can be differentiated by the gNB. In one instance, the CARP sequence can be depend on the cell radio network temporary identifier (C-RNTI) of the UE, such that CARP sequences from different UEs can be orthogonized at the gNB and correspondingly detected by the gNB.

In another embodiment, the CARP can be transmitted according a configuration indicated by a higher layer parameter (e.g., RRC parameter), which contains at least the information on the time and frequency resource allocation for transmitting CARP, and can be semi-statically configured or dynamically configured.

In another embodiment, the CARP can be transmitted throughput the time and frequency domain resources according to the resources indicated by the grant-free uplink transmission for NR unlicensed, wherein the CARP can be transmitted within the grant-free resource pool subject to LBT. In one example of this embodiment, this embodiment can be used when a CARQ is addressed to multiple UEs for downlink transmission, and the UEs addressed by CARQ can respond with CARP in their respective grant-free uplink resource.

In another embodiment, when CARQ is received by the receiver of the potential transmission, the receiver can perform a single-shot LBT to grant transmission of the CARP, and the time-domain resource to transmit CARP can be the next symbol/mini-slot/slot boundary after the single-shot LBT is successful.

In another embodiment, when CARQ is received by the receiver of the potential transmission, the time-domain resource for the receiver to transmit CARP can be within a predefined duration after the reception of the CARQ. In one example of this embodiment, the predefined duration can be the SIFS duration, which can be chosen according to the unlicensed regulation (e.g., 16 μs for sub-7 GHz unlicensed bands and 3 μs for above-7 GHz unlicensed bands).

In another embodiment, the CARP only transmission (i.e., no need to transmit CARQ) can be achieved through supporting grant-free uplink transmission for NR unlicensed, wherein the CARP can be transmitted within the grant-free resource pool subject to LBT.

In another embodiment, the CARP only transmission (i.e., no need to transmit CARQ) can be achieved by transmitting the CARP through existing NR-U uplink reference signals such as the SRS.

Figure 47:
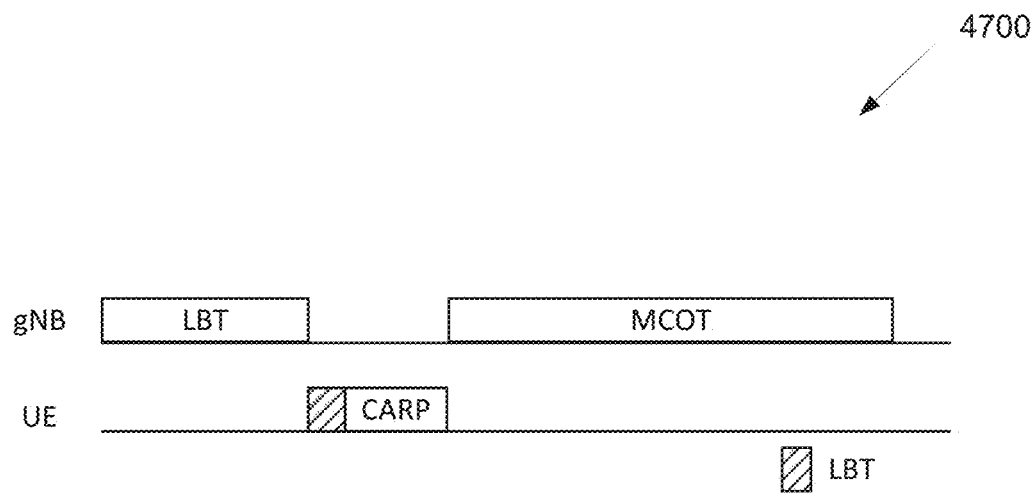
FIG. 47 illustrates an example CARP transmission according to embodiments of the present disclosure.

FIG. 47 illustrates an example CARP transmission 4700 according to embodiments of the present disclosure. The embodiment of the CARP transmission 4700 illustrated in FIG. 47 is for illustration only. FIG. 47 does not limit the scope of this disclosure to any particular implementation.

Figure 48:
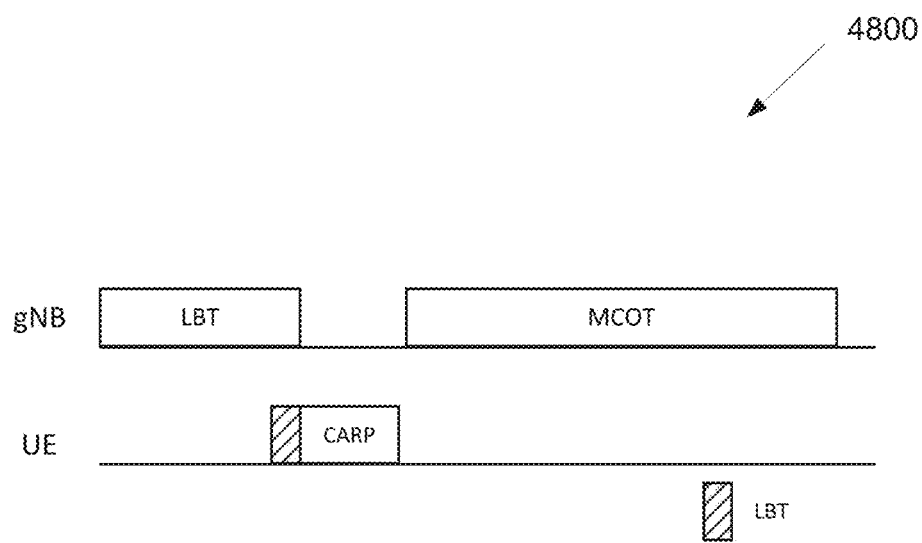
FIG. 48 illustrates another example CARP transmission according to embodiments of the present disclosure.

FIG. 48 illustrates another example CARP transmission 4800 according to embodiments of the present disclosure. The embodiment of the CARP transmission 4800 illustrated in FIG. 48 is for illustration only. FIG. 48 does not limit the scope of this disclosure to any particular implementation.

Figure 49:
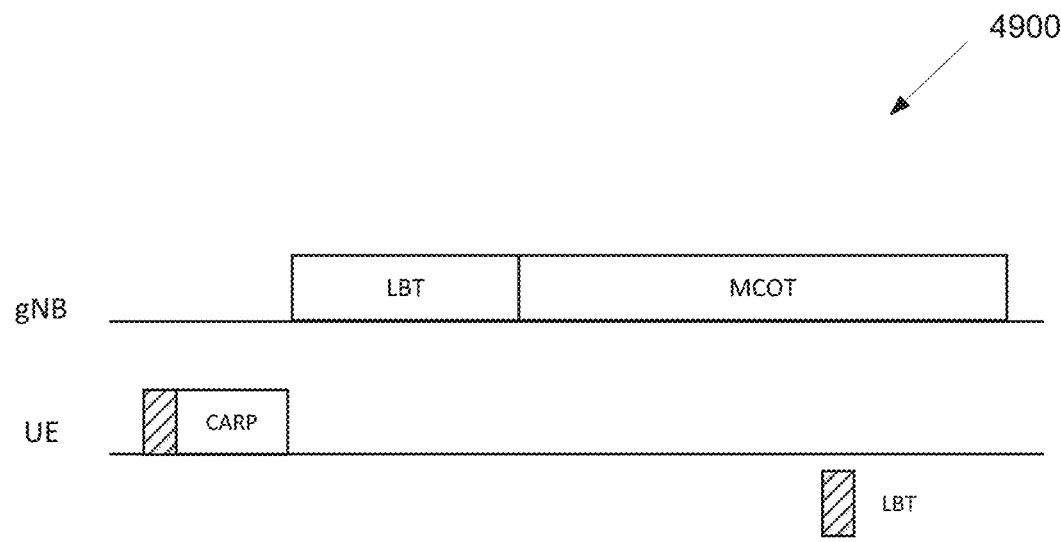
FIG. 49 illustrates yet another example CARP transmission according to embodiments of the present disclosure.

FIG. 49 illustrates yet another example CARP transmission 4900 according to embodiments of the present disclosure. The embodiment of the CARP transmission 4900 illustrated in FIG. 49 is for illustration only. FIG. 49 does not limit the scope of this disclosure to any particular implementation.

Figure 50:
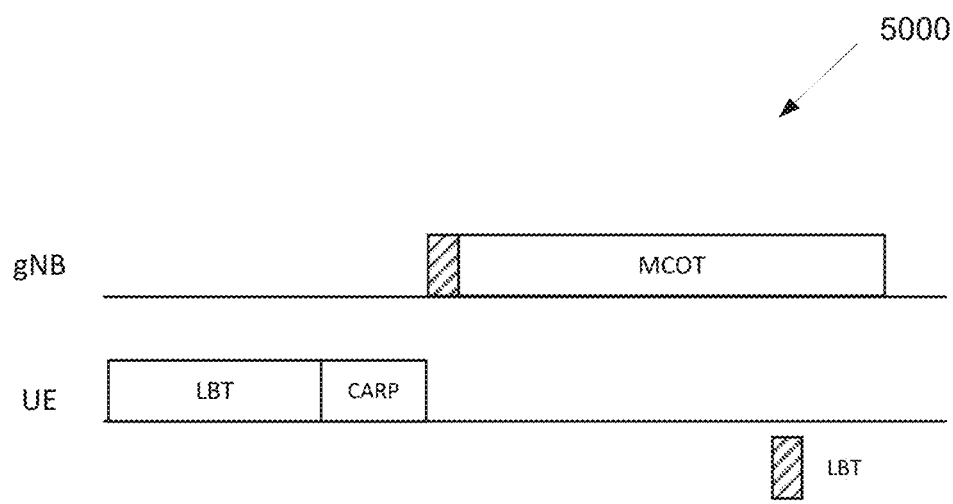
FIG. 50 illustrates yet another example CARP transmission according to embodiments of the present disclosure.

FIG. 50 illustrates yet another example CARP transmission 5000 according to embodiments of the present disclosure. The embodiment of the CARP transmission 5000 illustrated in FIG. 50 is for illustration only. FIG. 50 does not limit the scope of this disclosure to any particular implementation.

FIGS. 47 to 50 provide several illustrations of the possible procedure for the LBT with handshake mechanism and CARP-only transmission. FIG. 47 illustrates the scenario where gNB performs the LBT for data transmission preceding the pre-configured resource for CARP, wherein the pre-configured resource for CARP also incorporates a LBT to grant CARP transmission. For instance, this LBT can be a short single-shot LBT.

FIG. 48 illustrates the scenario where a gNB performs the LBT for data transmission before the pre-configured resource for CARP; wherein a LBT for CARP that precedes the pre-configured CARP resource also needs to be performed, and that this LBT operation can be of a single-shot LBT.

FIG. 49 illustrates a scenario where the UE first transmits the CARP in the pre-configured resource subject to LBT, and a gNB performs LBT for data transmission if the CARP is successfully received/detected by the gNB.

FIG. 50 illustrates a scenario where the UE first performs LBT for data transmission before transmitting the CARP, and then the COT achieved by the uplink LBT is shared with the gNB for downlink transmission; wherein a LBT may need to be performed for the uplink to downlink switching, and that the LBT for this switching can be a single-shot LBT.

In FIGS. 47 to 50, the CARP transmission can be treated as part of the COT associated with the LBT operation for data transmission, in which case the COT in FIGS. 47 to 50 after the can refer to the remaining COT after the CARP transmission.

Another consideration is regarding the parameters of LBT for CARP transmission.

In one embodiment, a single-shot LBT can be performed before transmitting CARP. In one example of this embodiment, the single-shot LBT for transmitting CARP can be used if the CARP transmission if the corresponding CARQ is received by the receiver. In another example of this embodiment, the transmission of the CARP at the receiver is subject to the sensing result of the one-shot LBT, and it may not be able to respond the CARP if the one-shot LBT fails due to strong interferers nearby.

In another embodiment, CARP can be transmitted without performing LBT when the CARP transmission can start within predefined threshold duration after the end of the CARQ transmission, wherein the CARP transmission can share the MCOT from the transmitter LBT. This predefined threshold can be SIFS duration of the coexisting Wi-Fi network, which is 16 μs for 5 GHz bands and 3 μs for 60 GHz band). For example, at 60 GHz unlicensed band with SIFS of 3 us, subcarrier spacing of 480 KHz with symbol length of 2.23 us satisfies this condition.

In another embodiment, the CARP can be transmitted subject to a CAT-4 LBT operation. In one example of this embodiment, the CAT-4 LBT for CARP can be used when only CARP needs to be transmitted by the receiver, while the CARQ does not need to be transmitted by the corresponding potential transmitter.

Another design consideration is after the receiver(s) has attempted to transmit the CARP, how the transmitter makes transmission decision based on the reception status of the CARP response from the receiver(s). This design consideration can depend on whether the potential transmitter is a gNB or a UE, as well as whether CARP transmission happens after or before the LBT for data transmission.

In one embodiment, a gNB is the potential transmitter and the CARP from the UE(s) is not received (when LBT of CARP is required) or un-decodable due to bad channel condition; and if the gNB already completed the LBT procedure for data transmission before the reception of CARP (e.g. one example is illustrated in FIG. 44), the gNB can terminate the potential transmission on the currently sensed spatial RX parameter(s), switch to new spatial RX parameter(s), and restart the LBT process for data transmission for a different set of UE(s) associated with the new spatial RX parameter(s); or the gNB can resend CARQ to the same UE(s) on the same spatial TX parameter(s) within the MCOT of the data LBT; or the gNB can resend CARQ to different UE(s) on the same spatial TX parameter (s) within the MCOT of the data LBT; or the gNB can wait for the CARP response(s) from UE(s) at the next available grant-free resource for CARP within current MCOT, when the CARP is transmitted without being scheduled (e.g., by CARQ).

In another embodiment, gNB is the potential transmitter and the CARP from the UE(s) is not received (when LBT of CARP is required) or un-decodable due to bad channel condition; and if the LBT procedure for data transmission has not started or completed before the reception of CARP (e.g. one example is illustrated in FIG. 45), the gNB can resend the CARQ in the next available CARQ resource, or the gNB can wait for the CARP from the UE(s) at the next available grant-free resource for CARP when the CARP is transmitted without being scheduled.

In another embodiment, when a gNB is the potential transmitter and CARP is received and decoded successfully, the gNB can adjust the scheduling decision based on the CARP received from the UEs.

In one example of this embodiment, if there are multiple UEs expected by a gNB to report the CARP, but only a subset of these UEs reported CARP, then the gNB can schedule more resources (e.g., bandwidth) to the UEs that responded CARP.

In another example of this embodiment, when a gNB performs LBT over multiple directions, but only UEs under a subset of the directions responded CARP, then the gNB can only transmit in directions where the UEs have responded the CARP, and adjust the scheduling decision or transmit powers on these directions accordingly.

In another example of this embodiment, if the gNB has already completed the LBT procedure for data transmission before the reception of CARP (e.g. one example is illustrated in FIG. 44), the gNB can transmit to the UEs that responded CARP using the updated scheduling information within the gNB's MCOT; if the LBT procedure for data transmission has not started or completed before the reception of CARP (e.g. one example is illustrated in FIG. 45), the gNB can proceed to perform LBT for data transmission with the updated scheduling information. In addition, the scheduling information can be transmitted in the PDCCH contained in the CORESET in the beginning of MCOT to the scheduled UEs.

Figure 51:
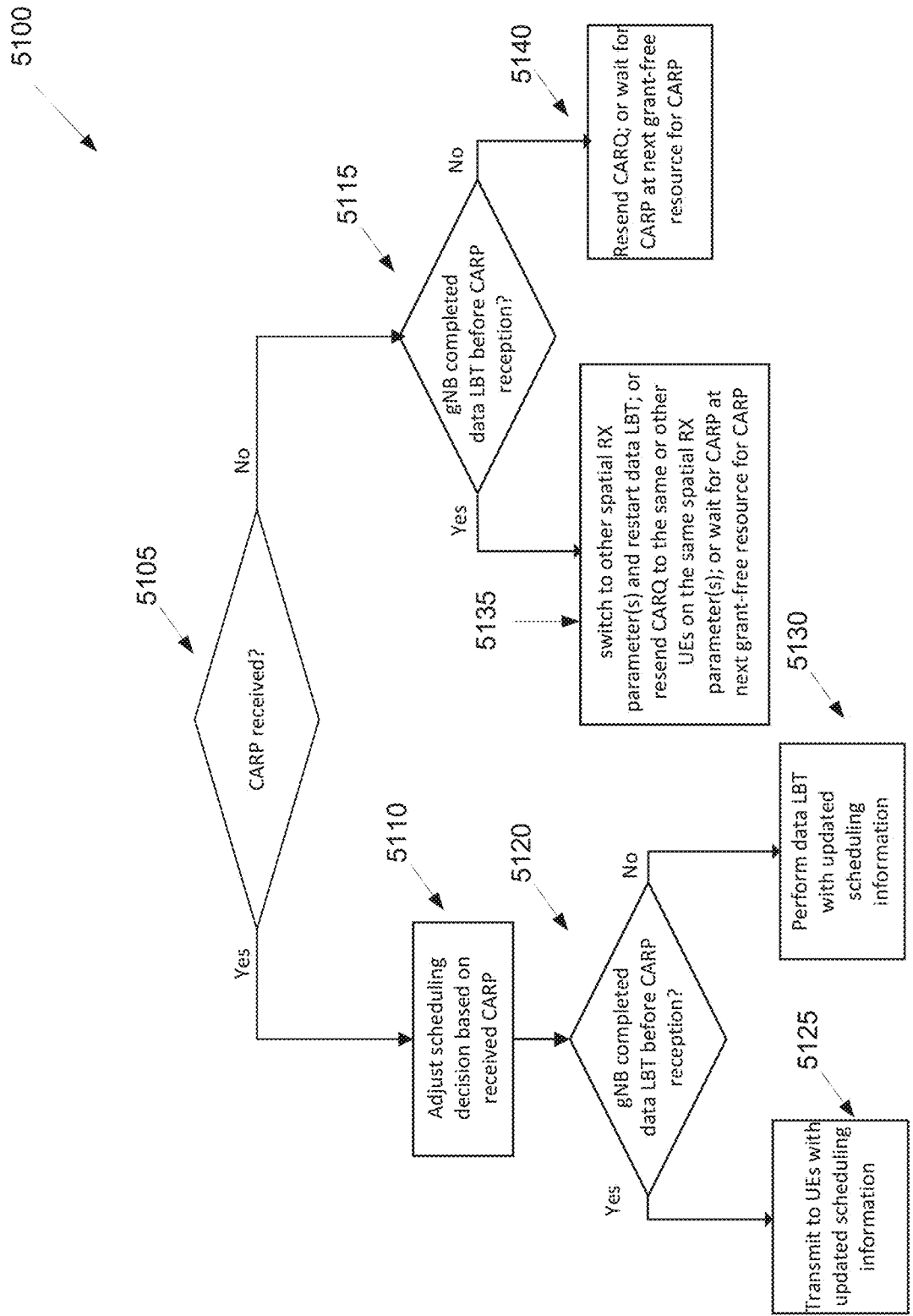
FIG. 51 illustrates a flow chart of a method for a transmission decision according to embodiments of the present disclosure.

FIG. 51 illustrates a flow chart of a method 5100 for a transmission decision according to embodiments of the present disclosure. The embodiment of the method 5100 illustrated in FIG. 51 is for illustration only. FIG. 51 does not limit the scope of this disclosure to any particular implementation. FIG. 51 illustrates an example of the flowchart for the transmissions decision when a gNB is the potential transmitter.

In step 5105, it is determined whether CARP is received. If the CARP is received in step 5105, a scheduling decision is adjusted based on received CARP in step 5110. In step 5120, it is determined whether a gNB completed data LBT before CARP reception. In step 5120, the gNB completed, the gNB transmits to UEs with updated scheduling information in step 5125; otherwise, the gNB performs data LBT with updated scheduling information in step 5130. In step 5105, if the CARP is not received, it is determined whether the gNB completed data LBT before CARP reception in step 5155. In step 5115, the gNB completed, the gNB in step 5135 switches to other spatial RX parameter(s) and restarts data LBT; or resends CARQ to the same or other UEs on the same spatial RX parameter(s); or wait for CARP at next grant-free resource for CARP. In step 5115, the gNB does not complete, the gNB in step 5140 resends CARQ or wait for CARP at next grant-free resource for CARP.

In another embodiment, when the UE is the potential transmitter, and the CARP from the gNB is not received or un-decodable; then if the UE has already completed the LBT procedure for data transmission before the reception of CARP (e.g. one example is illustrated in FIG. 44), the UE can resend the CARQ again to the gNB within the MCOT by the data LBT; or if the LBT procedure for data transmission has not started or completed before the reception of CARP (e.g. one example is illustrated in FIG. 45), the UE can resend the CARQ to the gNB in the next available CARQ resource.

In another embodiment, when the UE is the potential transmitter and the CARP is received from the gNB and decoded successfully; then if the UE already completed the LBT procedure for data transmission before the reception of CARP (e.g. one example is illustrated in FIG. 44), the UE can proceed with the uplink transmission; or if the LBT procedure for data transmission has not started or completed before the reception of CARP (e.g. one example is illustrated in FIG. 45), the UE can proceed with performing the LBT for data transmission.

Figure 52:
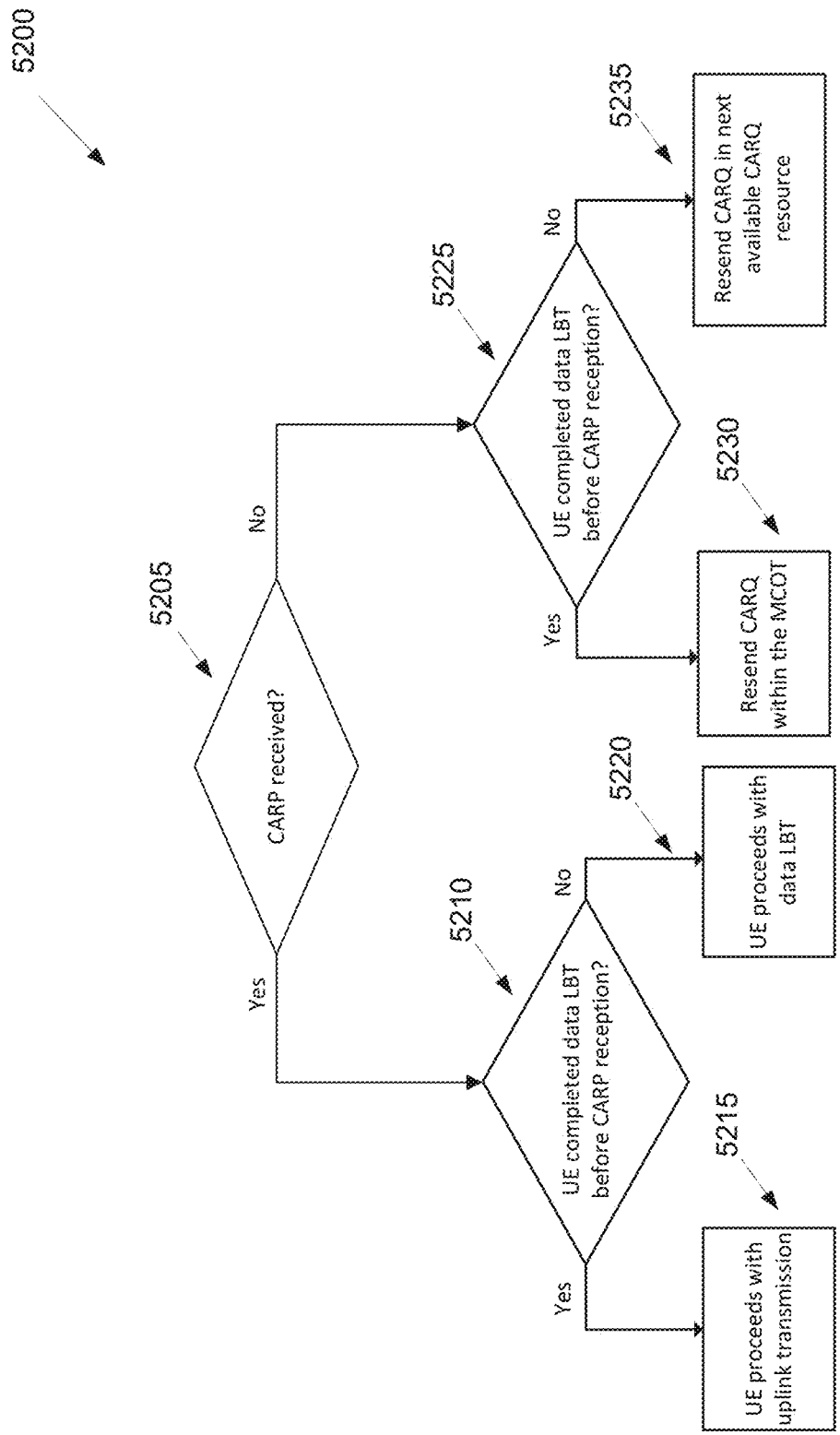
FIG. 52 illustrates another flow chart of a method for a transmission decision according to embodiments of the present disclosure.

FIG. 52 illustrates another flow chart of a method 5200 for a transmission decision according to embodiments of the present disclosure. The embodiment of the method 5200 illustrated in FIG. 52 is for illustration only. FIG. 52 does not limit the scope of this disclosure to any particular implementation.

FIG. 52 provides an illustration of the flowchart for the transmissions decision when a UE is the potential transmitter.

In step 5205 of FIG. 52, it is determined whether CARP is received. In step 5210, it is determined whether a UE completed data LBT before CARP reception. In step 5210, if the UE completed data LBT before CARP reception, the UE proceeds with uplink transmission in step 5215; otherwise, the UE proceeds with data LBT in step 5220. In step 5205, the CARP is not received; it is determined whether the UE completed data LBT before CARP reception in step 5225. In step 5225, the UE completed, the UE resends CARQ within the MCOT in step 5230; otherwise, the UE resends CARQ in next available CARQ resource in step 5275.

Another design consideration is on the configuration of COT when both the LBT for data transmission and CARQ/CARP exchange are successful.

In one embodiment, when the COT is followed by the CARP response, a single-shot LBT can be performed before the potential transmitter can proceed to start transmission within the COT; or the LBT can be skipped if the gap duration between the start of the data transmission within the COT and the end of CARP is within a predefined duration, e.g. the SIFS duration defined by the unlicensed regulation (e.g., 16 μs for 5 GHz band and 3 μs for 60 GHz band). In another embodiment, the spatial TX parameter(s) for transmitting data in the COT associated with the LBT operation can be determined by the transmitter based on the reception status of the CARP, e.g., according to the flowchart in FIG. 51 or FIG. 52.

In another embodiment, the duration of the COT can be decided based on the LBT priority class and the corresponding LBT parameters of the data LBT process. In one example of this embodiment, the COT can be determined similar to that of the LTE-LAA for sub-7 GHz NR-U system.

In another embodiment, the COT for the NR-U system can be non-deceasing with respect to the expected duration of the data LBT process. One example of the MCOT for the data LBT in above 7-GHz unlicensed band is illustrated in TABLE 5.

TABLE 5

MCOT for the data LBT

| LBT priority class | Minimum contention window size | Maximum contention window size | MCOT |
|---|---|---|---|
| 1 | 3 | 7 | 0.5 ms (or 2 NR-U slots) |
| 2 | 7 | 15 | 0.75 ms (or 3 NR-U slots) |
| 3 | 15 | 63 | 2.5/2 ms (or 10/8 NR-U slots) |
| 4 | 15 | 1023 | 2.5/2 ms (or 10/8 NR-U slots) |

In one embodiment, monitoring handshake message of neighboring transmissions for NR unlicensed is provided.

Besides enabling the determination of whether the receiver(s) of the potential transmission is ready to receive, the CARQ/CARP mechanism can also facilitate a potential transmitter to determine if the transmission may cause strong interference to existing transmissions among other nodes.

In one embodiment, an NR-U gNB and/or a UE can determine if the potential transmission can cause strong interference to existing transmissions of other nodes through supporting a direction availability field (DAF) at a gNB and/or a UE, wherein the DAF can be updated by monitoring the CARQ/CARP exchange from neighboring transmissions.

One important design consideration is regarding the content of the DAF and how the DAF is specified.

In one embodiment, the content of the DAF contains at least the availability of the spatial TX parameters at a gNB/UE, which can include at least a direction availability indicator for each transmit direction, wherein the indicator can be a one-bit field and can be set to "1" if the associated transmit direction can be utilized (i.e., may not causing strong interference to the existing transmission among other nodes), or '0' if the transmit direction may not be utilized.

Figure 53:
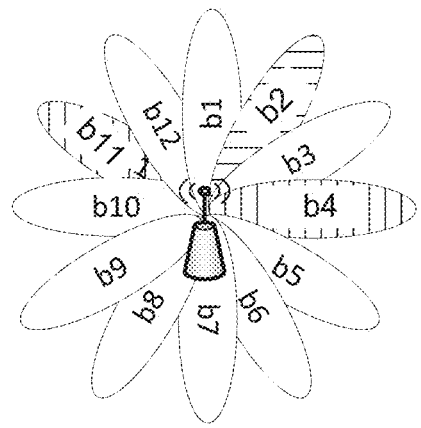
FIG. 53 illustrates an example DAF according to embodiments of the present disclosure.

FIG. 53 illustrates an example DAF 5300 according to embodiments of the present disclosure. The embodiment of the DAF 5300 illustrated in FIG. 53 is for illustration only. FIG. 53 does not limit the scope of this disclosure to any particular implementation.

In one example of this embodiment, the transmit directions in the DAF can be set up on a per spatial TX parameter basis, which means each indicator in DAF corresponds to the availability of each spatial TX parameter at the potential transmitter. In one instance of this example, the DAF at a certain time instance is illustrated in FIG. 53, wherein the DAF is set up for on a per-spatial TX parameter basis, wherein spatial TX parameter b2, b4 and b11 are currently unavailable due to the detection of CARQ/CARP from nearby transmissions.

Figure 54:
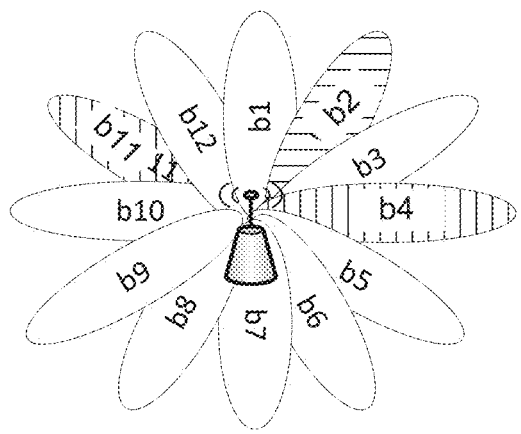
FIG. 54 illustrates another example DAF according to embodiments of the present disclosure.

FIG. 54 illustrates another example DAF 5400 according to embodiments of the present disclosure. The embodiment of the DAF 5400 illustrated in FIG. 54 is for illustration only. FIG. 54 does not limit the scope of this disclosure to any particular implementation.

In another example of this embodiment, the DAF can be set up on a grouped-spatial TX parameters basis, which means each indicator in DAF corresponds to the availability of a group of potential spatial TX parameters at the gNB/UE (i.e., a group of spatial TX parameters share the same availability indicator). In an instance of this example, the DAF at a certain time instance is illustrated in FIG. 54, wherein each bit in the DAF corresponds to the intersection of the availability of three spatial TX parameters.

In another embodiment, the content of the DAF can contain at least a timer associated to each transmit direction, wherein the timer (1) starts if the transmit direction is determined to be unavailable based on the monitored CARQ/CARP exchange from nearby transmissions; and (2) expires if the duration of channel reservation is indicated in the CARQ/CARP (e.g. as illustrated in the aforementioned embodiments) and the timer exceeds the duration of channel reservation, or expires if the duration of channel reservation is not indicated in the CARQ/CARP and the timer exceeds a predefined default MCOT; and (3) can be updated if another CARQ/CARP from existing transmissions is detected/received after the timer starts; and (4) sets the associated direction availability indicator to be "0" when the timer is active (e.g. the timer starts and does not expire yet) and "1" otherwise.

In another example of this embodiment, the timer associated with each transmit direction can be maintained within a higher layer parameter different from the DAF.

In yet another embodiment, the size of the DAF field can be either predefined or configurable, which can depend on the carrier frequency range, and can be different for the gNB and the UE. This is considering the number of spatial TX/RX parameters supported by the gNB and the UE can be different at the same carrier frequency, and also the number of spatial TX/RX parameters supported by the gNB or the UE can be different at different carrier frequency. In one example of this embodiment, the DAF for the gNB that is set up on a per-spatial TX parameter basis can have 8 and 64 bits in 5 GHz unlicensed band and 60 GHz band respectively.

In another embodiment, the DAF can be utilized by the potential transmitter before performing the LBT, such that the transmitter can ensure the intended spatial TX parameter(s) is available to use if LBT process indeed succeeds; otherwise the transmitter can adjust the scheduling decision (for a gNB) or wait until the spatial TX parameter(s) is available.

Another important design consideration is regarding which receive direction(s) to monitor for others' CARQ/CARP messages and correspondingly update the DAF at the potential transmitter, which depends on if a gNB or a UE is the potential transmitter; as well as the state of the gNB/UE, which can be contend (i.e., a gNB/UE is performing LBT) or idle (i.e., a gNB/UE is not performing LBT/transmitting/receiving).

In one embodiment, when a gNB is in an idle state, the gNB can monitor for others' CARQ/CARP messages through an omni-directional/quasi-omni-directional spatial RX parameter; or through sweeping over directional spatial RX parameters or quasi-omni-directional spatial RX parameters; or through multiple directional receive spatial RX parameters simultaneously if hybrid beamforming is supported.

In another embodiment, when a gNB is performing LBT for potential data transmissions, the gNB can monitor for the CARQ/CARP of neighboring transmissions in the spatial RX parameter(s) where it is performing LBT for potential data transmissions, i.e., the spatial RX parameter(s) for monitoring CARQ/CARP of neighboring transmissions is the same the spatial RX parameter(s) for the LBT of data transmission.

In another embodiment, when a gNB is transmitting and the gNB supports full-duplexing, the gNB can monitor for the CARQ/CARP of neighboring transmissions under the same spatial TX parameter(s) that the gNB is transmitting.

In another embodiment, when a UE is in an idle state or the UE is performing LBT for potential uplink transmission, the spatial RX parameter(s) for the UE to monitor the CARQ/CARP from neighboring transmissions is the same as the spatial TX parameter(s) for uplink transmission.

In another embodiment, when a UE is in an idle state or the UE is performing LBT for potential uplink transmission, the spatial RX parameter(s) for the UE to monitor the CARQ/CARP from neighboring transmissions can be through an omni-directional/quasi-omni-directional spatial RX parameter; or through sweeping over directional spatial RX parameters or quasi-omni-directional spatial RX parameters; or through multiple directional receive spatial RX parameters simultaneously if hybrid beamforming is supported.

Another important design consideration is regarding the gNB/UE behavior (e.g., how to update the DAF) for different reception status of the CARQ/CARP messages.

Figure 55:
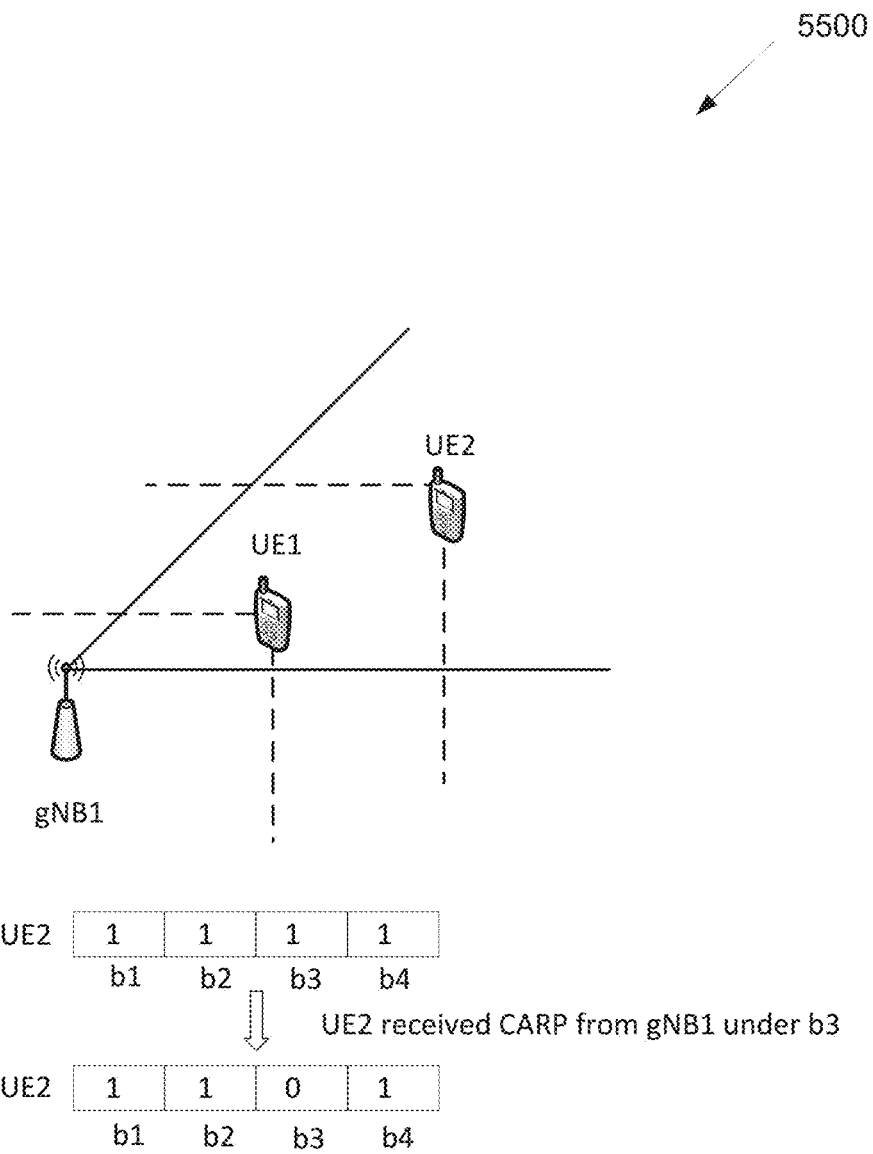
FIG. 55 illustrates an example CARP reception according to embodiments of the present disclosure.

FIG. 55 illustrates an example CARP reception 5500 according to embodiments of the present disclosure. The embodiment of the CARP reception 5500 illustrated in FIG. 55 is for illustration only. FIG. 55 does not limit the scope of this disclosure to any particular implementation.

In one embodiment, a UE can receive/detect the CARP from nearby transmissions that is not addressed to itself, such that the uplink transmission from the UE can collide at the receiver that transmits the CARP; in this case, the UE can set the direction indicator in the DAF associated with the UE spatial RX parameter(s) that received/detected CARP as unavailable, and set or update the timer associated with the spatial RX parameter(s) if the timer is supported. An example of this embodiment is illustrated in FIG. 55, wherein a UE2 receives the CARP from a gNB1, and correspondingly sets the direction indicator in the DAF associated with the spatial RX parameter receiving CARP as unavailable.

In another example of this embodiment, when this scenario happens while the UE is performing LBT for an uplink transmission, the UE can stop the LBT process for an uplink transmission, and can resume/re-attempt the LBT after the timer associated with the unavailable direction expires.

In another embodiment, a gNB can receive or detect the CARP that is not addressed to itself, in which case the corresponding gNB's behavior/procedure depends on the direction(s) that the gNB monitors for the CARP/CARQ of neighboring transmissions.

In one example of this embodiment, when a gNB detected/received the CARP of neighboring transmissions using omni-directional/quasi-omni-directional spatial RX parameter (e.g., during idle state or sweeping with quasi-omni-directional spatial RX parameters), the gNB action can follow one of the following options.

In one example of option (1), all downlink transmit directions that can potentially collide at the receiver (that responded CARP) is set as unavailable in the DAF. In one example of option (2), the downlink transmit directions that can potentially collide at the UE (that responded CARP) is set as unavailable in the DAF with certain probability. In one example, the probability can be the ratio of the beamwidth between a gNB and a UE. In another example, the downlink spatial TX parameter(s) that can potentially collide at the receiver can be referred to as the downlink spatial TX parameter(s) that are aligned with the spatial RX parameter (e.g., omni-directional/quasi-omni-directional) where the gNB received/detected the CARP.

In another example, if the CARP includes the beamforming information of the receiver, the probability in option (2) can be set as the ratio of beamwidth between a gNB and the receiver that responded CARP, otherwise the probability can be set to 1. Option (2) is provided since the gNB can transmit without causing interference to the receiver from which the CARP is received, when the gNB downlink spatial TX parameter is not aligned with the spatial RX parameter of the receiver.

Figure 56:
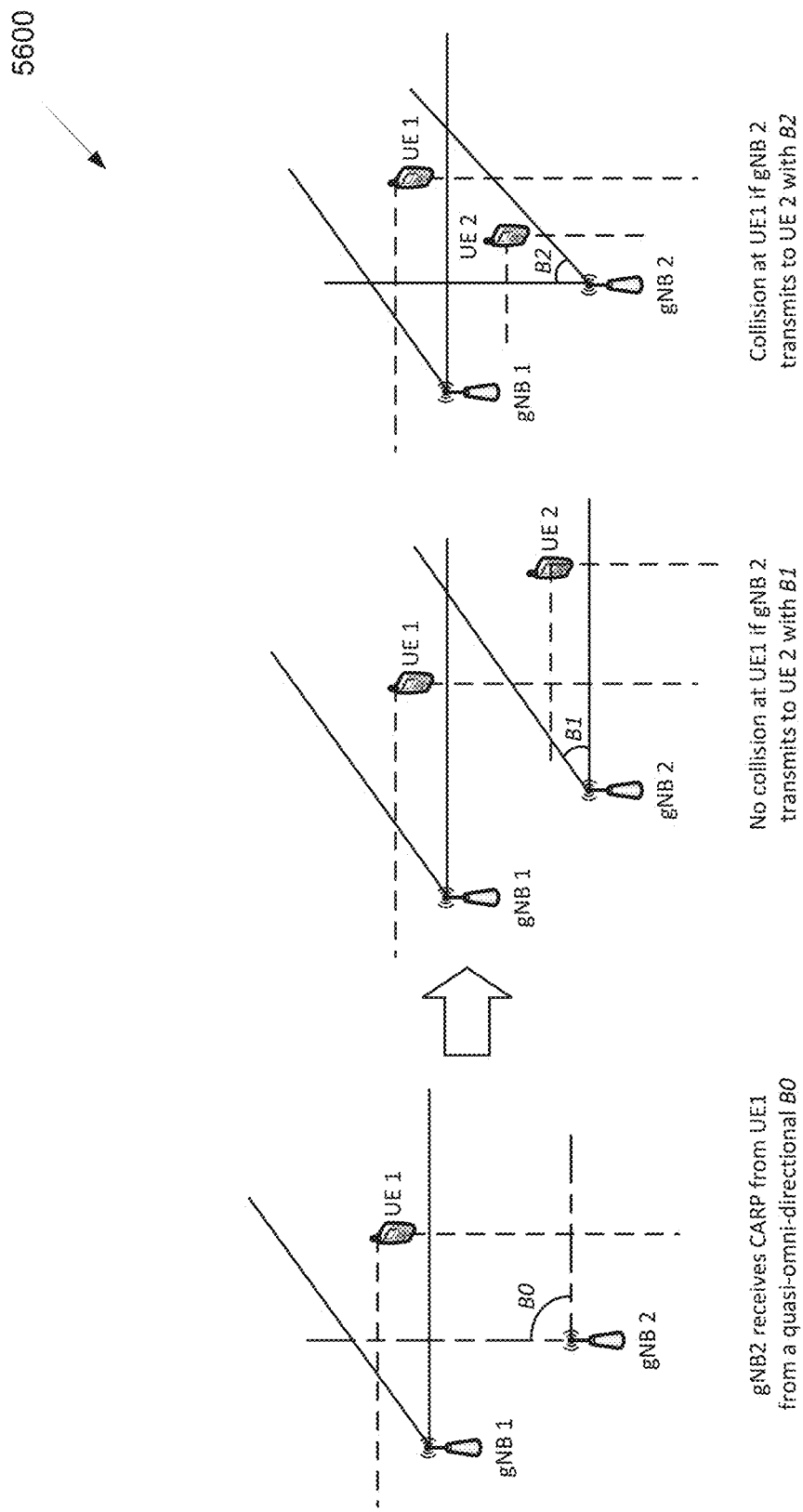
FIG. 56 illustrates another example CARP reception according to embodiments of the present disclosure.

FIG. 56 illustrates another example CARP reception 5600 according to embodiments of the present disclosure. The embodiment of the CARP reception 5600 illustrated in FIG. 56 is for illustration only. FIG. 56 does not limit the scope of this disclosure to any particular implementation.

FIG. 56 provides an illustration this example, wherein a gNB2 receives the CARP from UE1 using a quasi-omni-directional spatial RX parameter denoted by B0, but the transmission from the gNB2 does not collide at UE1 when the downlink spatial TX parameter of the gNB2 is not aligned with the spatial RX parameter of UE1 (e.g., using direction B1 as shown in FIG. 56). In addition, the gNB2 marks the downlink spatial TX parameters that are aligned with B0 as unavailable in DAF with option (1), which means both directions B1 and B2 as shown in FIG. 56 are unavailable for data transmission. This option can avoid gNB becoming hidden node to the UE that transmitted RARP, but is also conservative since direction(s) that does not interfere at such UE may also be marked unavailable.

By contrast, a gNB2 marks all spatial TX parameters that are aligned with B0 as unavailable in DAF with certain probability (e.g., ratio of downlink beamwidth for the gNB2 versus beamwidth of UE1) with option (2). In the example of FIG. 56, this means both direction B1 and B2 can be marked as unavailable with probability 0.5. This option can increase the spatial reuse compared to option (1), but does not fully address the hidden node issue (e.g., the gNB2 can potentially collide at a UE1 when direction B2 is available).

In another example of this embodiment, when a gNB received/detected the CARP of neighboring transmissions over the directional spatial RX parameter(s) (e.g., sweeping over directional spatial RX parameters, or during LBT for data transmission), the gNB can set the corresponding spatial RX parameters as unavailable in the DAF, and set or update the timer that corresponds these direction(s). In addition, when the gNB received/detected the CARP during data LBT, the gNB may also stop the current LBT process on the spatial RX parameter(s) that received/detected the CARP.

FIG. 57 illustrates an example CARQ reception 5700 according to embodiments of the present disclosure. The embodiment of the CARQ reception 5700 illustrated in FIG. 57 is for illustration only. FIG. 57 does not limit the scope of this disclosure to any particular implementation.

In another embodiment, a gNB or a UE can receive/detect the CARQ from nearby transmitters but not the corresponding CARP, in which case the gNB or the UE does not need to update the DAF and can still transmit. An example of this embodiment is illustrated in FIG. 57, wherein the gNB2 received CARQ from a gNB1 but not the corresponding CARP, and therefore the gNB2 can still transmit to a UE2 after successful LBT.

In one embodiment, general flowchart for LBT with handshake mechanism for NR unlicensed is provided.

In such embodiment, the general flowchart for the directional LBT with handshake mechanism provided in the aforementioned embodiments is summarized.

In one embodiment, the directional LBT with CARQ/CARP mechanism provided in the aforementioned embodiments can be applied to any deployment scenarios of NR-U, including both standalone NR-U, and non-standalone NR-U with licensed carrier support via dual connectivity or carrier aggregation. In one sub-embodiment, for non-standalone NR-U with licensed carrier support, several simplifications to the directional LBT with CARQ/CARP mechanism provided in the aforementioned embodiments are available, which are detailed in the aforementioned embodiment.

FIG. 58 illustrates a flowchart of a method 5800 for an LBT operation according to embodiments of the present disclosure. The embodiment of the method 5800 illustrated in FIG. 58 is for illustration only. FIG. 58 does not limit the scope of this disclosure to any particular implementation.

In another embodiment, FIG. 58 illustrates a general flowchart for directional LBT with CARQ/CARP mechanism, wherein the LBT for data transmission for a potential transmitter is performed before the CARQ/CARP exchange. In one example of this embodiment, the general flowchart for directional LBT when data LBT performed after CARQ/CARP exchange can be defined as similar to FIG. 58. In another example of this embodiment, details of steps in FIG. 58 are illustrated in the following steps.

In step 5801, when the potential transmitter is in the idle state, the potential transmitter may monitor for the CARQ/CARP exchange from neighboring transmissions and update the DAF according to the details in the aforementioned embodiments.

In step 5802, when the transmitter has data to transmit, the transmitter may choose LBT spatial RX parameter(s) from potential spatial RX parameter(s) for LBT according to the aforementioned embodiments.

In step 5803, once the transmitter has selected the spatial RX parameter(s) for LBT, the transmitter may perform LBT for data transmission according to the details defined in the aforementioned embodiments.

In step 5804, when LBT over the intended spatial RX parameter(s) is failed, the transmitter may re-select the spatial RX parameter(s) to perform the next LBT; otherwise the transmitter proceeds to perform CARQ/CARP exchange if the transmitter is configured.

In step 5805, when the CARQ/CARP is configured by the transmitter, the transmitter proceeds to transmit the CARQ and then wait for CARP according to the details defined in the aforementioned embodiments; otherwise the transmitter does not need to perform the CARQ/CARP exchange.

In step 5806, the transmitter waits for CARP after the transmitter transmits the CARQ.

In step 5807 and 5805, if the transmitter is a gNB, the gNB can update the scheduling information according to the reception status of CARP as defined in the aforementioned embodiments, and then transmit data using the updated scheduling information; otherwise if the transmitter is a UE, the UE may transmit to the associated gNB.

In step 5809, when the CARP is not received by the transmitter, the transmitter response depends on if the transmitter is a UE or a gNB. When the transmitter is a UE, the transmitter may send another CARQ within the current MCOT.

In step 5810, when the CARP is not received and the transmitter is a gNB, the gNB responses are defined according to FIG. 51 in the aforementioned embodiments, where it is up to a gNB implementation to decide which response option to choose.

In one embodiment, simplification to handshake message exchange between potential transmitter and receiver for NR-U with licensed component carrier is provided.

For NR-U deployment scenarios including carrier aggregation between licensed band NR and NR-U, dual connectivity between licensed band LTE/NR and NR-U, and an NR cell with DL in unlicensed band and UL in licensed band, a downlink and/or uplink licensed carrier is available, which can simplify certain steps of the handshake mechanism in the aforementioned embodiment.

In one embodiment, when a licensed uplink carrier is available, a UE can report to a gNB the energy level that the UE perceives on the unlicensed carrier(s) through the licensed uplink carrier. In one example of this embodiment, the CARP for downlink transmission can be reported through the licensed uplink carrier during the CARQ/CARP exchange.

In another embodiment, when a licensed downlink carrier is available, a gNB can report to a UE the energy level that the gNB perceives on the unlicensed carrier(s) through the licensed downlink carrier. In one example of this embodiment, the CARP for uplink transmission can be reported through the licensed downlink carrier during the CARQ/CARP exchange.

In another embodiment, when both downlink and uplink licensed carriers are available, the CARQ/CARP exchange between the potential transmitter and receiver can be performed over the licensed carrier. In one example of this embodiment, the CARP can report the energy level that the UE or the gNB perceives on the unlicensed carriers. In another example of this embodiment, the gNB/UE can update the DAF through monitoring for the CARQ/CARP message of neighboring transmissions over the licensed carrier.

In another embodiment, when both downlink and uplink licensed carriers are available, before the downlink (uplink) transmission, a gNB and UEs can make information exchange through the licensed carrier before performing LBT, such as the direction availability field (DAF) information or interference level perceived by the transmitter/receiver at the unlicensed carrier. In one example of this embodiment, the transmitter can utilize the exchanged information to decide on the spatial RX parameter(s) where the LBT can be performed, or the receivers to be scheduled for data transmission.

In another embodiment, the DAF can be updated through network coordination among neighboring gNBs. In one example of this embodiment, regardless of whether licensed carrier is available or not, the network coordination can be achieved through higher layer coordination among the neighboring gNBs. In one example of this embodiment, when the licensed downlink carrier is available, the network coordination can be achieved through exchanging information over the licensed downlink carrier.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. A base station (BS) in a wireless communication system, the BS comprising:
a processor configured to perform a first energy sensing based listen-before-talk (LBT) operation on a channel; and
a transceiver operably coupled to the processor, the transceiver configured to:
transmit a channel access request (CARQ) to a user equipment (UE) if the channel is sensed as idle in the first LBT operation, wherein the CARQ includes information on spatial parameters corresponding to beams of the BS; and
receive a channel access response (CARP) from the UE, wherein the CARP includes information on spatial parameters corresponding to beams of the UE; and
wherein the processor is further configured to:
perform a second energy sensing based LBT operation on the channel; and
determine a channel occupancy time (COT) if the channel is sensed as idle in the second LBT operation,
wherein the transceiver is further configured to transmit data over downlink channels within the COT,
wherein the first LBT operation is based on the spatial parameters corresponding to the beams of the BS indicated in the CARQ, and
wherein the second LBT operation is based on the spatial parameters corresponding to the beams of the UE indicated in the CARP.

2. The BS of claim 1, wherein:
the first LBT operation is associated with a random energy sensing duration, and
the random energy sensing duration is determined based on a backoff counter.

3. The BS of claim 1, wherein:
the second LBT operation is associated with a fixed energy sensing duration, and
the fixed energy sensing duration is zero or greater.

4. The BS of claim 1, wherein the spatial parameters of the UE included in the CARP are the same as or a subset of the spatial parameters of the BS included in the CARQ.

5. The BS of claim 1, wherein the CARQ further includes information on a time and frequency resource for transmitting the CARP.

6. A method for a base station (BS) in a wireless communication system, the method comprising:
performing a first energy sensing based listen-before-talk (LBT) operation on a channel;
transmitting a channel access request (CARQ) to a user equipment (UE) based on determining that the channel is sensed as idle in the first LBT operation, wherein the CARQ includes information on spatial parameters corresponding to beams of the BS;
receiving a channel access response (CARP) from the UE, wherein the CARP includes information on spatial parameters corresponding to beams of the UE;
performing a second energy sensing based LBT operation on the channel; and
determining a channel occupancy time (COT) based on determining that the channel is sensed as idle in the second LBT operation; and
transmitting data over downlink channels within the COT,
wherein the first LBT operation is based on the spatial parameters corresponding to the beams of the BS included in the CARQ, and
wherein the second LBT operation is based on the spatial parameters corresponding to the beams of the UE included in the CARP.

7. The method of claim 6, wherein:
the first LBT operation is associated with a random energy sensing duration, and
the random energy sensing duration is determined based on a backoff counter.

8. The method of claim 6, wherein:
the second LBT operation is associated with a fixed energy sensing duration, and
the fixed energy sensing duration is zero or greater.

9. The method of claim 6, wherein the spatial parameters of the UE included in the CARP are the same as or a subset of the spatial parameters of the BS included in the CARQ.

10. The method of claim 8, wherein the CARQ further includes information on a time and frequency resource for transmitting the CARP.

11. A user equipment (UE) in a wireless communication system, the UE comprising:
a transceiver configured to receive a channel access request (CARQ) from a base station (BS) after a channel is sensed as idle in a first listen-before-talk (LBT) operation on the channel, wherein the CARQ includes information on spatial parameters corresponding to beams of the BS; and
a processor operably coupled to the transceiver, the processor configured to perform a second LBT operation on the channel,
wherein the transceiver is further configured to:
transmit a channel access response (CARP) to the BS if the channel is sensed as idle in the second LBT operation, wherein the CARP includes information on spatial parameters corresponding to beams of the UE; and
receive data over downlink channels within a channel occupancy time (COT) after the channel is sensed as idle in a third LBT operation on the channel,
wherein the first LBT operation is based on the spatial parameters corresponding to the beams of the BS indicated in the CARQ, and
wherein the second LBT operation is based on the spatial parameters corresponding to the beams of the UE indicated in the CARP.

12. The UE of claim 11, wherein:
the first LBT operation is associated with a random energy sensing duration, and
the random energy sensing duration is based on a backoff counter.

13. The UE of claim 11, wherein:
the third LBT operation is associated with a fixed energy sensing duration, and
the fixed energy sensing duration is zero or greater.

14. The UE of claim 11, wherein:
the spatial parameters of the UE included in the CARP are the same as or a subset of the spatial parameters of the BS included in the CARQ; and
the CARQ further includes information on a time and frequency resource for transmitting the CARP.

* * * * *